(12) United States Patent
Yamamoto et al.

(10) Patent No.: US 11,438,222 B2
(45) Date of Patent: Sep. 6, 2022

(54) DEVICE MANAGEMENT METHOD AND DEVICE MANAGEMENT SYSTEM

(71) Applicant: PANASONIC INTELLECTUAL PROPERTY MANAGEMENT CO., LTD., Osaka (JP)

(72) Inventors: Masaya Yamamoto, Kyoto (JP); Masayuki Kozuka, Osaka (JP); Kunio Gobara, Osaka (JP); Shinya Nakai, Nara (JP); Mitsuki Yamada, Osaka (JP); Tomoki Ogawa, Osaka (JP); Junya Suzuki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/638,445

(22) PCT Filed: Feb. 27, 2019

(86) PCT No.: PCT/JP2019/007582
§ 371 (c)(1),
(2) Date: Feb. 11, 2020

(87) PCT Pub. No.: WO2019/172046
PCT Pub. Date: Sep. 12, 2019

(65) Prior Publication Data
US 2020/0177445 A1    Jun. 4, 2020

Related U.S. Application Data

(60) Provisional application No. 62/640,768, filed on Mar. 9, 2018.

(51) Int. Cl.
*H04L 41/0803* (2022.01)
*G06F 16/23* (2019.01)
(Continued)

(52) U.S. Cl.
CPC ...... *H04L 41/0803* (2013.01); *G06F 16/2379* (2019.01); *G06F 16/245* (2019.01); *G16Y 10/80* (2020.01); *G16Y 40/30* (2020.01)

(58) Field of Classification Search
CPC .... H04W 4/38; G06F 16/2379; G06F 16/245; G06F 13/00; G16Y 10/80; G16Y 40/30;
(Continued)

(56) References Cited

U.S. PATENT DOCUMENTS

| | | | |
|---|---|---|---|
| 7,593,740 B2 * | 9/2009 | Crowley | H04W 4/02 455/456.3 |
| 9,043,890 B1 * | 5/2015 | Luo | G06F 21/31 726/7 |

(Continued)

FOREIGN PATENT DOCUMENTS

JP    2016-063520 A    4/2016

OTHER PUBLICATIONS

International Search Report and Written Opinion dated May 21, 2019 in International Application No. PCT/JP2019/007582; with partial English translation.

(Continued)

*Primary Examiner* — Umar Cheema
*Assistant Examiner* — John Fan
(74) *Attorney, Agent, or Firm* — McDermott Will & Emery LLP

(57) ABSTRACT

A device management method executed in a server communicatively connected, via a network, to a plurality of devices and a first operation device associated with a first user identifier identifying a first user, includes: receiving, from the first operation device, a request to associate the first user identifier and a first device identifier identifying a first device among the plurality of devices; and when, in correspondence information stored in a storage device and includ- (Continued)

ing device identifiers identifying devices associated with user identifiers identifying users, (i) the first device identifier is associated with a second user identifier different from the first user identifier and (ii) the first user identifier is associated with a second device identifier identifying a second device different from the first device among the plurality of devices, storing the second device identifier and the second user identifier in association with each other.

13 Claims, 47 Drawing Sheets

(51) Int. Cl.
  *G06F 16/245* (2019.01)
  *G16Y 10/80* (2020.01)
  *G16Y 40/30* (2020.01)

(58) Field of Classification Search
  CPC ..... H04L 41/28; H04L 41/18; H04L 41/0803; H04M 11/00; H04Q 9/00
  USPC ........................................................ 709/220
  See application file for complete search history.

(56) References Cited

U.S. PATENT DOCUMENTS

| | | | |
|---|---|---|---|
| 10,290,017 B2* | 5/2019 | Traasdahl | H04L 67/14 |
| 2014/0122623 A1* | 5/2014 | Nerieri | H04L 67/306 |
| | | | 709/206 |
| 2016/0112434 A1 | 4/2016 | Chung et al. | |
| 2017/0262590 A1* | 9/2017 | Karakosta | G06F 19/326 |
| 2018/0091951 A1* | 3/2018 | Sandel | H04W 12/02 |
| 2018/0278613 A1* | 9/2018 | Ganda | G06F 21/602 |
| 2018/0335903 A1* | 11/2018 | Coffman | G06F 3/0488 |
| 2018/0373304 A1* | 12/2018 | Davis | H01H 9/56 |
| 2019/0098635 A1* | 3/2019 | Sarwar | H04W 4/70 |

OTHER PUBLICATIONS

Extended European Search Report dated Mar. 30, 2021, issued in corresponding European Patent Application No. 19763273.0.

* cited by examiner

FIG. 6
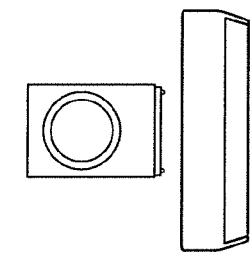
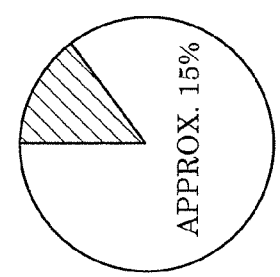
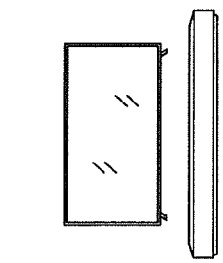
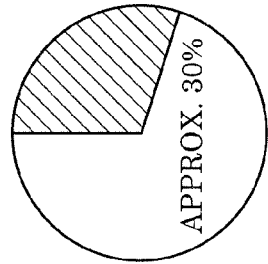

FIG. 8

| | Wi-Fi | LoRa | NB-IoT | CAT.M1 |
|---|---|---|---|---|
| TYPE | NOT GUARANTEED TO BE ALWAYS CONNECTED | ALWAYS CONNECTED THROUGH NON-CELLULAR NETWORK | ALWAYS CONNECTED THROUGH CELLULAR NETWORK | |
| RADIO LICENSING | NOT REQUIRED (USES LICENSE-FREE BAND) | NOT REQUIRED (USES LICENSE-FREE BAND) | REQUIRED (CARRIER EXCLUSIVE) | |
| BASE STATION OPERATION | HOME GW PLACED BY CUSTOMER | MOBILE CARRIER/SELF-OPERATED | MOBILE CARRIER | |
| RADIO USAGE FEE | NOT REQUIRED | NOT REQUIRED | REQUIRED | |
| DEVICE COMMUNICATION FEE | PER-HOUSEHOLD LUMP SUM | LOW | APPROX. 20 TIMES HIGHER THAN LoRa | APPROX. 50 TIMES HIGHER THAN LoRa |
| COMMUNICATION STABILITY | UNSTABLE | UNSTABLE | GUARANTEED TO AN EXTENT BY CARRIER | |
| COMMUNICATION SPEED | VERY FAST | SLOW | SLOW | MEDIUM TO FAST |
| COMMUNICATION DATA VOLUME | EXCEEDINGLY HIGH | LOW | LOW | RATHER HIGH |
| COMMUNICATION DISTANCE | INSIDE HOME | APPROX. 1-20 km | APPROX. 1-20 km | APPROX. 1-10 km |
| NETWORK CONGESTION TOLERANCE | LOW | LOW | HIGH | |
| EVALUATION | -COMMUNICATION COST PAID BY CUSTOMER<br>-FAST AND BROAD, BUT UNSTABLE COMMUNICATION CHANNEL<br>-RISK OF NOT BEING ABLE TO CONNECT | -COSTS ARE EXCEEDINGLY LOW<br>-HOWEVER, COMMUNICATION CHANNEL IS SLOW AND NARROW | -HAS OPERATION COSTS<br>-COMMUNICATION CHANNEL IS SLOW, BUT STABLE | -OPERATIONS COSTS ARE HIGH<br>-STABLE COMMUNICATION CHANNEL WITH ADEQUATE SPEED AND DATA VOLUME |

FIG. 16

| DATA FIELDS | CONTENT |
|---|---|
| DEVICE UNIQUE ID | NUMBER IDENTIFYING APPLIANCE |
| COMMUNICATION MODULE ID | ID IDENTIFYING COMMUNICATION MODULE THAT TRANSMITTED DATA |
| COMMUNICATION MODULE TYPE | TYPE OF COMMUNICATION MODULE THAT TRANSMITTED DATA |
| TRANSMISSION DATE AND TIME | DATE AND TIME OF TRANSMISSION OF DATA |
| POWER STATE | POWER STATE OF APPLIANCE AT DATE AND TIME OF TRANSMISSION OF DATA (E.G.: OFF / ON) |
| COUNTING START DATE AND TIME OF OPERATION COUNT | DATE AND TIME OF START OF COUNTING OF OPERATION COUNT |
| OPERATION COUNT | NUMBER OF TIMES APPLIANCE HAS BEEN OPERATED IN PERIOD FROM COUNTING START DATE AND TIME OF OPERATION COUNT TO DATE AND TIME OF TRANSMISSION OF DATA, OR NUMBER OF TIMES OF OPENING / CLOSING OF DOOR OR LID<br><br>NOTE: WHETHER OPERATION IS COUNTED OR NOT DEPENDS ON ORIGINAL FUNCTION OF APPLIANCE |
| POSITION INFORMATION | INFORMATION ON POSITION OF APPLIANCE<br>NOTE: OBTAINED BY LPWA BASE STATION |

FIG. 41

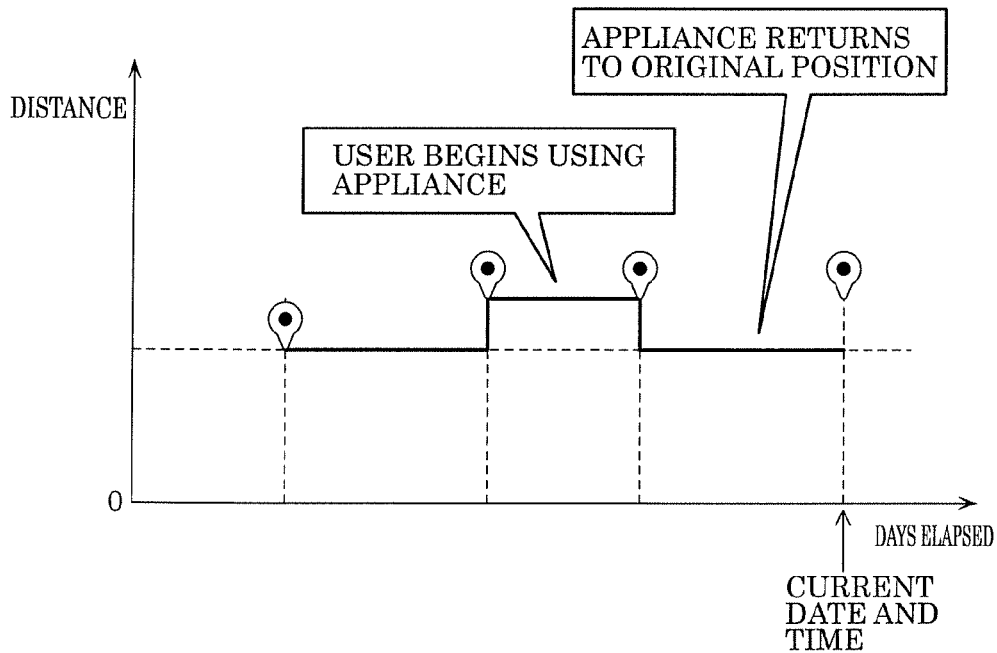

FIG. 42

| CATEGORIES | CHARACTERISTICS | DEGREE OF INFLUENCE ON DETERMINATION |
|---|---|---|
| LARGE APPLIANCES WASHING MACHINES, REFRIGERATORS, ETC. | -TYPICALLY NOT DISCONNECTED FROM POWER -NOT MOVED AFTER INITIAL PLACEMENT IN HOME | IN CASE OF CHANGE IN POSITION: USER HAS MOVED TO NEW RESIDENCE OR APPLIANCE HAS BEEN TRANSFERRED TO DIFFERENT USER |
| MEDIUM SIZED APPLIANCES TVs, AIR PURIFIERS, ETC. | -MAY BE DISPLACED SMALL DISTANCES AFTER REDECORATING, ETC | IN CASE OF SIGNIFICANT CHANGE IN POSITION: POSSIBILITY THAT USER HAS MOVED TO NEW RESIDENCE OR APPLIANCE HAS BEEN TRANSFERRED TO DIFFERENT USER |
| SMALL APPLIANCES ELECTRIC SHAVERS, HAIR DRYERS, ETC. | -MAY BE TAKEN OUT OF THE HOME -INCLUDES RECHARGEABLE MODELS; BEHAVIOR WHEN DISCONNECTED FROM POWER MAY DIFFER FROM OTHER CASES | IN CASE OF SIGNIFICANT CHANGE IN POSITION: POSSIBILITY THAT USER HAS MOVED TO NEW RESIDENCE OR APPLIANCE HAS BEEN TRANSFERRED TO DIFFERENT USER |
| SEASONAL APPLIANCES FANS, HEATERS, ETC. | -PLACEMENT POSITION AND CONNECTION TO POWER DEPENDS ON WHETHER ON-SEASON OFF-SEASON | SINCE PERIODS OF NO OPERATION IN UNITS OF A FEW MONTHS, PERIODS OF COMMUNICATION SILENCE OCCUR, INDIVIDUAL DETERMINATION IS DIFFICULT |

DEVICE MANAGEMENT METHOD AND DEVICE MANAGEMENT SYSTEM

CROSS-REFERENCE OF RELATED APPLICATIONS

This application is the U.S. National Phase under 35 U.S.C. § 371 of International Patent Application No. PCT/JP2019/007582, filed on Feb. 27, 2019, which in turn claims the benefit of U.S. Provisional Application No. 62/640,768, filed on Mar. 9, 2018, the entire disclosures of which Applications are incorporated by reference herein.

TECHNICAL FIELD

The present disclosure relates to a device management method and a device management system.

BACKGROUND ART

Recent years have seen household appliances (also referred to as devices) that connect, over a network, to an appliance control cloud (also referred to as a control cloud), which is a cloud for controlling the appliances, and operate under control by the control cloud (see Patent Literature (PTL) 1).

CITATION LIST

Patent Literature

PTL 1: Japanese Unexamined Patent Application Publication No. 2016-63520

SUMMARY OF THE INVENTION

Technical Problem

Under control of the control cloud, a user can operate the device using an operation device, such as a smartphone. Moreover, in order to operate the device using operation device, the device to be operated by the user needs to be recognized on the control cloud. Stated differently, the control cloud must associate the user with the device by associating a user identifier that identifies the user with a device identifier that identifies the device.

However, this requires the user to configure settings for associating the user identifier and the device identifier in the control cloud. Therefore, the technical problem is that the work of associating the user with all devices possessed by the user is time consuming.

In view of this, the present disclosure provides a device management system and the like, which can efficiently associate users and devices.

Solution to Problem

A device management method according to one aspect of the present disclosure is executed in a server communicatively connected to a plurality of devices and a first operation device via a network, the first operation device associated with a first user identifier identifying a first user. The device management method includes: receiving, from the first operation device, a request to associate the first user identifier and a first device identifier identifying a first device included in the plurality of devices; and when, in correspondence information that is stored in a storage device and in which device identifiers identifying devices are associated with user identifiers identifying users, (i) the first device identifier is associated with a second user identifier different from the first user identifier and (ii) the first user identifier is associated with a second device identifier identifying a second device included in the plurality of devices and different from the first device, storing the second device identifier and the second user identifier in association with each other.

These general and specific aspects may be implemented using a system, an integrated circuit, a computer program, or a computer-readable recording medium such as a CD-ROM, or any combination thereof.

Advantageous Effect of Invention

The device management method according to the present disclosure can efficiently associate user accounts and devices.

BRIEF DESCRIPTION OF DRAWINGS

FIG. 6 is a diagram illustrating a network connection rate of appliances with a built-in network function.
FIG. 8 is a table illustrating characteristics of communication methods (Wi-Fi, LPWA) that can be used by always-connected IoT household appliances.
FIG. 16 is a table illustrating a specific example of operation information and unique information for an appliance received by a cloud.

FIG. 41 is a diagram illustrating an exception to cases in which the user is estimated to have moved to a new residence.

FIG. 42 is a table that categorizes devices by type.

DESCRIPTION OF EXEMPLARY EMBODIMENT

Figure 1:
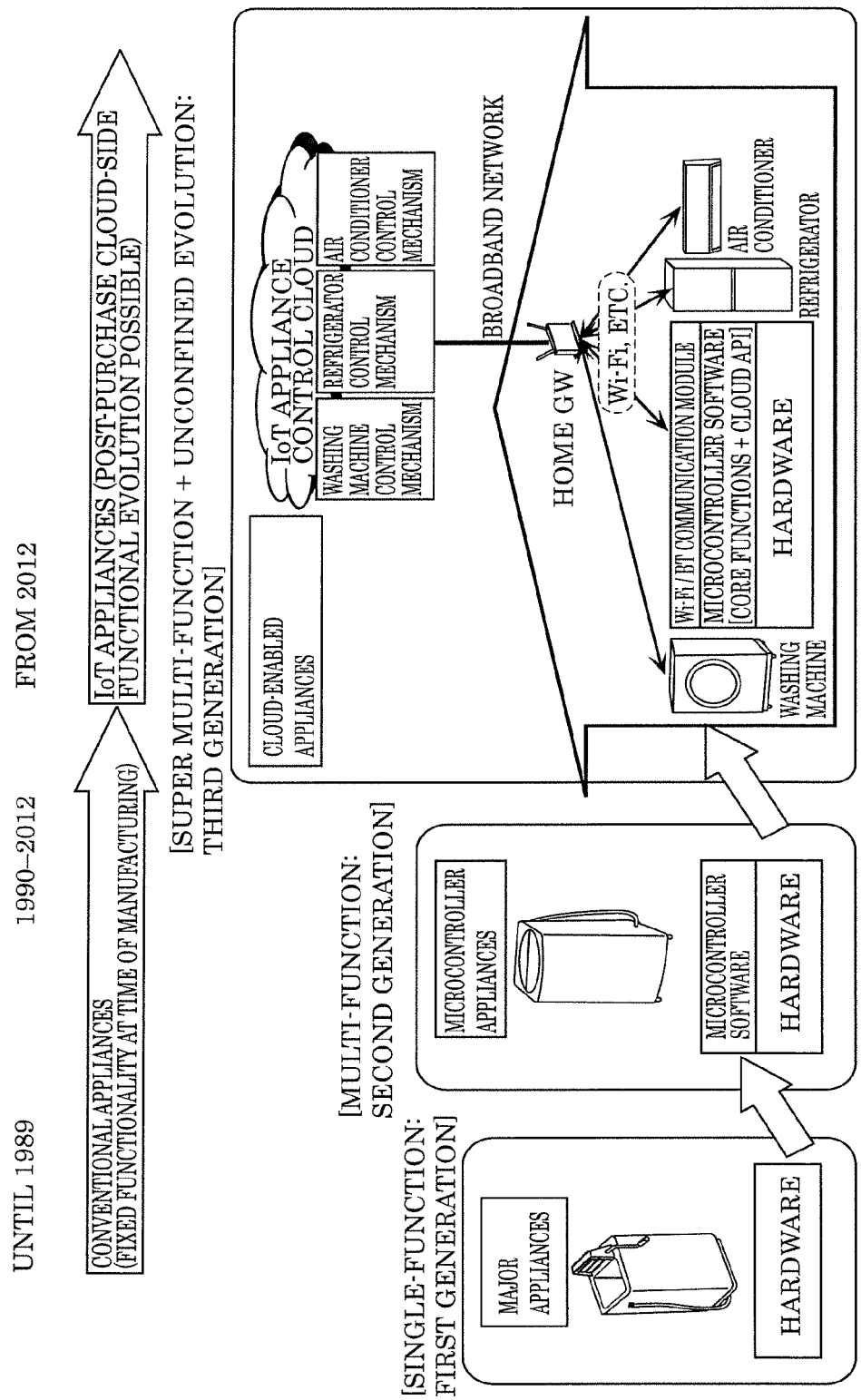
FIG. 1 is a diagram illustrating the evolution of household appliances.

A device management method according to one aspect of the present disclosure is executed in a server communicatively connected to a plurality of devices and a first operation device via a network, the first operation device associated with a first user identifier identifying a first user. The device management method includes: receiving, from the first operation device, a request to associate the first user identifier and a first device identifier identifying a first device included in the plurality of devices; and when, in correspondence information that is stored in a storage device and in which device identifiers identifying devices are associated with user identifiers identifying users, (i) the first device identifier is associated with a second user identifier different from the first user identifier and (ii) the first user identifier is associated with a second device identifier identifying a second device included in the plurality of devices and different from the first device, storing the second device identifier and the second user identifier in association with each other.

With this, when a request to associate the first device identifier and the first user identifier is received, using the correspondence information stored in the storage device, the second device identifier and the second user identifier are stored in association with each other. This makes it possible to efficiently associate users and devices.

Moreover, the storing may include: when, in the correspondence information, the first device identifier is associated with a second user identifier different from the first user identifier, transmitting, to the first operation device, a first inquiry checking whether a second user identified by the second user identifier is a member of a first user group to which the first user belongs; receiving a first response to the first inquiry transmitted, and when the first response received includes a response indicating that the second user is confirmed to be a member of the first user group, storing the first device identifier and the first user identifier in association with each other.

Moreover, in the storing, when the first response received includes a response indicating that the second user is not confirmed to be a member of the first user group, the first device identifier and the first user identifier may not be associated with each other, and the second device identifier and the second user identifier may not be associated with each other.

With this, since the first device identifier and the first user identifier are associated in accordance with the first response, which is the result of the first inquiry, it is possible to refuse requests for undesirable associations.

Moreover, in the storing, when the first response received includes a response indicating that the second user is confirmed to be a member of the first user group, a second inquiry checking whether the first user is a member of a second user group to which the second user belongs may be further transmitted; a second response to the second inquiry transmitted may be further received, and when the second response received includes a response indicating that the first user is confirmed to be a member of the second user group, the first device identifier and the first user identifier may be further stored in association with each other.

Moreover, in the storing, when the second response received includes a response indicating that the first user is not confirmed to be a member of the second user group, the first device identifier and the first user identifier may not be not associated with each other, and the second device identifier and the second user identifier may not be associated with each other.

With this, since the first device identifier and the first user identifier are associated in accordance with the second response, which is the result of the second inquiry, it is possible to refuse requests for undesirable associations.

Moreover, in the storing, when, in the correspondence information, the first device identifier is associated with a second user identifier different from the first user identifier, a third inquiry checking whether the first user and a second user identified by the second user identifier are a same person may be transmitted to the first operation device, a third response to the third inquiry transmitted may be received, and when the third response received includes a response indicating that the first user and the second user are confirmed to be the same person, the first user identifier and the second user identifier may be stored in association with each other.

Accordingly, since an inquiry is made as to whether the users are the same person, information obtained from a device associated with the same person can be used to control the device optimally for each user.

Moreover, in the storing, when, in the correspondence information, the second user identifier is associated with a third device identifier identifying a third device included in the plurality of devices and different from the first device and the second device, the third device identifier and the first user identifier may be further stored in association with each other.

This makes it possible to further efficiently associate users and devices.

Moreover, a device management method executed in a server communicatively connected to a plurality of devices and a first operation device via a network, the first operation device associated with a first user identifier identifying a first user, may include: receiving, from the first operation device, a request to associate the first user identifier and a first device identifier identifying a first device included in the plurality of devices; and when, in correspondence information that is stored in a storage device and in which device identifiers identifying devices are associated with user identifiers identifying users, (i) the first device identifier is associated with a second user identifier different from the first user identifier and (ii) the second user identifier is associated with a third device identifier identifying a third device included in the plurality of devices and different from the first device, storing the third device identifier and the first user identifier in association with each other.

With this, when a request to associate the first device identifier and the first user identifier is received, using the correspondence information stored in the storage device, the third device identifier and the first user identifier are stored in association with each other. This makes it possible to efficiently associate users and devices.

Moreover, in the receiving, the request may be received by receiving the first user identifier from the first operation device and receiving device-related information related to the first device from the first device or the first operation device. In the storing, the first device may be identified based on the device-related information obtained, a fourth inquiry may be transmitted, via the network, to the first device identified, and when a fourth response to the fourth inquiry transmitted is received from the first device or the first operation device, the first device identifier and the first user identifier may be stored in association with each other, and when the fourth response is not received, the first device identifier and the first user identifier may not be associated with each other.

This makes it possible to accurately associate devices and users.

Moreover, each of the plurality of devices may be communicatively connected to the network via a base station for long-distance wireless communication, and in the transmission of the fourth inquiry to the first device, the fourth inquiry may be transmitted to the first device via the base station.

With this, the device can receive the fourth inquiry via a long-distance wireless communication base station.

Moreover, the long-distance wireless communication may be low power, wide area (LPWA) communication.

With this, the device can receive the fourth inquiry via a LPWA base station.

These general and specific aspects may be implemented using a method, an integrated circuit, a computer program, or a computer-readable recording medium such as a CD-ROM, or any combination thereof.

Hereinafter, a non-limiting embodiment will be described in detail with reference to the accompanying drawings. However, unnecessarily detailed descriptions may be omitted. For example, detailed descriptions of well-known matters or descriptions of components that are substantially the same as components described previous thereto may be omitted. This is to avoid unnecessary redundancy and provide easily read descriptions for those skilled in the art.

Note that the inventors have provided the accompanying drawings and subsequent descriptions to facilitate sufficient understanding of the present disclosure by those skilled in the art, and are thus not intended to limit the scope of the subject matter recited in the claims.

Hereinafter, first, underlying knowledge forming the basis of the present invention and technical problems to be overcome by the invention will be described in greater detail, followed by description of an exemplary embodiment.

(Underlying Knowledge Forming the Basis of the Present Invention)

FIG. 1 is a diagram illustrating the evolution of household appliances.

More specifically, FIG. 1 illustrates the evolution of the architecture of household appliances (for example: major appliances such as washing machines and refrigerators; air conditioners; and humidifying air purifiers).

The first generation (before 1990) of household appliances were single-function products, as the hardware, such as the compressors and motors, was implemented through control logic made with large-scale integrated (LSI) circuits.

The second generation (from 1990 to around 2010) of household appliances were equipped with microcontrollers. Complex control of these household appliances was possible due to the implementation of microcontrollers and the creation of software for the microcontrollers. This made multi-function appliances a reality. However, after shipment of the appliances, it was not possible to change or add functions by changing the microcontrollers.

The third generation (from 2012 and on) of appliances are cloud-enabled appliances equipped with communication functionality, such as Wi-Fi (registered trademark) and/or Bluetooth (registered trademark; hereinafter referred to as "BT"), which allows them to connect to an Internet of Things (IoT) appliance control cloud through a home gateway (GW) and a broadband network. Accordingly, even after shipment of the appliances, the software for the microcontrollers in the appliances can be updated from the cloud. Moreover, even after shipment, functions can be added or changed by updating the control mechanism for the appliance cloud-side, without updating the microcontroller software. As used herein, an "IoT appliance control cloud" is a cloud (aggregate of a server and a network) that controls appliances through a communication channel such as a broadband network, and is one example of a cloud-based service.

Figure 2:
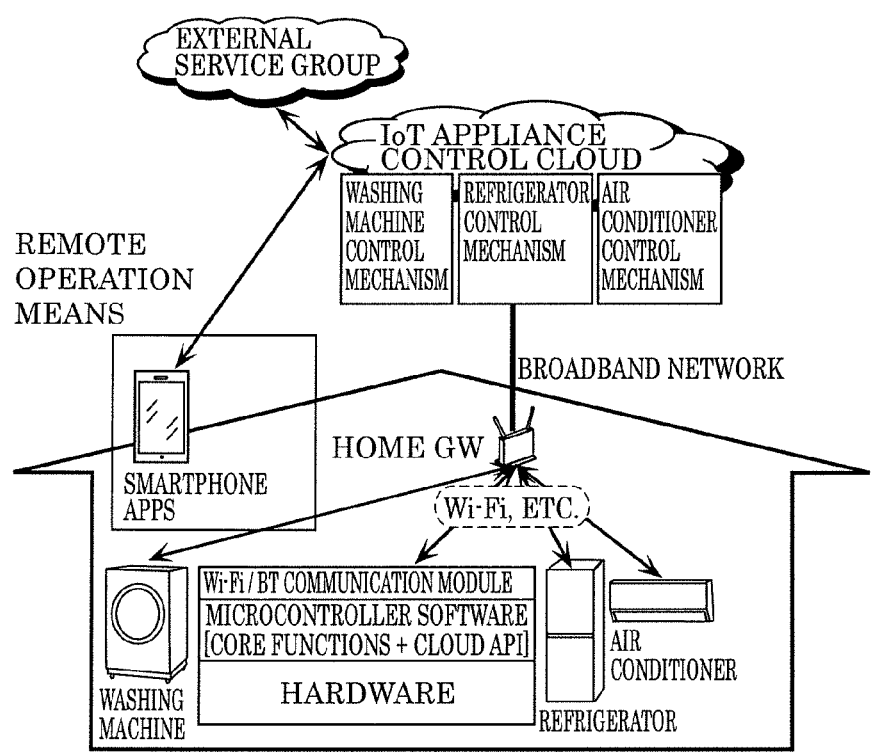
FIG. 2 is a diagram illustrating an example of third generation household appliance architecture and external service linkage.

FIG. 2 is a diagram illustrating an example of third generation household appliance architecture and external service linkage.

With third generation cloud-enabled household appliances (major appliances such as washing machines and refrigerators; air conditioners; and humidifiers), it is possible to access each household appliance in a household from smartphone applications (apps) via each household appliance control mechanism in the IoT appliance control cloud.

Accordingly, a user can, for example, remotely monitor the operation state and remotely control operations (e.g., turn on, stop, adjust temperature, dispense detergent, etc.) of each household appliance using smartphone apps. By linking an external service group such as an e-commerce service cloud or monitoring service cloud, and each household appliance control mechanism in the IoT appliance control cloud, it is possible to control household appliances through various types of cloud services, or retrieve operation information (logs, etc.) of household appliances and use this information in external services.

Figure 3:
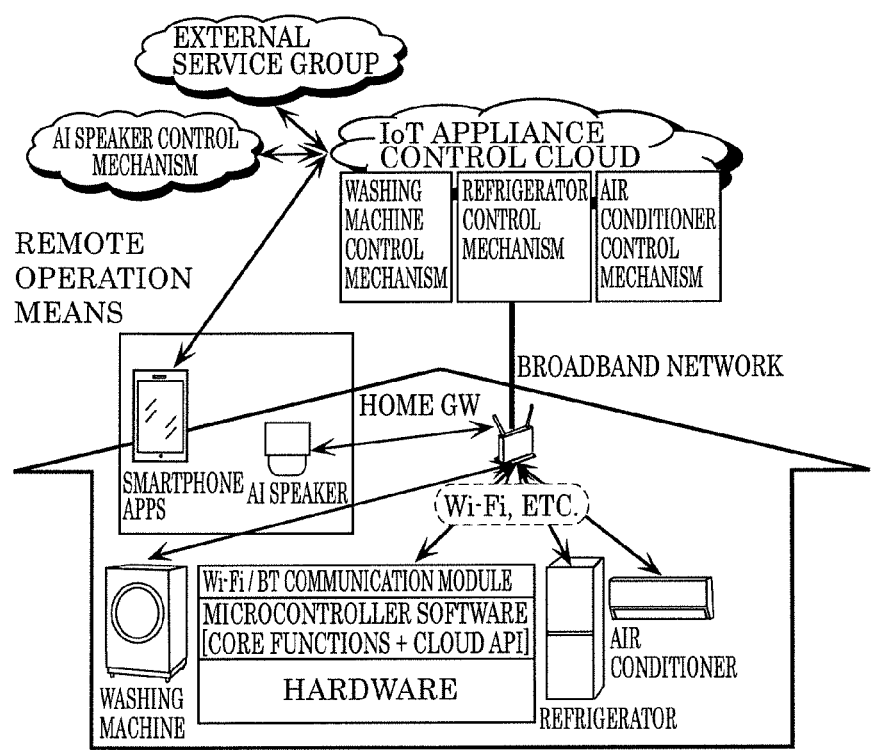
FIG. 3 is a diagram illustrating an example of third generation household appliance architecture and AI speaker linkage.

FIG. 3 is a diagram illustrating an example of third generation household appliance architecture and artificial intelligence (AI) speaker linkage.

With third generation cloud-enabled household appliances (major appliances such as washing machines and refrigerators; air conditioners; and humidifiers), it is possible for a user to remotely control each household appliance from an AI speaker through voice interaction by accessing an AI speaker control mechanism in a cloud from a voice-interactive AI speaker via a home GW, and this AI speaker control mechanism accessing each household appliance control mechanism.

(Technical Problems to be Solved)

Figure 4:
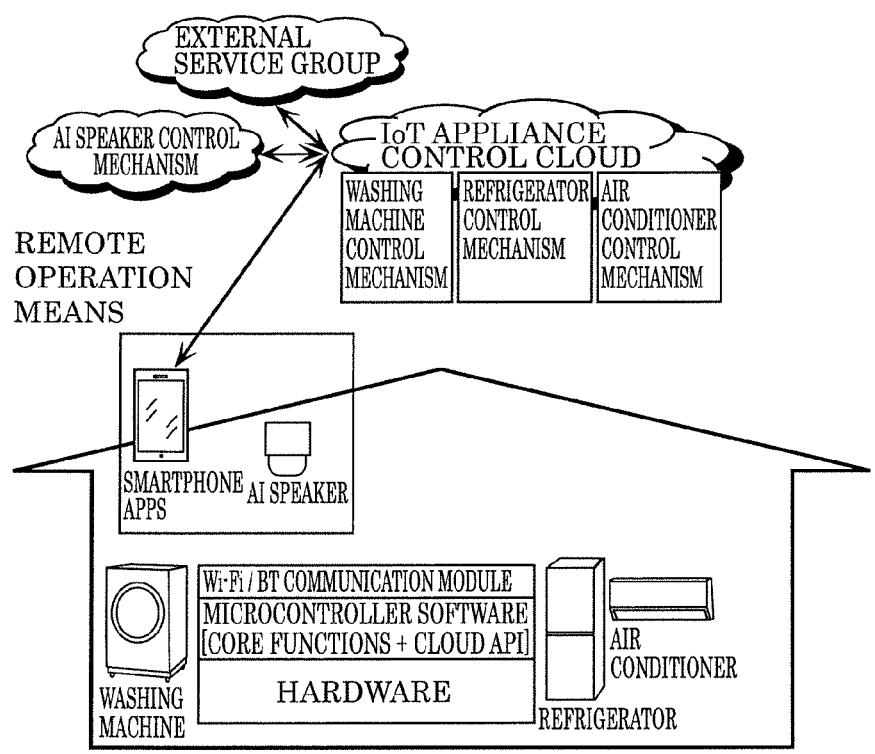
FIG. 4 is a diagram illustrating a first technical problem of third generation household appliances.

FIG. 4 is a diagram illustrating a first technical problem of third generation household appliances. The first technical problem is that it is not possible to use some functions of third generation appliances in a household without a Wi-Fi GW.

If a household does not have a home GW such as a Wi-Fi home GW and thus cannot connect to a broadband network, even if such a household purchases a third generation cloud-enabled household appliance (a major appliance such as a washing machine or a refrigerator; an air conditioner; or a humidifier), the cloud-enabled appliance cannot connect to an IoT appliance control cloud. In such cases, since the appliance cannot be accessed from the IoT appliance control cloud, it is not possible to achieve the objective set by third generation household appliances of increasing the value added to a product by post-purchase cloud-side functional advancements. Thus, in such cases, despite being an IoT appliance, the third generation household appliance can only be used as a conventional second generation household appliance (microcontroller household appliance) characterized by fixed functionality that is fixed at the time of manufacturing.

Figure 5:
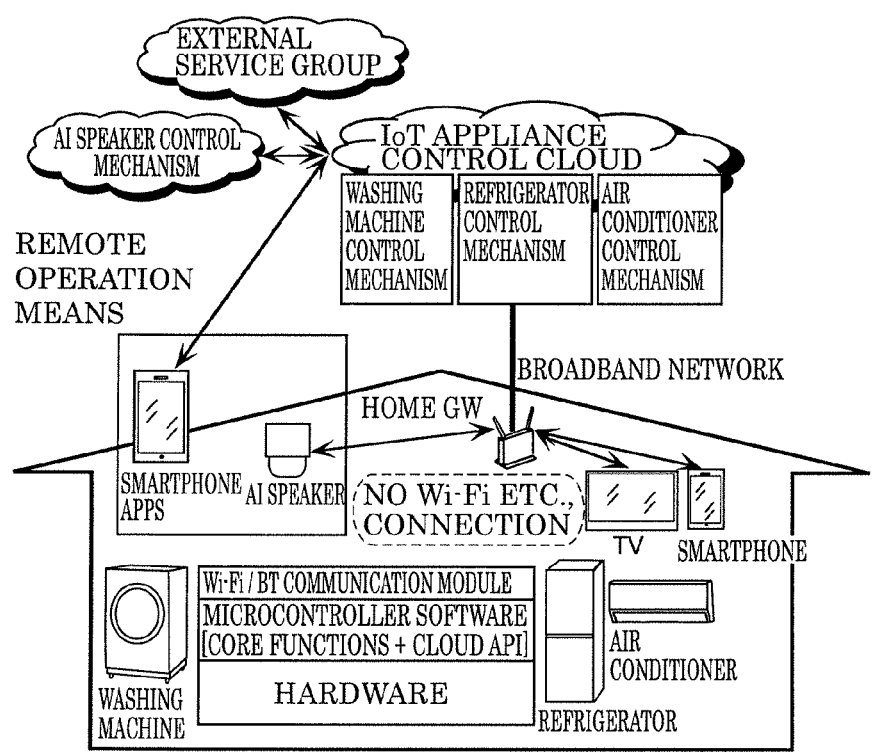
FIG. 5 is a diagram illustrating a second technical problem of third generation household appliances.

FIG. 5 is a diagram illustrating a second technical problem of third generation household appliances. The second technical problem is that despite having a Wi-Fi GW in their household, users do not connect third generation household appliances to their household Wi-Fi GW.

When information devices such as smartphones, tablets, and PCs, or AI speakers are not equipped with a function for connecting to the internet via, for example, Wi-Fi, the user is not capable of using the desired original functionality of these products. Some smartphones or AI speakers cannot even be used without connecting to the Internet and configuring user information (mail address, account, etc.). Since the user has purchased the device precisely because they want to use the functions thereof, the user will undoubtedly configure the user ID settings and/or Wi-Fi settings and connect the device to the internet.

In regard to smart TVs, as video streaming services such as Youtube, Netflix, Amazon Prime Video, etc., are becoming increasingly popular, users (or installers) often configure the Wi-Fi settings in order to be able to watch the video programming provided by such services on a large-screen TV.

In regard to cloud-enabled household appliances, users often do not initially configure the internet connections settings because they have configured tedious Wi-Fi settings and found the available internet services difficult to understand, or because they do not value the internet services enough to consider them to be an indispensable function.

Another common scenario is when the user configures the Wi-Fi settings immediately after purchasing a cloud-enabled household appliance, but finds the user friendliness of the internet services to be relatively low, and thus chooses to disconnect the appliance despite taking the time to initially connect it, or chooses not to reconnect the appliance after it happens to disconnect.

Therefore, it is possible to develop various types of cloud services for information devices and AI speakers with the assumption that they are connected to the internet, since it is possible to expect a connection rate of approximately 100%, but a connection rate of 100% cannot be expected for TVs or household appliances.

FIG. 6 is a diagram illustrating a network connection rate of appliances with a built-in network function (audiovisual (AV) appliances and household appliances).

The above-mentioned cloud-enabled household appliances are capable of providing customer value that microcontroller household appliances do not provide, by connecting to an IoT appliance control cloud and using various types of cloud services, due to the cloud-based household appliance being equipped with a means of communication such as Wi-Fi or Bluetooth. Thus, it is possible to improve customer satisfaction, since it is possible to provide customer value that outweighs the increase in cost resulting from equipping cloud-enabled household appliances with a means of communication such as Wi-Fi.

However, a technical problem of the above-mentioned means of communication is that, in most cases such as those as described below, the user possessing the device forgoes configuring the settings, that is to say, a cloud-enabled household appliance that is not connected to the cloud is only capable of providing the same customer value as a microcontroller household appliance.

(1) In order to connect to Wi-Fi, the user needs to prepare a Wi-Fi access point in their home. However, users that only connect to the internet from their smartphone, that is to say, users that only use a communication network provided by a telecommunications carrier may not have a Wi-Fi access point in their home.

(2) Even when there is a Wi-Fi access point in the user's home, it is difficult to say that every person is capable of easily configuring the settings for connecting to Wi-Fi, due to the complexity of the connection settings of home appliances, e.g., a connection process starting off with inputting a password.

The network connection rate of cloud-enabled TVs or cloud-enabled household appliances on the Japanese market in 2017, as illustrated in FIG. 6, did not exceed 50%, meaning that many users actually used their cloud-enabled household appliances as microcontroller household appliances.

Figure 7:
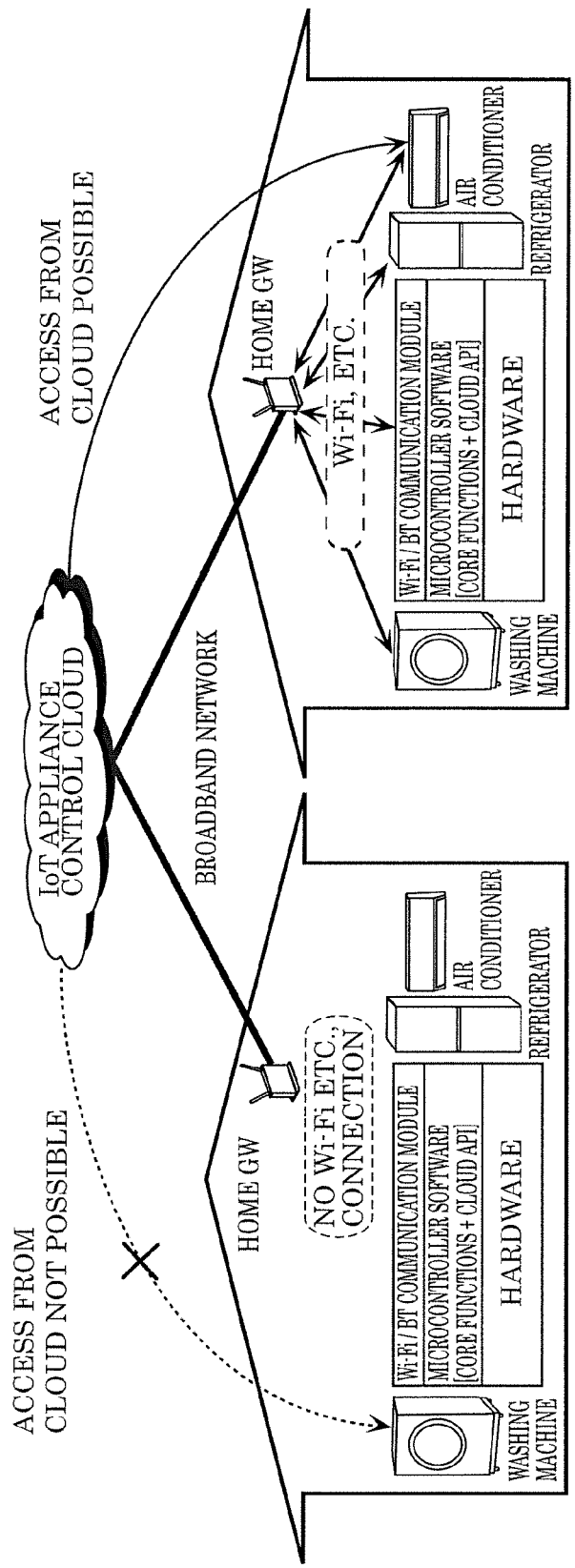
FIG. 7 is a diagram illustrating network connectivity, etc., for cloud-enabled household appliances.

FIG. 7 is a diagram illustrating network connectivity, etc., for cloud-enabled household appliances.

When a cloud-enabled household appliance is not connected to a cloud, it is not possible to access the cloud-enabled household appliance from an IoT appliance control cloud. Thus, it is not possible to enjoy the functions that increase the value added to a product by post-purchase cloud-side functional advancements, which is possible with cloud-enabled household appliances.

Therefore, despite being cloud-enabled household appliances, only those functions that are equivalent to conventional microcontroller household appliances characterized by fixed functionality that is fixed at the time of manufacturing can be used.

Cloud household appliances are originally designed to be able to take action in case of a recall, such as instructing an emergency stop of operation, remotely updating firmware, or sending a notification email to the user of the recalled appliance. However, in the current situation in which connection rates are low, manufacturers are often not capable of utilizing such functions to control cloud-enabled household appliances from these IoT appliance control clouds. Thus, with respect to all applicable cloud-enabled household appliances, functionality such as remote maintenance or recall notifications that can be implemented when remote monitoring and controlling is possible, is not sufficiently implemented.

Even in these times in which it is difficult in practice to have cloud-enabled household appliances equipped with Wi-Fi or BT communication means or the like be connected to a cloud, various other means of communication for making sensors and devices other than appliances IoT-compatible have become available.

In particular, the wireless means of communication developed for IoT applications known as low-power wide-area (LPWA) has come into practical use and is receiving attention as a communication method suitable for the IoT era.

A characteristic of LPWA wireless technology is that, compared to Long-Term Evolution (LTE), it is possible to reduce the cost of both wireless circuits and infrastructure, since it is possible to (i) reduce terminal costs through small-scale semiconductor packaging, and (ii) reduce the number of base stations by using low-rate modulation that yields an exceedingly long communication distance (up to 10 km). On the other hand, since LPWA uses a method that reduces transfer rates to improve reception sensitivity, the volume of data that can be transferred is low.

By equipping appliances with LPWA wireless technology, users are no longer required to sign up for an internet connection, appliances are directly connected to base stations, and it may be possible to greatly reduce the cost of services connected to a cloud server.

LPWA is divided into cellular LPWA and non-cellular LPWA. Cellular LPWA is provided as one cellular line (such as LTE), using a frequency band assigned by a cellular carrier (licensed band).

Non-cellular LPWA uses LPWA wireless technology by taking advantage of the fact that channel usage fees are no longer necessary when using non-licensed bands that exist in each country. Since non-licensed bands are shared between other wireless systems, restrictions preventing the channels from being monopolized are stipulated in each country's radio regulations.

Representative LPWA methods will be described below.

FIG. 8 is a table illustrating characteristics of communication methods (Wi-Fi, LPWA) that can be used by always-connected IoT household appliances.

(1) Cellular LPWA (1-1) NB-IoT

NB-IoT has its origin in GSM (registered trademark) (2G), adopts the advantages of low transfer rates and LTE communication sequences, and is dedicated to data transfer for IoT applications. By having the same channel spacing as GSM of 200 kHz, switching to operating on a GSM channel is made easy. Sensitivity is improved by having a low uplink transmission peak rate of 62.5 kbps, and receiving and storing data through repeated transmission (64 times). The maximum link budget is high at 130 dB. By limiting transmission power to 100 mW (GSM's transmission power is 2 W), it is possible to limit peak current and use NB-IoT with a single battery.

(1-2) LTE-M (CAT-M)

LTE-M (CAT-M) has its origin in LTE (4G), and performs communication using the smallest channel spacing of LTE (1.4 MHz). Since this standard is based on the slot configuration of LTE, it is possible to use the standard together with conventional LTE communication slots. Sensitivity is improved by a low uplink transmission peak rate of 1 Mbps, and receiving and storing data through repeated transmission. The maximum link budget is 130 dB.

Since transfer rates are rather high, power consumption when battery-driven is at a minimum. Transmission power is 200 mW.

(2) Non-Cellular LPWA (2-1) LoRa

LoRa uses conventional low-power wireless bands (ISM bands), but reception sensitivity is improved through ultra-low-rate modulation. Ultra-low-rate modulation is implemented by using a special spread-spectrum modulation called LoRa chirp modulation. Characteristics of LoRa chirp modulation are a low transfer rate of 250 bps, a spread bandwidth of 125 kHz, and a high sensitivity strong against interfering noise. Moreover, communication capacity is improved as it is possible to select multiple data rates in the same bandwidth and simultaneously receive this data on the same channel. The maximum link budget is 149 dB. Transmission power is 20 mW.

LoRa retains the characteristics of conventional low-power wireless technology (low power and low-current peaks), making it possible to operate with one battery for ten years or with a coin cell.

Specifications have been standardized through the LoRa Alliance, making interconnection between operators possible.

(2-2) SIGFOX

SIGFOX uses conventional low-power wireless bands (ISM bands), but reception sensitivity is improved through ultra-low-rate modulation. Ultra-low-rate modulation is implemented through narrowband FSK, and the problem of frequency error is overcome through base-station-side digital demodulation processing. SIGFOX modulation has a fixed uplink rate of 100 bps and a fixed downlink rate of 600 bps. The influence of interfering noise is avoided through multiple transmissions on different frequencies. Due to the fixed rates and simultaneous multiple receptions not being possible, communication capacity is relatively small. The maximum link budget is 158 dB. Transmission power is 20 mW.

SIGFOX retains the characteristics of conventional low-power wireless technology (low power and low-current peaks), making it possible to operate with one battery for ten years or with a coin cell.

SIGFOX has proprietary specifications, and its base stations are monopolized by SIGFOX1.

Since SIGFOX only allows one-way communication, it can be used for IoT sensors, but it is not suitable for IoT household appliances.

As illustrated in FIG. 8, a combination of LPWA and Wi-Fi technologies is considered to be appropriate for making always-connected IoT household appliances a reality. However, due to the three LPWA methods described above having different characteristics, cost increases when communication quality is prioritized, and conversely when cost is prioritized, communication quality is poor, risking the inability to ensure stable communication. Accordingly, it is difficult to select a single LPWA method for always-connected IoT appliances.

Embodiment

Hereinafter, devices capable of connecting to a control cloud and being controlled accordingly will be described.

Figure 9:
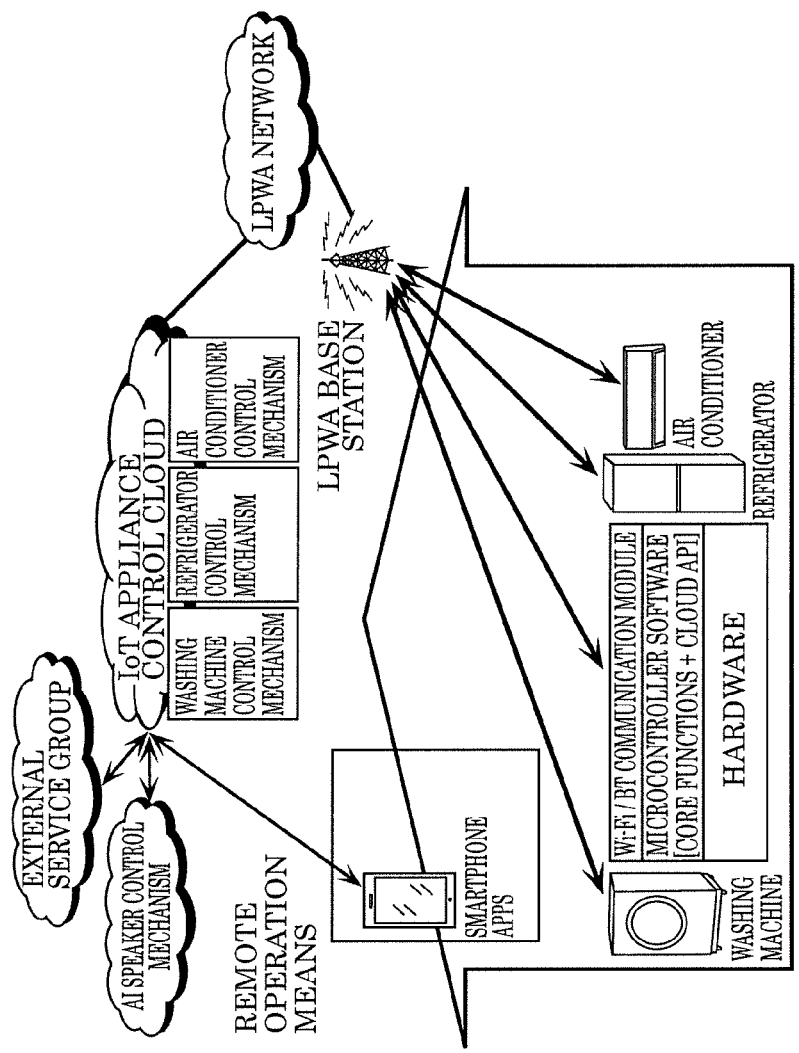
FIG. 9 is a first diagram illustrating fourth generation household appliance (always-connected IoT appliance) architecture and external service linkage.

FIG. 9 is a first diagram illustrating fourth generation household appliance (always-connected IoT appliance) architecture and external service linkage. Household appliances include, for example, major appliances such as washing machines and refrigerators, as well as air conditioners and humidifying air purifiers, and are also simply referred to as devices.

In order to overcome the technical problems associated with third generation household appliances, it was necessary for all users of household appliances to have a Wi-Fi GW, necessary to develop services that incentivized users to connect their household appliances to the internet and continue to use the services, and necessary to make Wi-Fi settings easy to configure.

However, with the emergence of various means of communication in recent years, the means of communication known as low-power wide-area (LPWA) is being advocated and garnering attention because of its capability to connect appliances to a cloud more easily than before.

LPWA is characterized by being usable without requiring users to configure any settings, an exceedingly long communication distance (up to 10 km), and invariable connectivity to a base station as long as the device has reception.

With fourth generation household appliances (always-connected IoT appliances), equipping the household appliances with LPWA technology makes cloud connection and post-purchase cloud-side expansion of functionality possible without requiring the user to have a Wi-Fi GW and configure tedious Wi-Fi settings.

Figure 10:
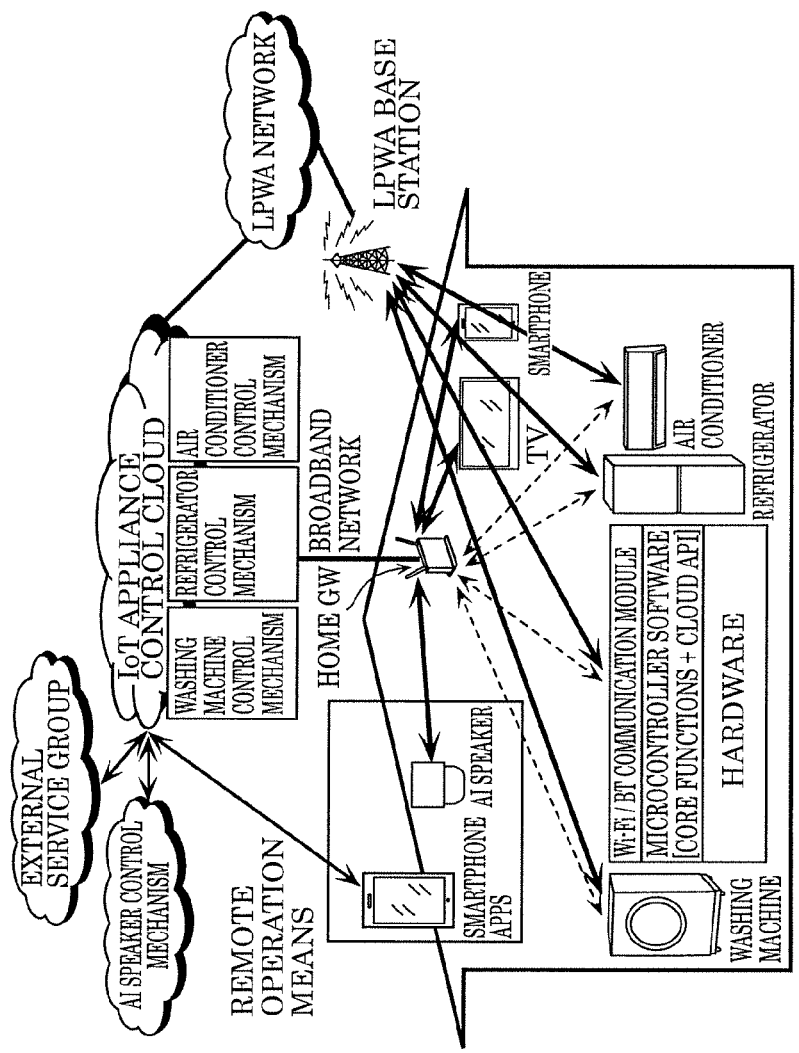
FIG. 10 is a second diagram illustrating fourth generation household appliance architecture and external service linkage.

FIG. 10 is a second diagram illustrating fourth generation household appliance architecture and external service linkage.

While LPWA has the outstanding features stated above, the volume of data that can be transferred is low compared to Wi-Fi or LTE or the like, since it utilizes a method that reduces transfer rates to improve reception sensitivity. Thus, in fourth generation household appliances (hereinafter also referred to as "always-connected IoT appliances"), using the Wi-Fi technology found in third generation household appliances along with LPWA technology enables application-appropriate communication.

Figure 11:
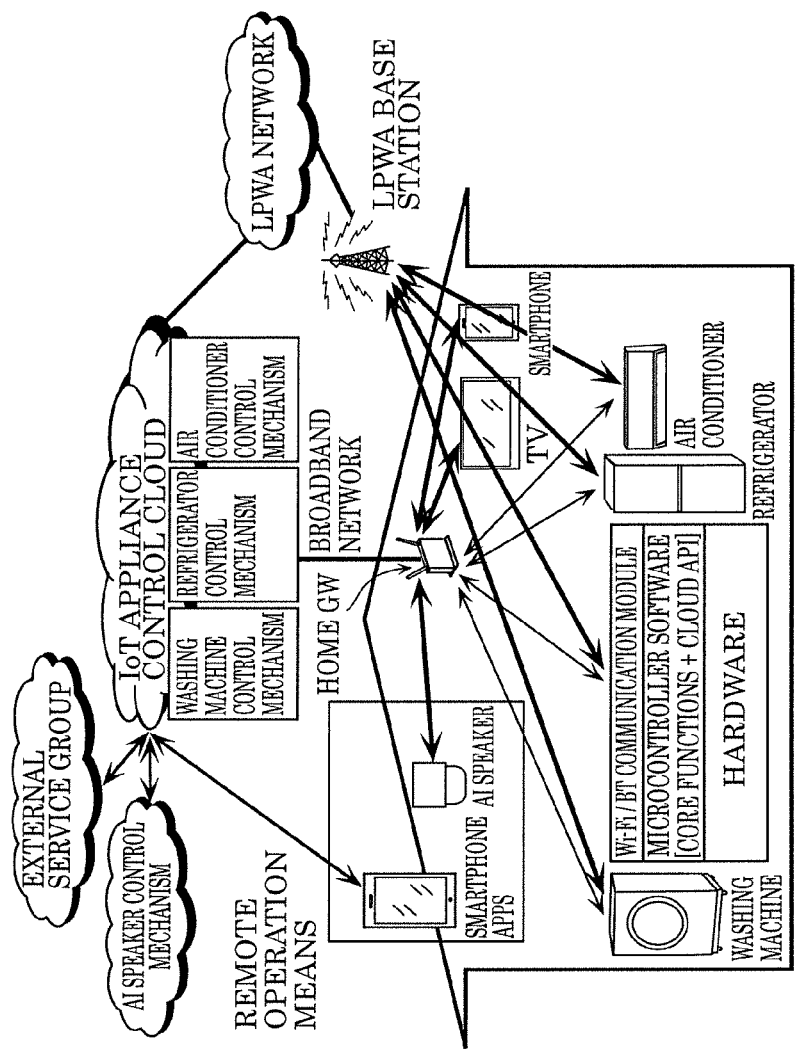
FIG. 11 is a third diagram illustrating fourth generation household appliance architecture and external service linkage.

FIG. 11 is a third diagram illustrating fourth generation household appliance architecture and external service linkage.

With regard to compelling users to configure tedious Wi-Fi settings, which was one major technical problem associated with third generation household appliances, the process of configuring Wi-Fi settings can be simplified by using LPWA, as shown via the following examples.

(1) If the Wi-Fi settings are input into a cloud, fourth generation household appliances (always-connected IoT appliances) will use LPWA to obtain the Wi-Fi settings from the cloud and connect to a Wi-Fi GW.

(2) If the Wi-Fi settings are input into a single fourth generation household appliance, the appliance will transmit the Wi-Fi settings to other devices in the home via LPWA, and the other devices will use those settings to connect to the Wi-Fi GW.

Figure 12:
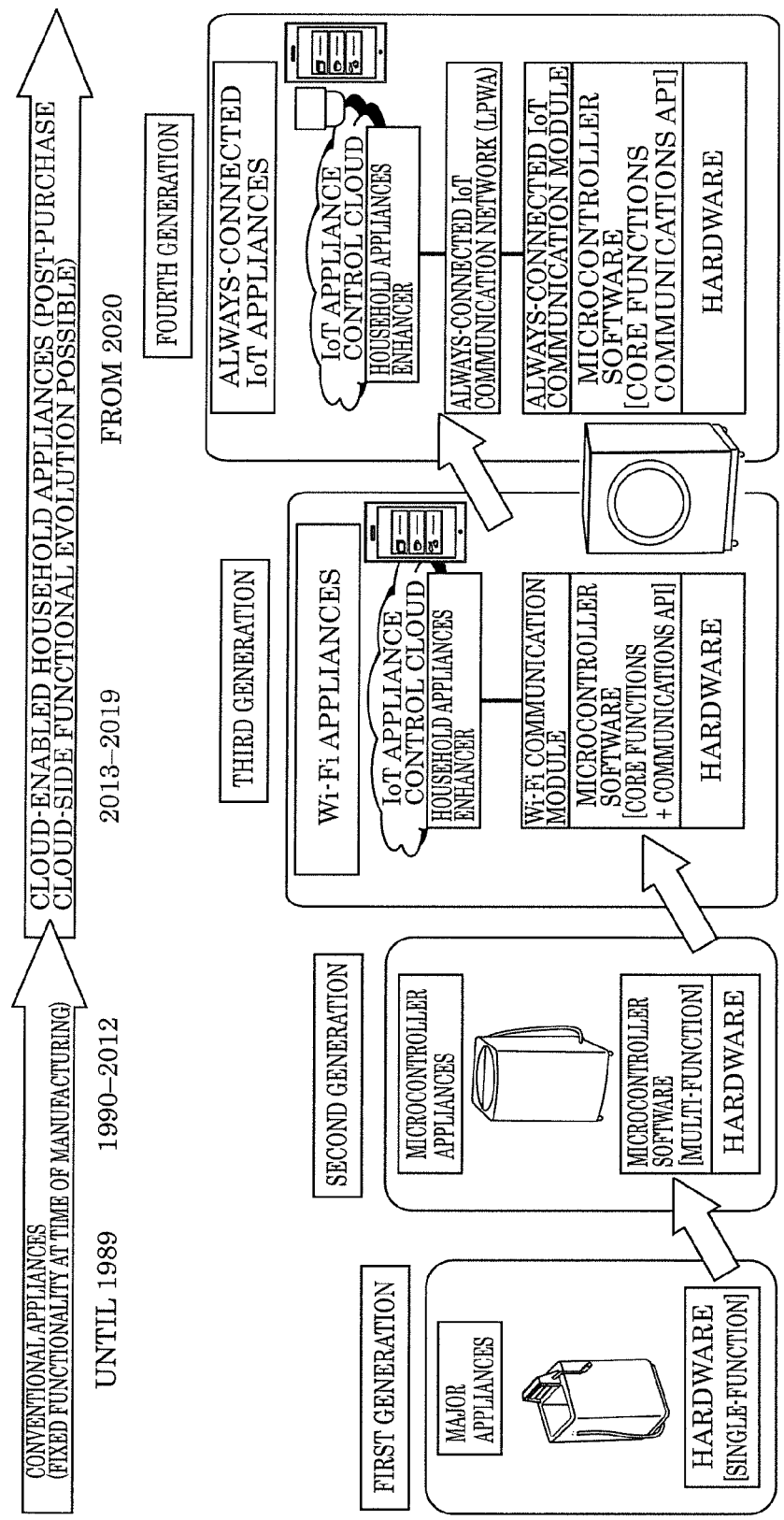
FIG. 12 is a diagram illustrating the evolution of household appliance architecture.

FIG. 12 is a diagram illustrating the evolution of household appliance architecture.

The first generation (before 1990) of household appliances were single-function products configured of mechanical parts such as the compressor and motor, and control logic.

The second generation (up until around 2010) of household appliances were equipped with microcontrollers. Complex control of these household appliances was possible through causing the microcontrollers to execute microcontroller software. Accordingly, the second generation of household appliances were multi-function. However, with the second generation of household appliances, after shipment of the household appliances, it was difficult to update and add functions by updating the microcontroller software.

The third generation (from 2012 and on) of appliances were cloud-enabled appliances equipped with a communication function, such as Wi-Fi and/or Bluetooth, which allowed them to connect to an IoT appliance control cloud through a GW and a broadband network. Accordingly, even after shipment, functions in cloud-enabled appliances could be added or updated by updating the microcontroller software in the appliance from an IoT appliance control cloud and by updating the control mechanism for the appliance cloud-side, without updating the microcontroller software.

However, with, for example, Wi-Fi, it is difficult to connect all shipped products, and in many cases, cloud functions cannot be used.

The fourth generation (2020 and after) of appliances are always-connected IoT appliances having an always-connected feature achieved through, for example, LPWA. Accordingly, since all shipped products can be connected, it is believed that all products will be able to use cloud functions.

Figure 13:
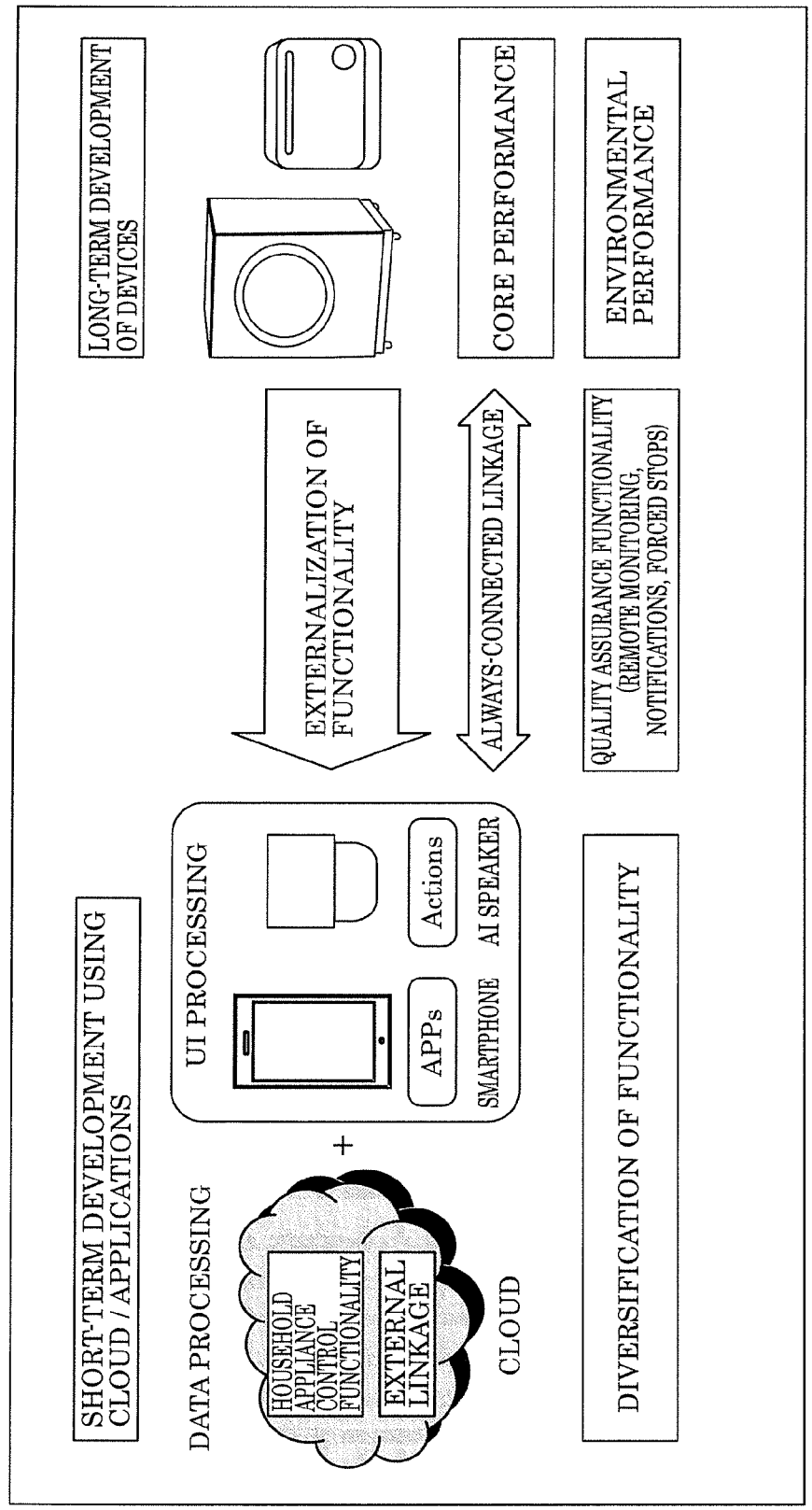
FIG. 13 is a diagram illustrating the division of functions (externalization of functions) in fourth generation household appliances.

FIG. 13 is a diagram illustrating the division of functions (externalization of functions) in fourth generation household appliances.

With fourth generation cloud-enabled household appliances (major appliances such as washing machines and refrigerators; air conditioners; and humidifying air purifiers), by a cloud (server) and a UI device such as a smartphone being always connected, it is possible to divide functions among the cloud, the smartphone, and a device such as a household appliance (i.e., it is possible to externalize functions). Accordingly, even after shipment of the device, the functions and performance of the household appliance can be improved by updating and/or adding functions cloud-side.

Moreover, with fourth generation cloud-enabled household appliances, since it is easy for all shipped products to be always-connected, remote monitoring and remote control of all products after shipment is also possible. Accordingly, vastly improved quality assurance functionality is anticipated. Moreover, even if a product is unfortunately recalled or the like, since the device is connected to a cloud even after shipment, the device can be traced via the cloud, making it possible to, for example, announce the malfunction of a recalled product and/or force it to shut down. This will significantly reduce costs associated with product recall.

Figure 14:
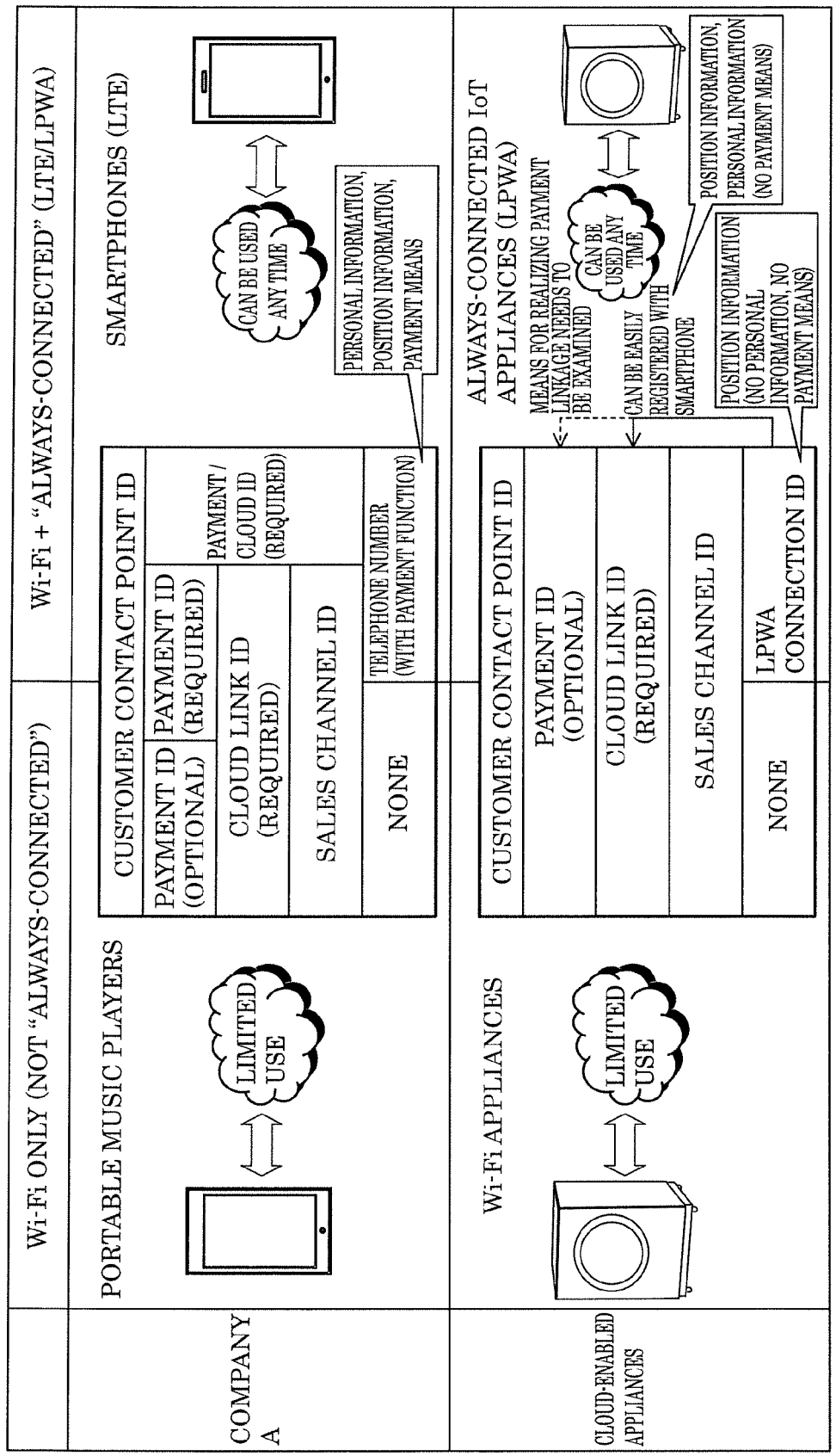
FIG. 14 is a diagram illustrating the relationship between the four tiers of customer contact points and always-connected IoT appliances.

FIG. 14 is a diagram illustrating the relationship between the four tiers of customer contact points and always-connected IoT appliances.

Mobile carriers constructed a complete platform (device ID, personal information, position information, means of payment, etc.) with feature phones.

Next, with the emergence of mobile audio players, smartphones, and the like, cloud-service-side was taken over, and the ecosystem constructed by mobile carriers destabilized.

In the future, with the emergence of fourth generation IoT appliances that are equipped with always-connected functionality, by securing a device ID (cloud link ID) that enables the device to be always connected to a cloud, it is believed that this can be utilized in the establishment of customer contact points.

Figure 15:
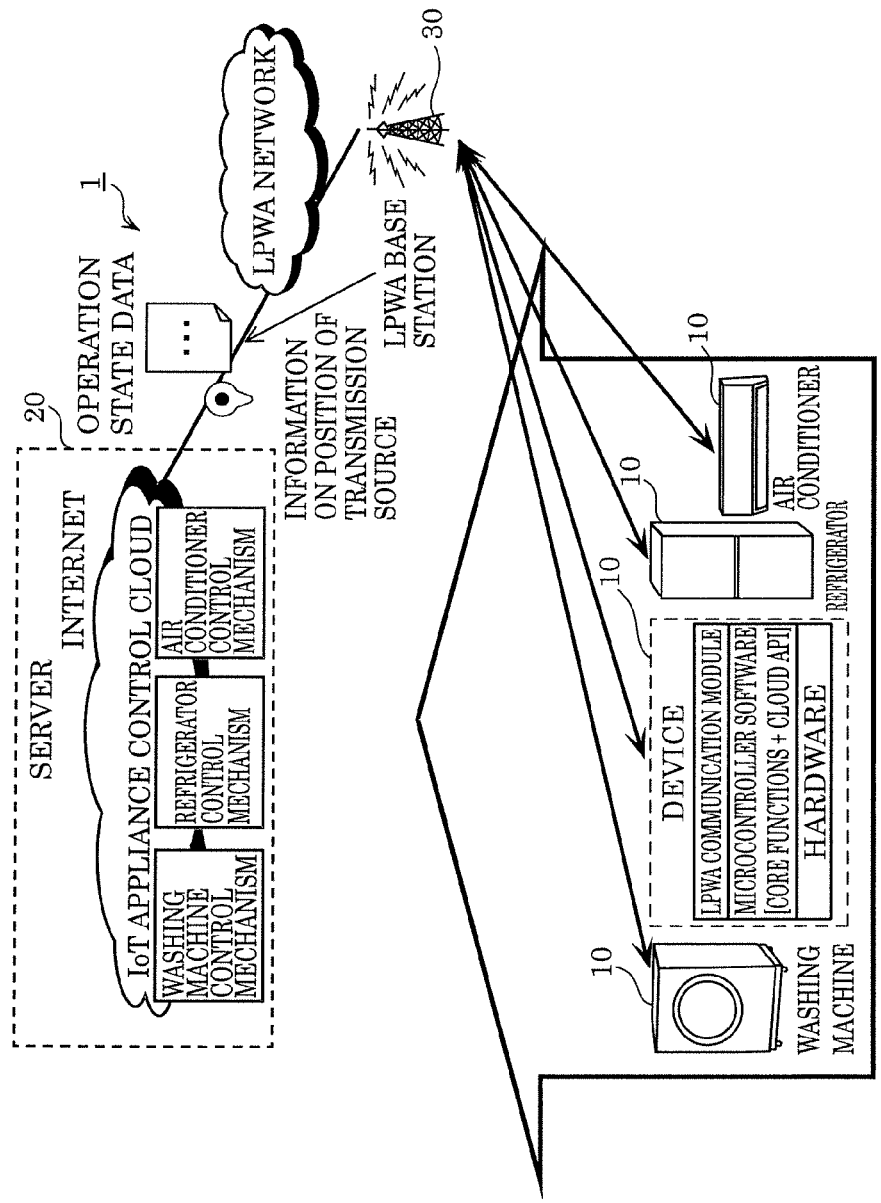
FIG. 15 is a diagram illustrating a workflow of collecting data indicating operation states of appliances in a device management system.

FIG. 15 is a diagram illustrating a workflow of collecting data indicating operation states of appliances in a device management system. FIG. 16 is a table illustrating a specific example of operation information and unique information for an appliance received by a cloud.

As illustrated in FIG. 15, device management system 1 includes server 20, base station 30, and a plurality of devices 10.

Server 20 is communicatively connected to a network, such as the internet, and functions as an IoT appliance control cloud. Functions performed by server 20 will be described in greater detail later.

Base station 30 is, for example, an LPWA base station, and is used in long-distance wireless communication that allows IoT appliances to be always connected to a network. Although only one base station 30 is illustrated in the example in FIG. 15, device management system 1 may include a plurality of base stations 30.

Each device 10 is a fourth generation household appliance described above, that is to say, an always-connected IoT appliance. Moreover, each device 10 communicatively connects to one base station 30 among a plurality of base stations 30. Each device 10 sequentially transmits, to server 20 via the one base station 30, operation state data (hereinafter also referred to as "operation information") indicating a current operation state of the device 10, using an LPWA communication module included in the device 10.

Note that as illustrated in FIG. 16, operation information includes the data fields "device unique ID", "communication module ID", "communication module type", "transmission date and time", "power state", "counting start date and time of operation count", "operation count", etc. Other than these data fields, the operation information may include software version information, information in which difference information for when, for example, a change is made to a component, is managed, menu settings configurations, mode settings, etc. With this, server 20 can more accurately manage what kind of states each device 10 is operating in. Moreover, the data fields included in the operation information may be set with a priority level or transmission rate of occurrence. The amount of data transmitted can be reduced by, for example, applying different settings to different fields, such as setting a field to be written each time data is transmitted, setting a field to be written weekly, and setting a field to be written only when there is a change. In cases in which the communication module operates off an internal battery rather than an external power source in particular, it is beneficial to transmit only important data fields in order to save power.

Next, upon sequentially receiving the operation information, base station 30 sequentially transmits, to server 20, unique information which is unique to base station 30, together with the sequentially received operation information.

Here, when base station 30 forwards the operation information, the unique information that is transmitted together with the operation information is position information indicating the position at which base station 30 that transmitted the unique information is disposed, as indicated in the bottom row in the table in FIG. 16. The unique information is not limited to position information, and may be an identifier that identifies base station 30. Hereinafter, position information as an example of unique information will be given.

Next, the configuration of device 10 and the configuration of server 20 will be described.

Figure 17:
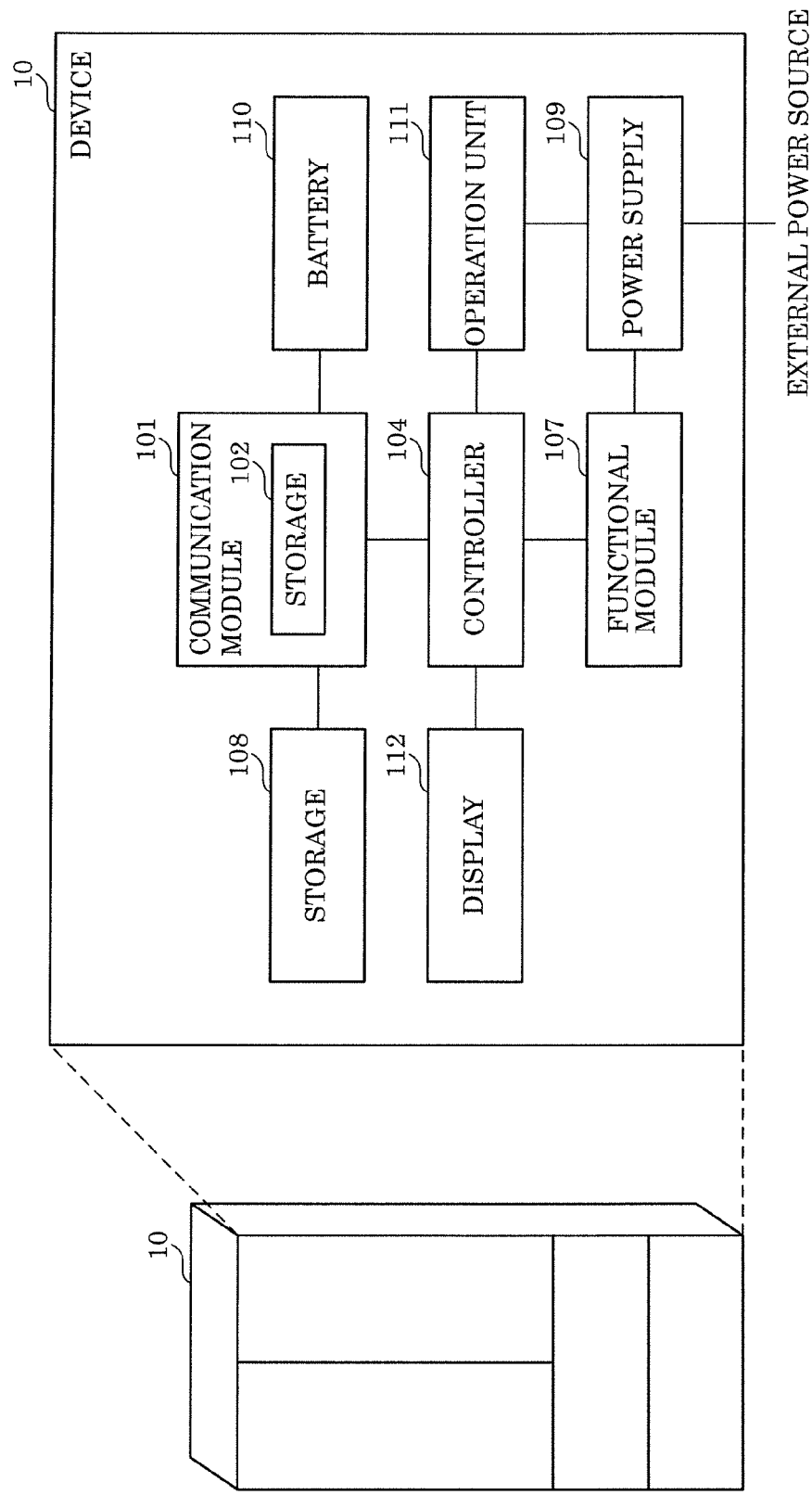
FIG. 17 illustrates a block diagram of a device which is an IoT appliance.

FIG. 17 illustrates a block diagram of device 10, which is an IoT appliance.

As illustrated in FIG. 17, device 10 includes communication module 101, controller 104, functional module 107, storage 108, power supply 109, battery 110, operation unit 111, and display 112.

Communication module 101 connects to server 20 that manages device 10 through a plurality of mutually different networks. Communication module 101 is, for example, a communication module for performing long-distance wireless communication, such as an LPWA communication module. Note that communication module 101 may include a communication module that performs, among the three methods of LPWA and Wi-Fi described with reference to FIG. 8, communication through at least one method of LPWA. In other words, communication module 101 may include a plurality of communication modules that respectively perform communication through different methods of LPWA, and may include a plurality of communication modules that respectively perform communication through LPWA and Wi-Fi. Communication module 101 includes storage 102 that stores the module ID of the communication module. When communication module 101 includes a plurality of communication modules that use different communication methods, storage 102 stores module IDs for each of the plurality of communication modules.

Controller 104 generates operation information for device 10, and transmits the generated operation information to server 20 using communication module 101. More specifically, controller 104 may generate operation information including a power state indicating whether power supply 109 of device 10 is powered on or off, by obtaining the power state, may generate operation information including an operation count indicating the number of times device 10 has been operated, by counting the number of operations, and may generate operation information including function information indicating the function being fulfilled by functional module 107. The operation information may include the various data fields described in FIG. 16. Moreover, controller 104 may cause display 112 to display an image based on the information received from server 20 via communication module 101.

Functional module 107 is a module that fulfills a function of device 10.

Storage 108 is a storage device that stores the unique ID of each device 10.

Power supply 109 receives power from an external power source, and supplies power to each component in device 10.

Battery 110 is a battery that supplies power to, for example, communication module 101. Battery 110 may be a primary cell or a secondary cell.

Operation unit 111 is an input device that receives an operation input made by a user to operate device 10. When device 10 has a door or lid that opens and closes, like on a refrigerator, microwave oven, or rice cooker, operation unit 111 may be the door or lid.

Display 112 is a display device that displays a variety of information as images.

Next, the configuration of device 10 will be described in greater detail, using a refrigerator as an example.

Even though device 10, exemplified here as a refrigerator, is connected to a network as an IoT device, device 10 is still used as an appliance. Accordingly, device 10 includes a variety of modules for realizing its original functionality as an appliance. In the example of a refrigerator, these modules include, for example, the compressor for cooling the inside of the refrigerator, lighting for illuminating the inside of the refrigerator when the door is opened, and a sensor for measuring the inside temperature or humidity. Each of these modules corresponds to functional module 107. Moreover, large appliances such as refrigerators or air conditioners typically connect to an external power source via power supply 109.

Moreover, recent appliances are typically equipped with controller 104 using a microcomputer or processor, to control various convenient functions. In the example of a refrigerator that includes an ice-making function, a sensor provided in a specialized tray for storing the ice senses the presence or absence of ice and performs operations for making new ice accordingly. In order to carry out such precise operations, control is performed via a microcomputer or processor and software executed by the microcomputer or processor.

Furthermore, device 10 includes display 112 for presenting various information to the user, or operation unit 111 for the user to make complex operational inputs.

Displays included in conventional devices use limited methods to create displays via lamps or a few numeral digits, and only display the minimum amount of required information, such as indication of an error or indication that the power is on or off. Moreover, conventional devices are characterized by simple operations performed using only a few buttons, such as instructing quick freezing or a reset operation for when there is an error.

In contrast, device 10 includes a small touch panel display functioning as operation unit 111 and display 112, making it possible to display more complex states and configure multiple settings.

The component that gives device 10 its IoT appliance characteristics is communication module 101. Communication module 101 enables connection to the internet using one or more schemes from among the various means of communication, such as Wi-Fi or LTE. If device 10 includes a plurality of communication modules, each communication module may be assigned with a separate communication module ID. Depending on the communication method used, the communication module ID functions as a communications identifier like a telephone number does in LTE, for example. By connecting to the internet, various information collected by controller 104 can be transmitted to server 20, and, conversely, information required for controlling device 10 can be obtained from server 20. Furthermore, a technology known as LPWA has emerged in recent years. Although transmission speed is low with LPWA, network connection is possible with little power consumption. By equipping device 10 with an internal battery 110 aside from the external power supply, a minimum level of communication is possible with LPWA even when device 10 is not connected to an external power supply. Moreover, depending on the type of communication, it may be necessary to specify a particular appliance when carrying out control, so device 10 is also expected to include storage 108 that stores a unique ID of device 10.

Figure 18:
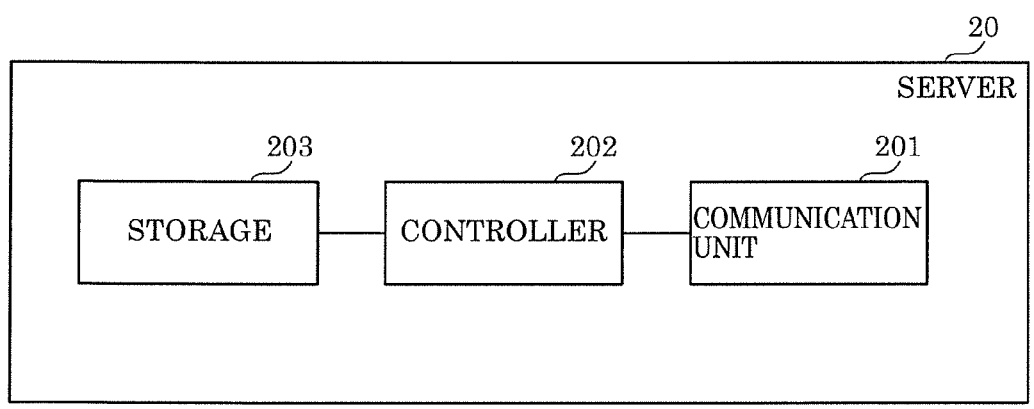
FIG. 18 illustrates a block diagram of a server that is an IoT appliance control cloud.

FIG. 18 illustrates a block diagram of server 20, which is an IoT appliance control cloud.

As illustrated in FIG. 18, server 20 includes communication unit 201, controller 202, and storage 203.

Communication unit 201 sequentially receives the operation information and position information sequentially transmitted by device 10, by communicatively connecting to a network such as the internet. Moreover, communication unit 201 receives, from the user's operation device 40 via a network, request information indicating a request to associate a first user ID with a first device ID, which is an identifier that identifies device 10. Communication unit 201 may transmit a processing result of controller 202 to device 10 via a network and base station 30.

Controller 202 sequentially stores, in storage 203, in association with each other, the operation information and position information that are sequentially received at a corresponding time by communication unit 201. Moreover, controller 202 receives the request indicated by the request information received by communication unit 201, and in accordance with the received request, stores the first device ID and the first user ID in association with each other in storage 203. Controller 202 may transmit, to device 10 via communication unit 201, a processing result of processing using the operation information or the position information stored in storage 203, by executing a predetermined program.

Controller 202 is implemented as nonvolatile memory that stores a predetermined program and a processor that executes the predetermined program. Controller 202 may be implemented as a dedicated circuit that implements the above functions.

Storage 203 stores the operation information and the position information received by communication unit 201. Moreover, storage 203 stores the first device ID and the first user ID in association with each other. Storage 203 may store correspondence information in which device IDs identifying devices and user IDs identifying users are associated. The correspondence information is information indicating that a device identified by a device ID associated with a user ID in the correspondence information is possessed by the user indicated by the user ID. Storage 203 may store the processing result of controller 202. Storage 203 is implemented as, for example, a hard disk drive (HDD) or solid state drive (SSD).

Next, the method of estimating the state of an appliance, such as estimating that the appliance is placed in a general home, will be described.

Figure 19:
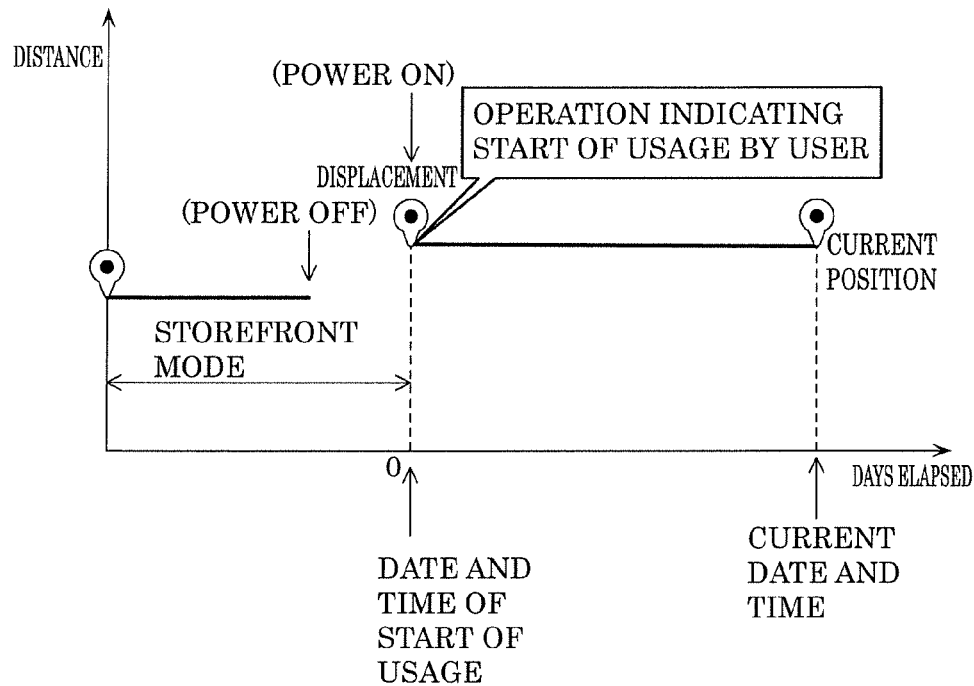
FIG. 19 is a graph for illustrating a method of detecting that a device is placed in a general home.
Figure 20:
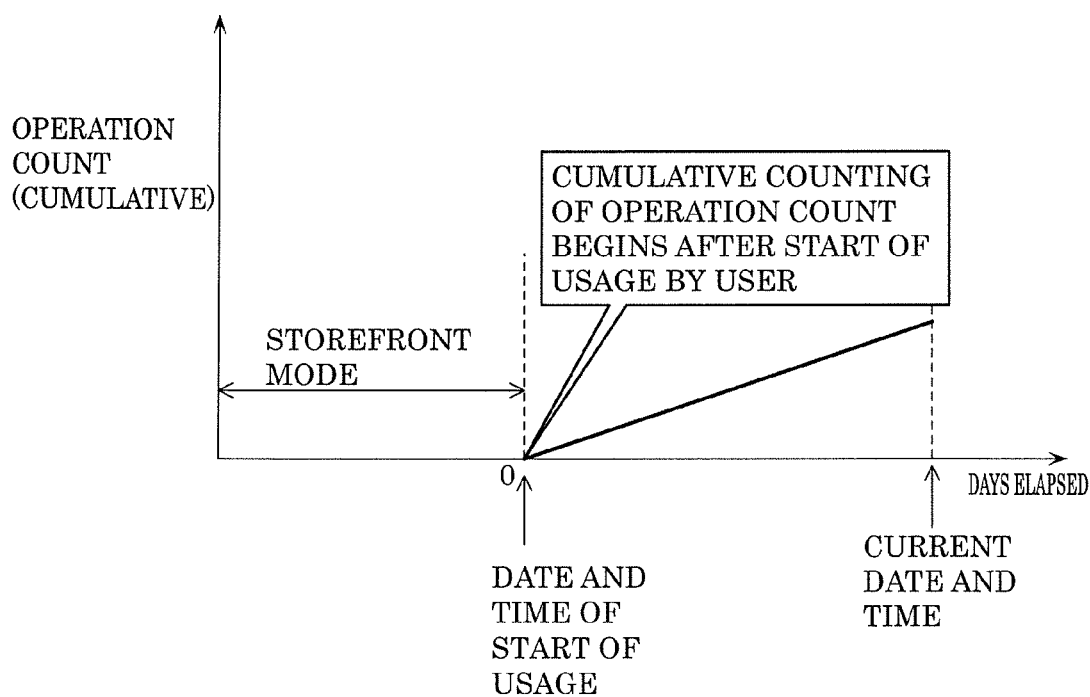
FIG. 20 is a graph for illustrating a method of detecting that a device is placed in a standard household.

FIG. 19 and FIG. 20 are graphs for illustrating a method of detecting that device 10 is placed in a general home.

The relationship between the user and device 10 begins with the purchase of device 10 and placement in a standard household. In other words, the timing at which device 10 is placed in a standard household can be considered to be the start of use of device 10 by the user, so detecting this timing is extremely important.

There are a plurality of conceivable methods for detecting the timing at which device 10 is placed in a standard household.

For example, server 20 may determine that device 10 is placed in a standard household by confirming this with the user when device 10 is initially powered on. In such cases, a user interface (UI) for confirming with the user that device 10 has been placed in a standard household may be displayed on display 112, and whether device 10 has been placed in a standard household or not can be confirmed by receiving an input from operation unit 111. When such a method is used, since it is conceivable that device 10 may be initially powered on in an appliance retailer, a question such as "start using the device?" may be displayed, and when "no" is selected, "is the device being used in a store?" may be displayed, whereby usage in a store and usage in a standard household can be distinguished according to the answers to the displayed questions. Moreover, operation information, including, for example, start date of use and operation count information, is accumulated from the point in time of usage by the user, and information from when the device was being used in a store can be reset.

In other words, controller 202 in server 20 determines whether, among a plurality of items of sequentially received unique information, first unique information received at a first time and second unique information received at a second time after the first time are different or not, and when the first unique information and the second unique information are different, the plurality of items of first operation information received in a first period ending at the first time and the plurality of items of second operation information received in a second period starting at the second time are managed separately. Stated differently, the first period indicates a period before the user purchases device 10, and the second period indicates a period in which the user possesses device 10 after purchasing device 10.

Specifically, controller 202 may separately manage the plurality of items of first operation information and the plurality of items of second operation information by storing the plurality of items of first operation information in association with a first identifier in storage 203 and storing the plurality of items of second operation information in association with a second identifier different from the first identifier in storage 203. The first identifier is, for example, an identifier indicating that the device is located in, for example, an appliance retailer, before being sold. The second identifier indicates association with a user using the one or more devices in the second period. For example, the second identifier indicates that the device is placed in a standard household of the user after being purchased by the user. Note that the plurality of items of first operation information may be deleted from storage 203 after the start of use by the user has been detected.

Note that the first identifier may indicate possession by a first user, and the second identifier may indicate possession by a second user different from the first user.

Moreover, for example, when operation unit 111 in device 10 receives a specific operation indicating usage from the user, server 20 may determine that device 10 is placed in a standard household. A specific operation indicating usage is, more specifically, when device 10 is a washing machine, the detection of water entering the washing machine, and when device 10 is a rice cooker, the detection of steam when rice has started to be cooked. In this way, a specific operation indicating usage is preferably an operation that would not typically be performed before the device is sold. Additionally, when the device is a device that requires installation, such as an air conditioner, a specific operation indicating usage may be determined to have been performed when it is detected that part of the installation processes by an installer has been performed.

Figure 21:
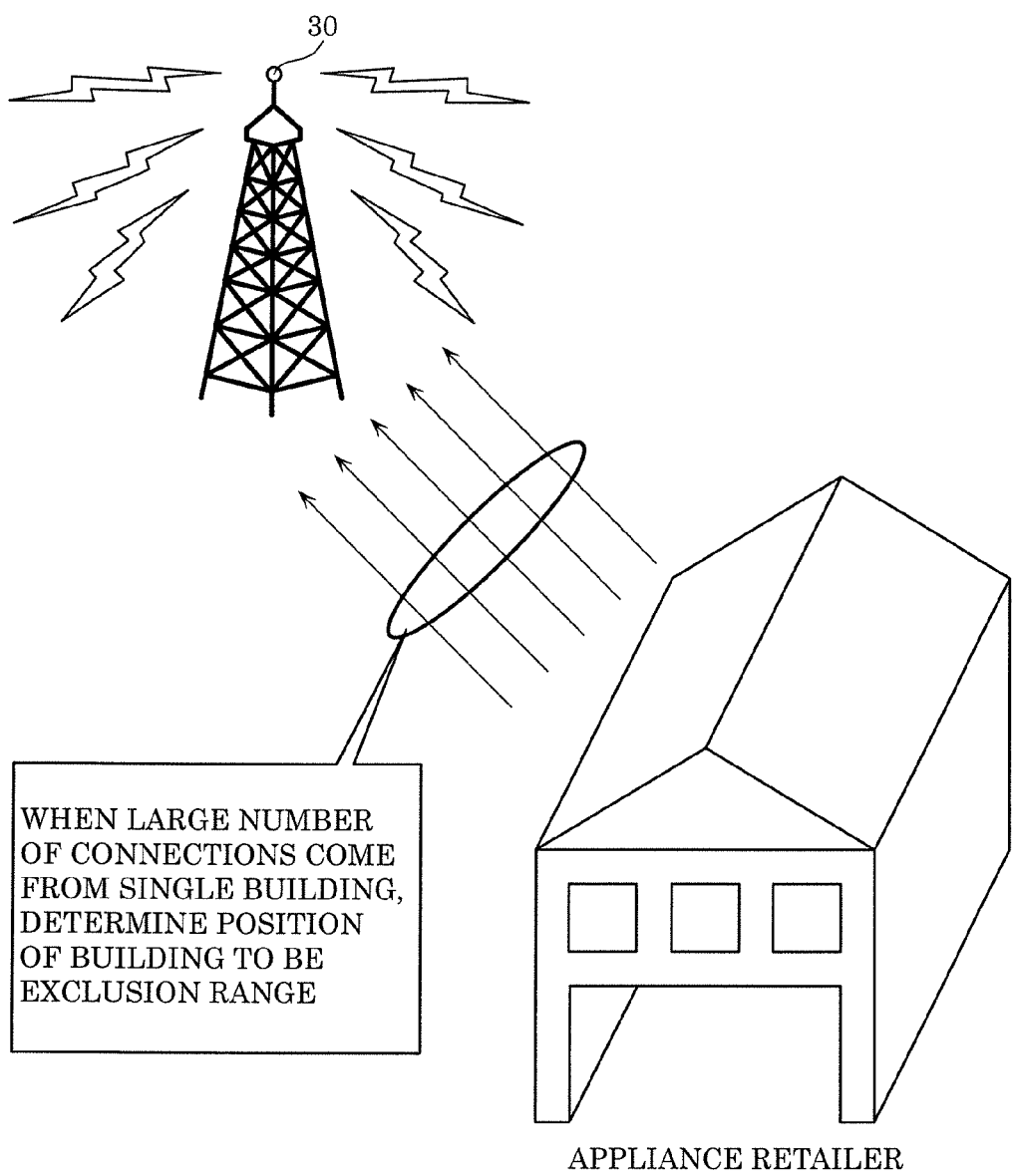
FIG. 21 illustrates an example of determining the exclusion range using the operation information and the position information transmitted from a plurality of devices.

Moreover, for example, server 20 may determine device 10 to be placed in a standard household when, using the sequentially received position information, the indicated position is outside an exclusion range, such as an appliance retailer or transit warehouse. Information indicating the exclusion range may be stored in advance in storage 203, and, alternatively, may be obtained from an external device by communication unit 201. Note that in urban areas, use of only this determination method is not sufficient, but since there are no false positives with this method (i.e., erroneously determining that the device is placed in a standard household), usage is preferable. Note that as illustrated in FIG. 21, the exclusion range is not limited to a predefined range; if devices 10 are devices that include a communication module including an internal battery, an exclusion range may be a location at which there is a large collection of devices 10 that are not powered on. With this, it is possible to continuously define the most current exclusion range at no cost. FIG. 21 illustrates an example of determining the exclusion range using the operation information and the position information transmitted from a plurality of devices.

When server 20 according to this embodiment determines that first unique information received at a first time and second unique information received at a second time after the first time are different, server 20 separately manages the plurality of items of first operation information received in a first period ending at the first time and the plurality of items of second operation information received in a second period starting at the second time. Accordingly, since server 20 manages operation information based on usage by a current user of the device, it is possible to determine the state of the device that is appropriate for the user's usage. In this way, devices can be efficiently managed since it is possible to manage the devices by excluding operation information based on usage by a user or the like other than the above-described user.

Moreover, the determination of the state of the device based on the operation information and the unique information obtained in the second period, which corresponds to the period of usage by the user, can be performed separately from the operation information and the unique information obtained in the first period. Accordingly, the state of the device can be determined accurately.

Next, one example of processes performed at the appliance purchasing and placement points within the lifetime management of device 10 will be given.

Upon initiation of usage in a standard household, the transmission of a log of, for example, the operation information by device 10 may be problematic from a privacy protection viewpoint. The log of device 10 is not classified as personal information under Japanese law so long as it is not linked to an ID of the user, but this may leave a feeling of unease in the user. Accordingly, upon determining that usage in a standard household has initiated, device 10 preferably refrains from transmitting the log to server 20 for the time being. However, when device 10 includes display 112 that can display a message, the user may be informed that a log will be transmitted to server 20 and asked for consent, and when the user consents, device 10 may proceed with transmitting the log.

Figure 22:
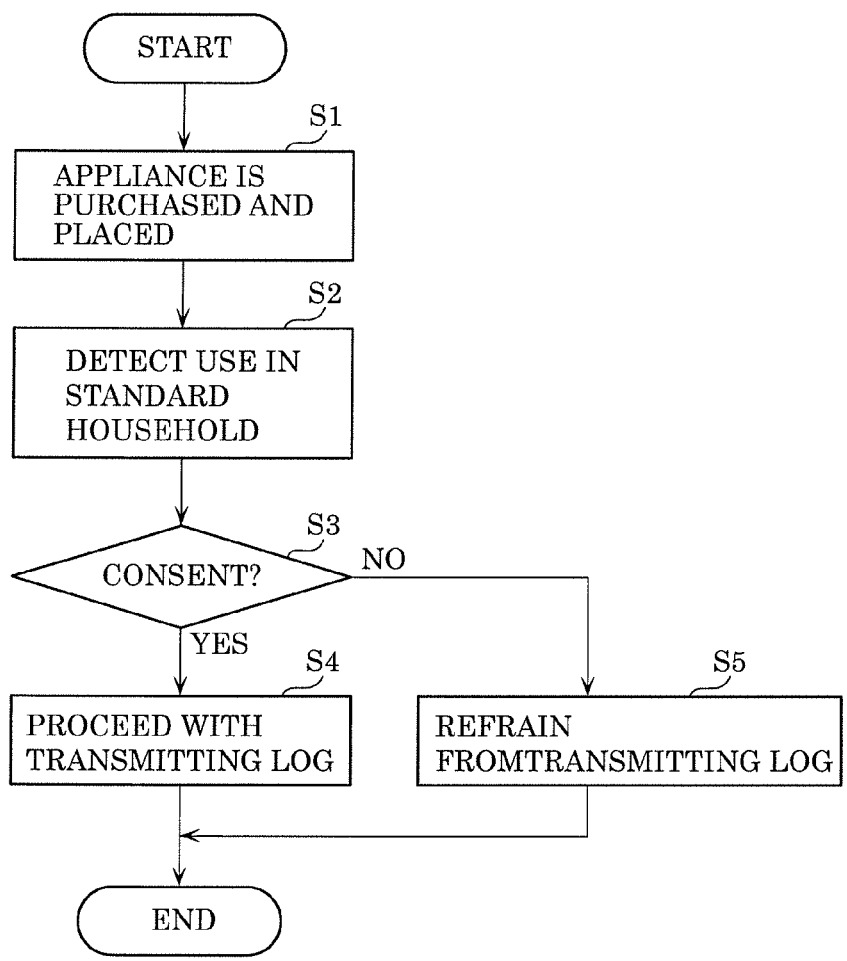
FIG. 22 is a flowchart illustrating processes for receiving consent for transmitting a log upon setting up a device.

FIG. 22 is a flowchart illustrating processes for receiving consent for transmitting a log upon setting up device 10.

Note that since device 10 includes communication module 101 in this example, it is not necessary to configure settings for connecting device 10 to a network.

First, device 10 is purchased and placed in a home of the user (S1). Here, since device 10 has been displaced from a store to the user's home, different unique information is transmitted to server 20.

With this, server 20 uses the method described with reference to FIG. 19 and FIG. 20 to detect usage in a standard household (S2). Note that rather than server 20 detecting the usage of device 10 in a standard household, the usage may be detected via device 10 receiving a specific operation indicating usage.

Server 20 inquires whether the user consents to the transmission of the log or not (S3). Here, server 20 transmits information for making the inquiry to device 10, device 10 receives the information, and displays the information for making the inquiry on display 112. Alternatively, device 10 may make the inquiry when device 10 detects usage of device 10 in a standard household.

When consent is obtained by operation unit 111 of device 10 receiving the corresponding input (yes in S3), device 10 proceeds with transmitting the log (S4). With this, for example, when device 10 is a refrigerator, server 20 can detect a malfunction based on, for example, data such as power consumption data and temperature conditions in the geographical region of use. Moreover, server 20 can similarly detect a malfunction based on transitions in amount of charge of a lithium ion battery or transitions in amount of generated photovoltaic power. By collecting such information, it is also possible to provide a function of notifying the user when it is time to repurchase a new device.

On the other hand, when consent is not obtained by operation unit 111 of device 10 receiving the corresponding an input (no in S3), device 10 refrains from transmitting the log (S5).

Note that even when device 10 refrains from transmitting the log for the time being, if, upon linking device 10 to the user, the user's consent is obtained, device 10 may proceed with transmitting the log.

Even when consent to transmit the log is not obtained, server 20 may continue to store information about the device, and server 20 may transmit notifications and commands to device 10. Since such a function is for protecting the safety of the user, such as notifying the user of recall information when the device has been recalled and displaying an indicator prompting a firmware update, this function may be kept from being disabled.

Figure 23:
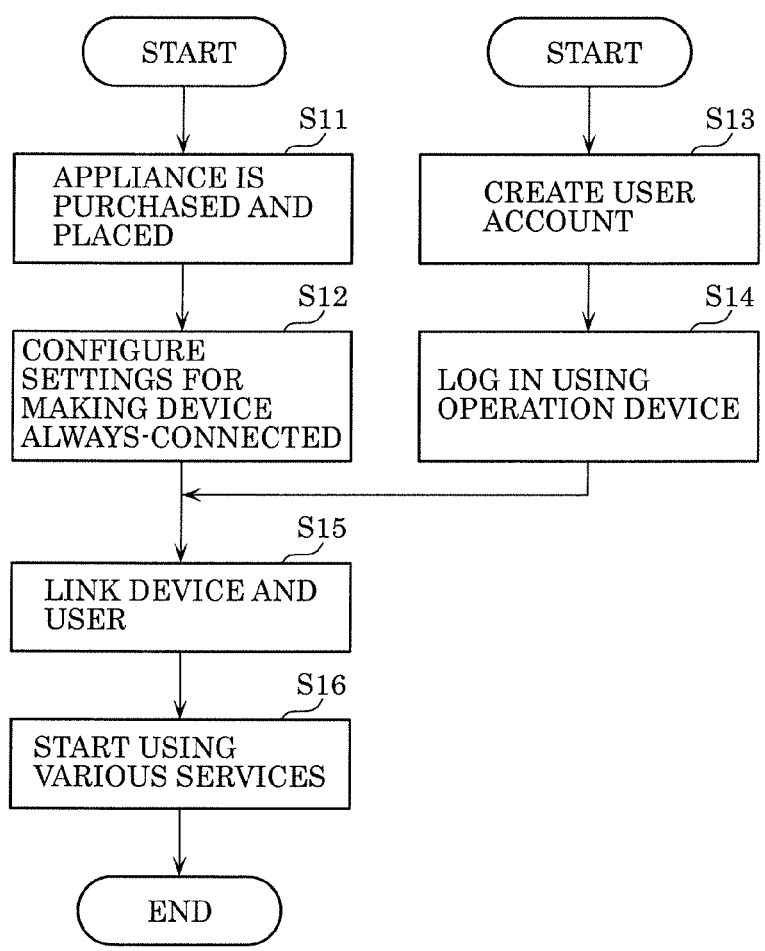
FIG. 23 is a flowchart illustrating one example of a sequence of processes performed up through usage of IoT appliance services.

FIG. 23 is a flowchart illustrating one example of a sequence of processes performed up through usage of IoT appliance services.

First, after device 10 has been purchased by a user from, for example, an appliance retailer, the user or retailer transports device 10 to the user's home and sets up device 10 (S11). When device 10 is a large appliance, such as an air conditioner, installation may be required. Since large appliances typically operate on external power, power is supplied when the appliance is plugged into an outlet, and the device begins operating as an appliance.

Next, the settings for making device 10 always-connected are configured (S12). With Wi-Fi technology that is currently in wide use, device 10 may be always-connected by being connected to a Wi-Fi access point in the household. In order to accomplish this, settings such as the name of the Wi-Fi access point and, when necessary, the password for encrypted communication must be configured. Note that when connecting to a telecommunications carrier network such as LTE, this configuring for making device 10 always-connected can be eliminated by setting up the appliance in advance before being shipped from the factory.

In this way, when the configuring of the settings for making device 10 always-connected is complete, device 10 can transmit operation information to server 20. One conceivable example is the transmission of history data such as a log indicating operation conditions to server 20. However, at this stage, for security reasons, the user cannot yet externally operate device 10.

Next, the user creates a user account for operating device 10 (S13). In typical cases, the user account is created using an operation device to navigate to the home page of the IoT appliance service in a web browser and set up the user ID and password.

The user then logs into the created user account via the operation device (S14). Conceivable examples of an operation device include a smartphone, a tablet, and additionally a virtual private assistant (VPA such as a smart speaker.

In this way, after the user has logged in via the operation device, device 10 and the user ID are linked (S15). This linking enables subsequent operation of device 10 from the operation device on which the user has logged into his or her account.

Thereafter, various services that use the IoT appliance can be used (S16). In recent years, there are cases in which installers or servicers who visit for repairing the device assist in configuring the Wi-Fi settings or user account settings as well.

As one example of the various services that use device 10, in a refrigerator, assuming there is a camera installed in the refrigerator, if the user logs in via a smartphone, even when away from the home, the user can use an application for the IoT appliance to view an image captured by the camera to check what items are in the refrigerator. Note that since the IoT appliance can only be operated from user accounts that are linked, there is no concern of an unrelated third party accessing and viewing the video inside the refrigerator.

Devices 10 not linked with a user account cannot use a variety of the services, that is to say, are functionally restricted. Accordingly, in order to provide the user with the full range of functions, one conceivable option is prompting the user with a display of a notification to link a user account at the point in time that device 10 is powered on.

Figure 24:
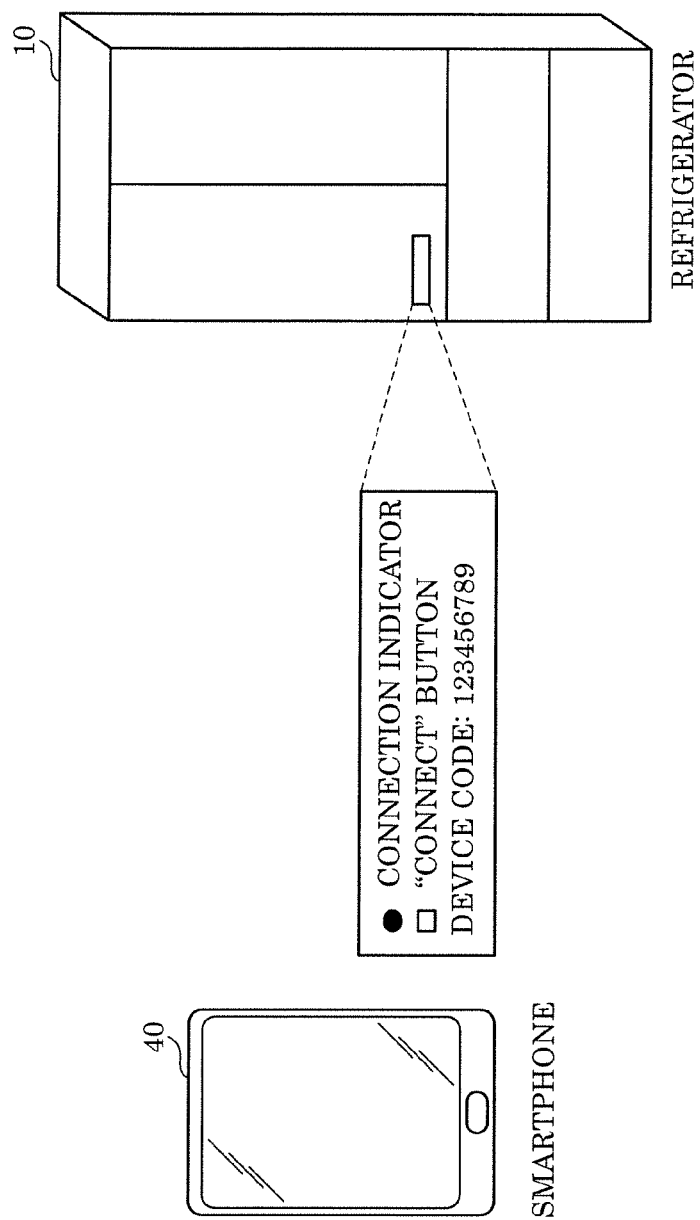
FIG. 24 illustrates a first example of a procedure for linking a device and a user.
Figure 25:
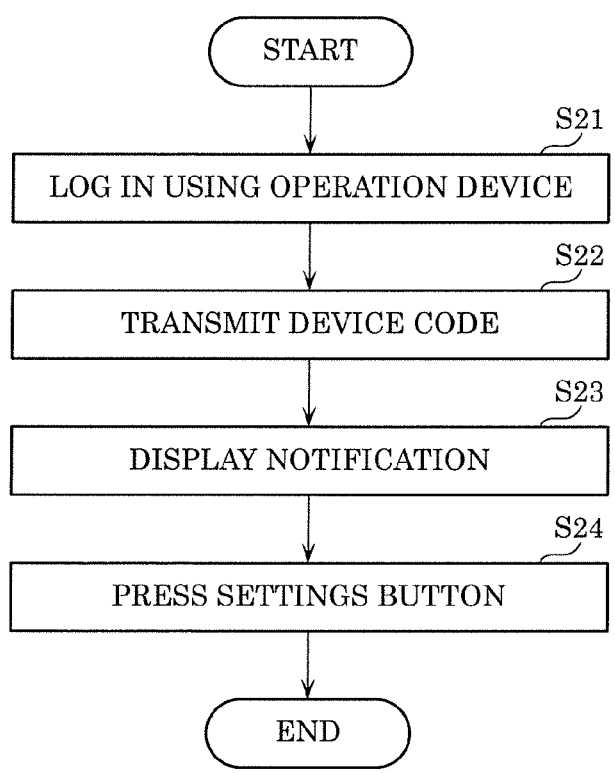
FIG. 25 is a flowchart of a first example of a procedure for linking a device and a user.

FIG. 24 illustrates a first example of a procedure for linking device 10 and a user. FIG. 25 is a flowchart of the first example of a procedure for linking device 10 and a user.

In the first example, first, the user logs in by inputting a user ID and a password into operation device 40, one example of which is a smartphone (S21).

Next, the user uses operation device 40 to input a device code assigned to device 10, and device 10 transmits the inputted device code to server 20 (S22).

In this example, the device code is displayed on device 10. Note that instead of being displayed on device 10, the device code may be written on something that is packaged together with device 10, such as the warranty or operation manual. Moreover, in order to prevent input of a mistyped device code, the device code may be captured using the camera of the smartphone, and the text may be recognized by the smartphone or server-side. The device code need not be a character string such as a string of numbers; the device code may be a two-dimensional barcode, for example.

Once device 10 transmits the device code to server 20, server 20 notifies the device 10 specified by the device code. Note that the manufacturer of device 10 is required to create a correspondence table that associates the device code with communication address information for communication performed by the communication module when the settings are configured in the factory. With this, server 20 can refer to the correspondence table to identify the communication address that corresponds to the specified device code to notify device 10. If the correspondence table is stored in storage 203, server 20 can retrieve the correspondence table from storage 203, and if the correspondence table is not stored in storage 203, server 20 can obtain the correspondence table from an external device.

When device 10 receives the notification from server 20, device 10 indicates on display 112 included in device 10 that a notification has been received (S23). For example, device 10 may cause an indicator lamp to flash to notify the user of the reception of the notification.

After the notification of the receipt, the user makes the input via operation unit 111 of device 10, and information indicating that the input has been made by the user is transmitted to server 20 (S24). With this, server 20 links the device ID and the user ID to complete the linking of device 10 and the user. For example, operation unit 111 may be an input button, and the input may be made by pressing the button.

Figure 26:
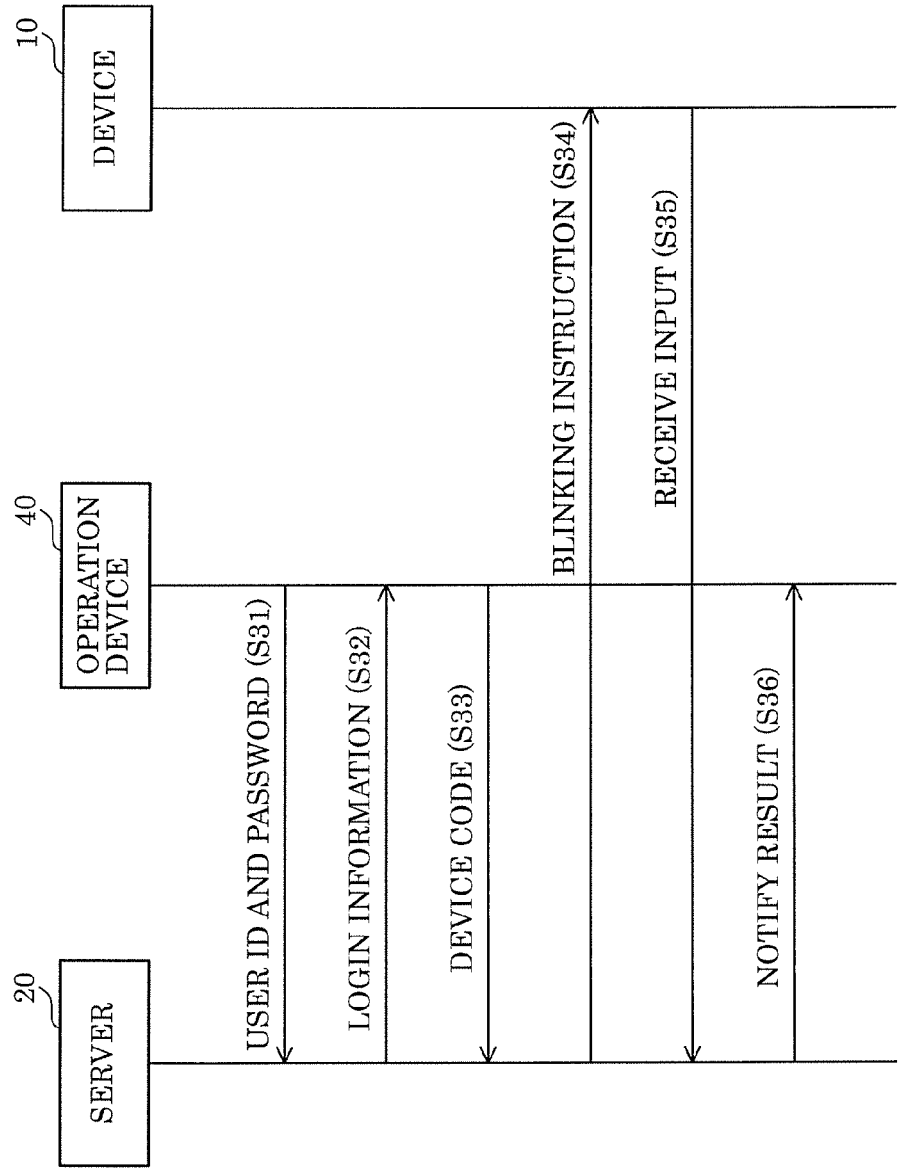
FIG. 26 is a sequence diagram of a first example of a procedure for linking a device and a user.

FIG. 26 is a sequence diagram of the first example of a procedure for linking device 10 and a user.

Operation device 40 receives the input user ID and password, and transmits the user ID and password to server 20 (S31). With this, server 20 receives a user ID from operation device 40. Here, operation device 40 is one example of the first operation device. Moreover, the user is one example of the first user, and the user ID is one example of the first user identifier. Server 20 confirms whether the password is correct or not based on user information managed in advance in server 20. When the password is incorrect, since there is a chance that a third party is spoofing, subsequent processing is not continued.

When the password is correct, server 20 transmits login information to operation device 40 (S32). Login information is, for example, an ID for identifying a session and key data to be used in subsequent communication.

Next, operation device 40 transmits the device code obtained using the method indicated in FIG. 24 and FIG. 25 to server 20 (S33). With this, server 20 receives a device code from operation device 40. Here, device 10 is one example of the first device. Moreover, the device code is one example of the device-related information.

Note that in FIG. 24 and FIG. 25, the device code is transmitted as-is, but in actual usage, a result of processing that uses the login information is preferably transmitted. One conceivable method for this processing is appending the ID for identifying the session to the device code and encrypting this appended data with the key data described above. Moreover, it is preferable to protect the overall communication by encrypted communication such as SSL.

Server 20 receives a request to associate the user ID and the device code by receiving the user ID and the device code. Moreover, server 20 identifies device 10 based on the obtained device code, and transmits a control signal as the fourth inquiry to the identified device 10 via a network. Based on the obtained device code and device information managed in advance in server 20 (i.e., the above-described correspondence table), server 20 converts the obtained device code into the communication address of the device 10 associated in the device information with the obtained device code. If the obtained device code can be converted into the communication address, server 20 transmits a control signal instructing device 10 to blink a light on display 112 (S34).

Note that a mechanism needs to be in place to prevent spoofing by server 20 for this control signal that instructs the blinking. If countermeasures are not in place for preventing spoofing, a fake server could be used to link a malicious third party's user account and device 10. In order to prevent spoofing, for example, it is preferable that a public key for server 20 be stored in advance in device 10, and after adding a time-dependent code, the blinking instruction be notified from server 20, and a signature be added by a private key for server 20.

When device 10 receives the instruction to blink, device 10 causes display 112 to blink. Thereafter, when the user makes an input via operation unit 111, device 10 transmits the input to server 20 (S35). In other words, device 10 transmits, to server 20, the fourth response to the fourth inquiry.

When server 20 receives an input, server 20 completes the linking of the user account and device 10, and transmits a notification of the completion to operation device 40 (S36). In other words, when server 20 receives the fourth response from device 10, server 20 stores the device ID and the user ID in association with each other in storage 203.

Note that it is preferable that a standby period for waiting for the input be set in advance in server 20. Typically, around one minute is required for the standby period. When server 20 does not receive an input after transmitting the control signal indicating the blinking, starting to count the timer for the standby period for waiting for the input, and the standby period elapses, a notification of completion indicating that the linking failed may be transmitted to operation device 40. In other words, when server 20 does not receive the fourth response before elapse of a predetermined period of time, server 20 does not associate the device ID and the user ID. Server 20 begins counting time at the point in time of transmission of the fourth inquiry, and when server 20 has not received the fourth response upon elapse of a predetermined period of time, server 20 ends the processing without associating the device ID and the user ID.

Operation device 40 displays the received notification of completion.

Figure 27:
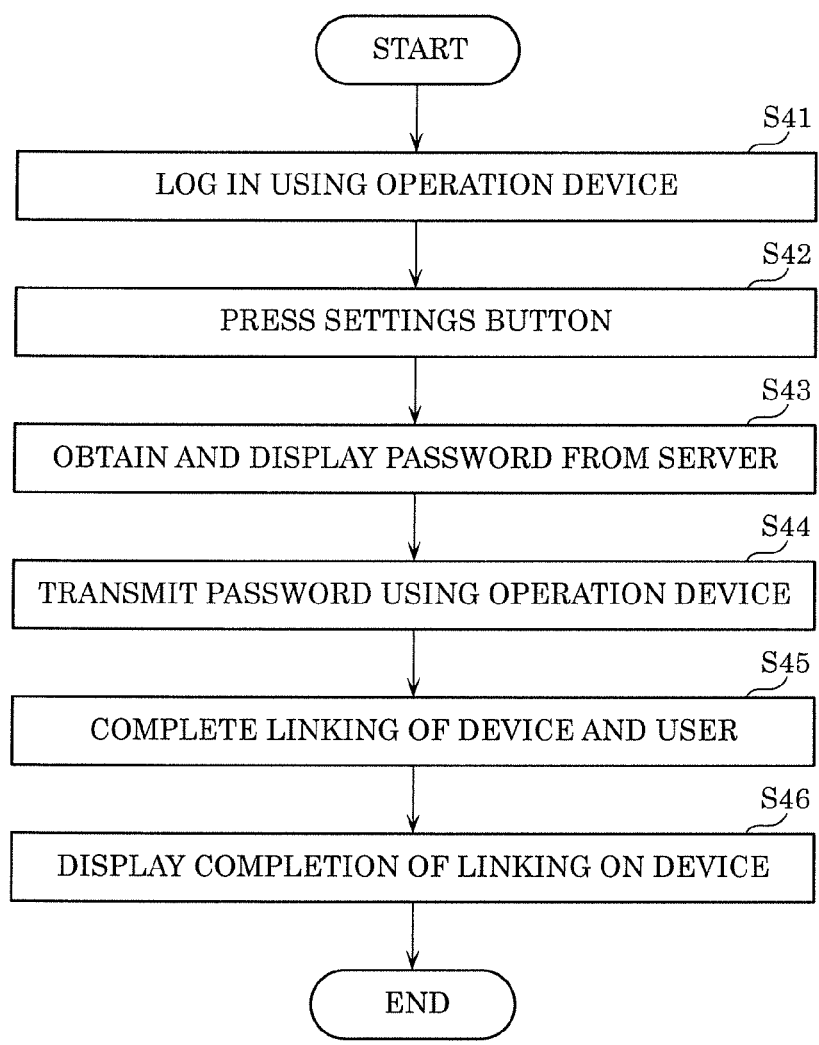
FIG. 27 is a flowchart of a second example of a procedure for linking a device and a user.

FIG. 27 is a flowchart of a second example of a procedure for linking device 10 and a user.

In the second example, first, the user logs in (S41) by inputting a user ID and password into operation device 40, one example of which is a smartphone, waits to be logged in, and then presses a settings button for device 10 (S42).

In response to the settings button being pressed, device 10 requests a password for linking device 10 and the user account from server 20. Here, server 20 preferably issues a one-time password or time-limited password. Device 10 receives the password from server 20 and displays the password on display 112 (S43).

The user inputs the password displayed on display 112 into operation device 40, and operation device 40 transmits the input password to server 20 (S44). In this example, the password is exemplified as a character string of numbers, for example, but the password may be a two-dimensional barcode, a pattern flashed by an LED, or audio data such as a Morse code signal. When the password is a two-dimensional barcode or a pattern flashed by an LED, the password can be captured by using the camera of operation device 40. When the password is audio data such as a Morse code signal, the password can be input by collecting the audio using a microphone of the operation device 40.

Upon receiving the password from operation device 40, server 20 links device 10 that requested the link with the user account that transmitted the password (S45), and transmits a notification indicating the completion of the linking to device 10.

When device 10 receives the notification of the completion of the linking from server 20, device 10 indicates on display 112 included in device 10 that a notification has been received (S46). For example, device 10 may cause an indicator lamp to flash to notify the user of the reception of the notification.

Figure 28:
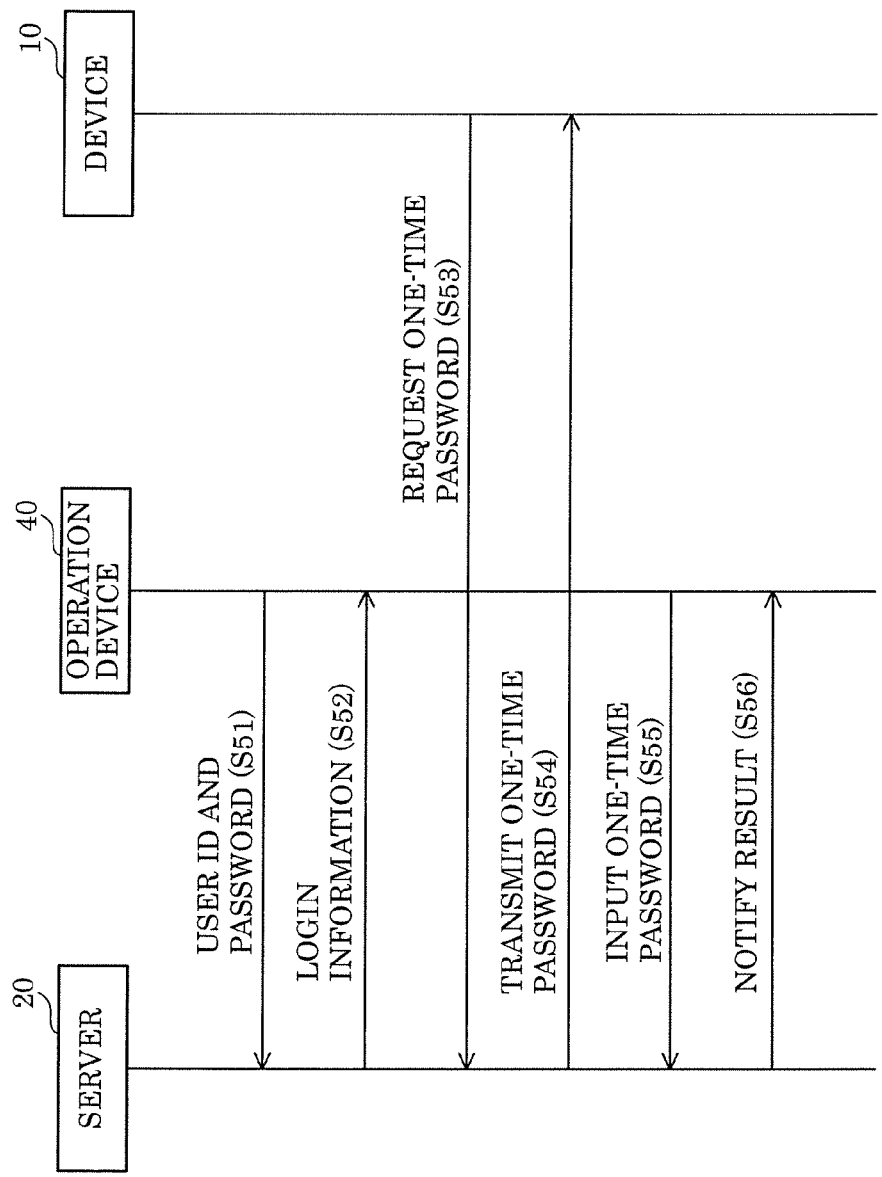
FIG. 28 is a sequence diagram of a second example of a procedure for linking a device and a user.

FIG. 28 is a sequence diagram of the second example of a procedure for linking device 10 and a user.

Operation device 40 receives the input user ID and password, and transmits the user ID and password to server 20 (S51). With this, server 20 receives a user ID from operation device 40. Here, operation device 40 is one example of the first operation device. Moreover, the user is one example of the first user, and the user ID is one example of the first user identifier. Server 20 confirms whether the password is correct or not based on user information managed in advance in server 20. When the password is incorrect, since there is a chance that a third party is spoofing, subsequent processing is not continued.

When the password is correct, server 20 transmits login information to operation device 40 (S52). Login information is, for example, an ID for identifying a session and key data to be used in subsequent communication.

Next, upon receiving the input from the user, device 10 requests a one-time password from server 20 (S53). Note that when making this request, device 10 transmits its own device ID to server 20 together with the request. Here, device 10 is one example of the first device. Moreover, the device ID is one example of the device-related information. Moreover, the device ID is also referred to as a device identifier. Note that server 20 may obtain the device ID corresponding to device 10 from device information managed in advance in server 20, based on the address information of device 10 obtained in the transmission. In such cases, the address information is one example of the device-related information.

Server 20 receives a request to associate the user ID and the device ID by receiving the user ID and the device code. Moreover, in response to the one-time password request, server 20 transmits a one-time password to device 10 (S54). Note that the communication address of device 10 is identified by using the same method as in step S34 in the first example described above. The one-time password transmitted in this step is one example of the fourth inquiry. The issued one-time password is displayed on display 112 of device 10.

Operation device 40 receives an input of the one-time password displayed on display 112 from the user, and transmits the input one-time password to server 20 (S55). In other words, device 10 transmits, to server 20, the one-time password as the fourth response to the fourth inquiry.

Note that in FIG. 28, the one-time password is transmitted as-is, but in actual usage, a result of processing that uses the login information is preferably transmitted. One conceivable method for this processing is appending the ID for identifying the session to the device code and encrypting this appended data with the key data described above. Moreover, it is preferable to protect the overall communication by encrypted communication such as SSL.

Server 20 confirms whether the one-time password received from operation device 40 matches the issued one-time password, and upon confirming a match, links the user account and the device ID. In other words, when server 20 receives the fourth response from device 10, server 20 stores the device ID and the user ID in association with each other in storage 203. Server 20 transmits a notification of the completion of the linking to operation device 40 (S56).

Note that it is preferable that a standby period for waiting for the input be set in advance in server 20. Typically, around one minute is required for the standby period. When server 20 does not receive an input after transmitting the one-time password, starting to count the timer for the standby period for waiting for the input, and the standby period elapses, a notification of completion indicating that the linking failed may be transmitted to operation device 40. In other words, when server 20 does not receive the fourth response before elapse of a predetermined period of time, server 20 does not associate the device ID and the user ID. Server 20 begins counting time at the point in time of transmission of the fourth inquiry, and when server 20 has not received the fourth response upon elapse of a predetermined period of time, server 20 ends the processing without associating the device ID and the user ID.

Operation device 40 displays the received notification of completion.

In this way, since it is possible to associate the user ID and the device ID in a combination desired by the user, the association of devices and users can be performed accurately. Moreover, the device can receive the fourth inquiry via a LPWA base station 30.

As described above, as a result of the user IDs and the device IDs being stored in association with each other in storage 203 in server 20, storage 203 stores correspondence information in which a plurality of device IDs are respectively associated with a plurality of user IDs.

Next, a method for linking a plurality of devices and a plurality of users will be described.

Figure 29:
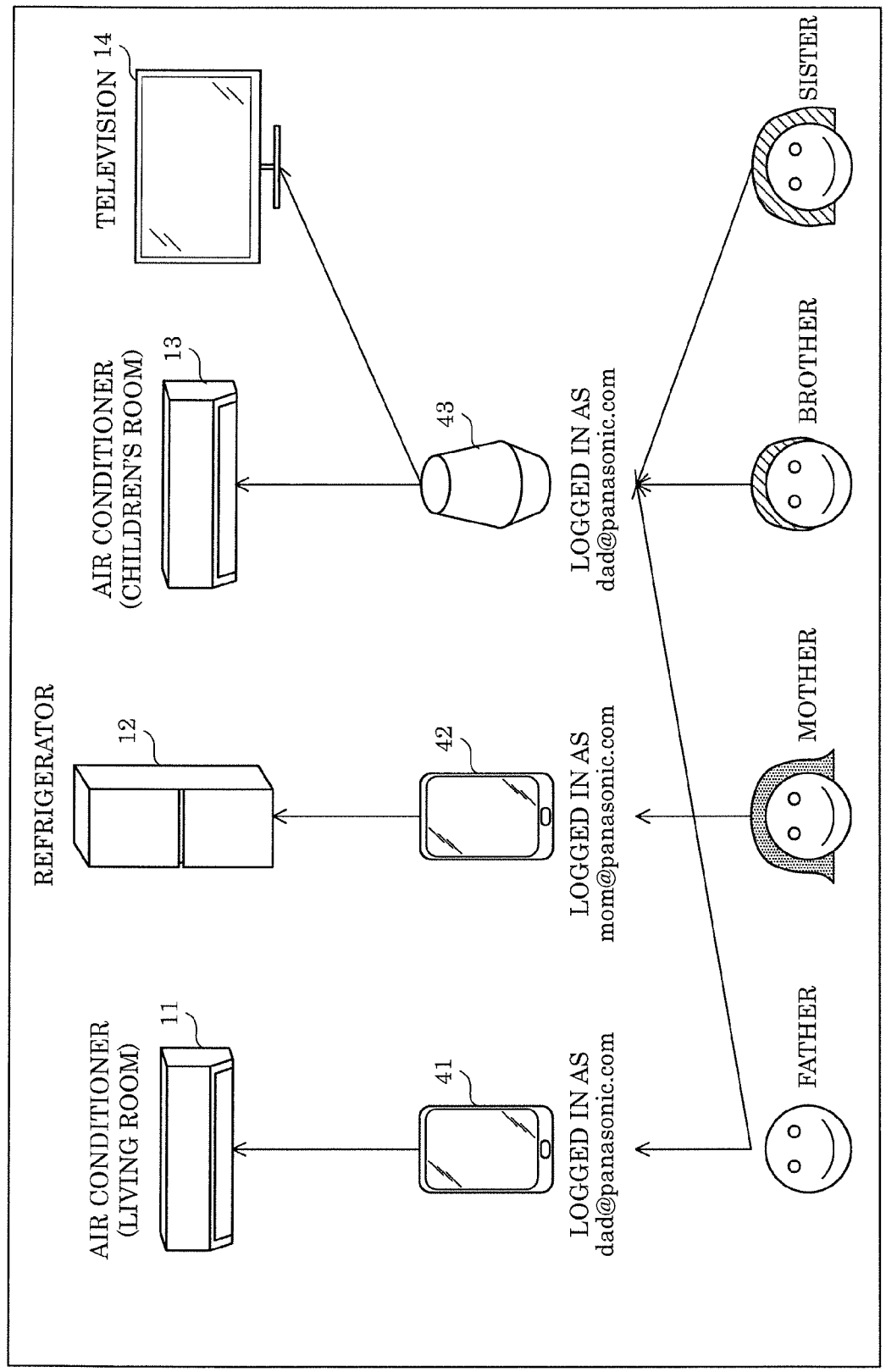
FIG. 29 illustrates a first situation of one example of a method for linking a plurality of devices and a plurality of users.

FIG. 29 illustrates a first situation of one example of a method for linking a plurality of devices and a plurality of users.

FIG. 29 illustrates an example in which a total of four IoT appliances consisting of two air conditioners 11 and 13, one refrigerator 12, and one television 14 are disposed in a single home. Air conditioner 11 is disposed in the living room, and air conditioner 13 is disposed in the children's room. Each of air conditioners 11 and 13, refrigerator 12, and television 14 is one example of device 10. In other words, each of air conditioners 11 and 13, refrigerator 12, and television 14 is, although not illustrated in the drawings, communicatively connected to base station 30 via LPWA.

In this example, the household consists of four family members: a father, a mother, and two children (a brother and a sister). Furthermore, in this example, the father and the mother each own a user account (user ID) for operating air conditioners 11 and 13, refrigerator 12, and television 14. In this example, the father is one example of the second user, and the mother is one example of the first user. The user account is a user account for an IoT appliance control cloud realized by server 20.

As described above, utilizing the always-connected feature, even before being linked to a user account, devices 10 have transmitted an appliance operation log or processing log to server 20 via base station 30. However, if a user wants to make an operational input to operate a device 10 using an operation device such as a smartphone or VPA, the user must link the device 10 to a user account.

For example, in the example illustrated in FIG. 29, the father has already logged into the user account dad@panasonic.com in an application running on his smartphone 41, and is already linked to air conditioner 11 in the living room. In other words, in the correspondence information stored in server 20, the user account dad@panasonic.com and the device ID of air conditioner 11 are associated with each other. Moreover, in the correspondence information stored in server 20, the device ID of the operation device used to log into the IoT appliance control cloud may additionally be associated with the user account and the device ID of the device to be operated. Stated differently, in the correspondence information, dad@panasonic.com, the device ID of air conditioner 11, and the device ID of smartphone 41 may be associated with one another. This allows the father to operate air conditioner 11 using his smartphone 41. Note that dad@panasonic.com is one example of the second user ID. Air conditioner 11 is one example of the first device, and the device ID of air conditioner 11 is one example of the first device ID. Smartphone 41 is one example of the second operation device.

Moreover, in this example, the mother has already logged into the user account mom@panasonic.com in an application running on her smartphone 42, and is already linked to refrigerator 12. In other words, in the correspondence information stored in server 20, the user account mom@panasonic.com and the device ID of refrigerator 12 are associated with each other. Note that in the correspondence information, mom@panasonic.com, the device ID of refrigerator 12, and the device ID of smartphone 42 may be associated with one another. This allows the mother to operate refrigerator 12 using her smartphone 42. Note that mom@panasonic.com is one example of the first user ID. Refrigerator 12 is one example of the second device, and the device ID of refrigerator 12 is one example of the second device ID. Smartphone 42 is one example of the first operation device.

Furthermore, in this example, VPA 43 is disposed in the home, and this VPA is logged in using the father's user account dad@panasonic.com. VPA 43 is already linked to air conditioner 13 in the children's room and to television 14. Note that in the correspondence information, dad@panasonic.com, the device IDs of air conditioner 13 and television 14, and the device ID of smartphone 41 may be associated with one another. This allows a user to operate air conditioner 13 in the children's room and television 14 by using VPA 43. Note that a single VPA 43 is commonly used by multiple members of a single family. In this example, although neither the brother nor the sister has their own smartphone or user account, they can operate air conditioner 13 in the children's room or television 14 by using VPA 43.

Figure 30:
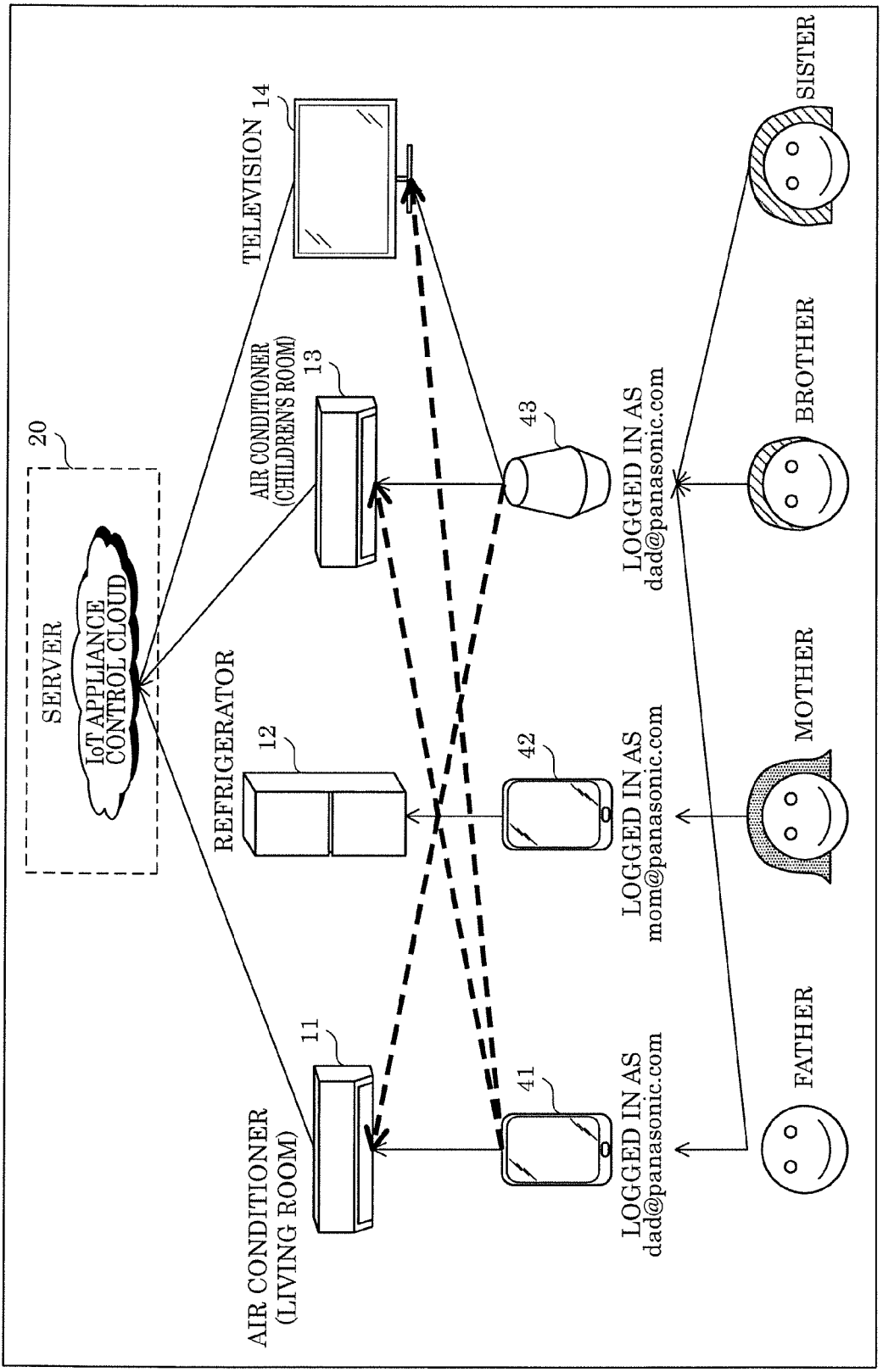
FIG. 30 illustrates a second situation of one example of a method for linking a plurality of devices and a plurality of users.

FIG. 30 illustrates a second situation of one example of a method for linking a plurality of devices and a plurality of users. In the second situation, a plurality of operation devices and devices are being linked using a single user account across the plurality of operation devices.

In the example illustrated in FIG. 29, the father's user account dad@panasonic.com is being used by a plurality of operation devices, including smartphone 41 and VPA 43. An operation device which is not explicitly linked and an IoT appliance may be linked through this user account.

In FIG. 30, relationships between operation devices and IoT appliances that are indirectly linked through the same user account are indicated with dashed lines. In this example, the father can use his smartphone 41 to operate not only air conditioner 11 in the living room that is explicitly linked in the correspondence information stored in server 20, but air conditioner 13 in the children's room and television 14, which are indirectly linked via the same user account, as well.

In this case, server 20 links and manages the two air conditioners 11 and 13 and television 14 with the same user account dad@panasonic.com. This makes it possible to share settings information, such as the temperature settings, between the two air conditioners 11 and 13 when they are air conditioning their respective rooms. This also makes it possible to appropriately control the operation state of air conditioner 11 disposed in the same room as television 14 in accordance with the situation in which television 14 is being viewed.

Figure 31:
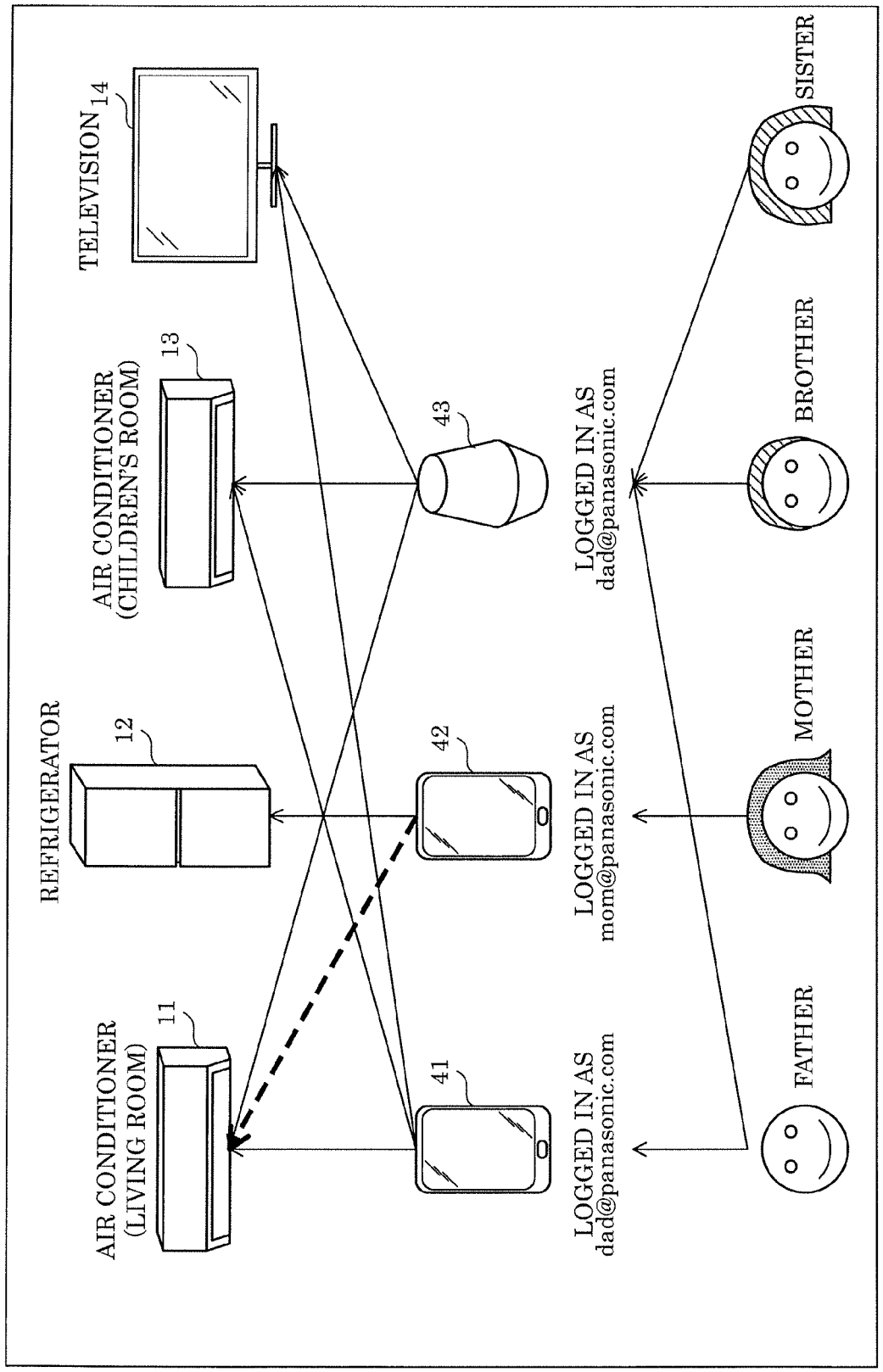
FIG. 31 illustrates a third situation of one example of a method for linking a plurality of devices and a plurality of users.

FIG. 31 illustrates a third situation of one example of a method for linking a plurality of devices and a plurality of users. In the third situation, two user accounts are being linked via a device.

In the example illustrated in FIG. 31, via an application running on the mother's smartphone 42, server 20 has received an input to link air conditioner 11 in the living room to the mother's user account mom@panasonic.com. In this example, the mother has used smartphone 42 to carry out the method of linking device 10 and the user described above with reference to FIG. 24 through FIG. 27.

In this example, since air conditioner 11 is already linked to the father's user account dad@panasonic.com, the linking of a plurality of user accounts to the same air conditioner 11 means there is a high likelihood that the users of these user accounts are family members.

Accordingly, in such cases, server 20 may link the father's user account and a device linked to the mother's user account, and additionally store the result of this linking in the correspondence information in storage 203. Similarly, server 20 may link a device linked to the father's user account and the mother's user account, and additionally store the result of this linking in the correspondence information in storage 203. Stated differently, when, in the correspondence information stored in storage 203, (i) the first device ID is associated with a second user ID different from the first user ID and (ii) the first user ID is associated with a second device ID that identifies a second device included in the plurality of devices and different from the first device, server 20 stores the second identifier and the second user ID in association with each other in storage 203. This results in the server 20 updating the correspondence information.

Next, one example of linking processes performed when server 20 detects a case in which different user accounts are being linked to the same device ID will be described with reference to FIG. 32 and FIG. 33.

Figure 32:
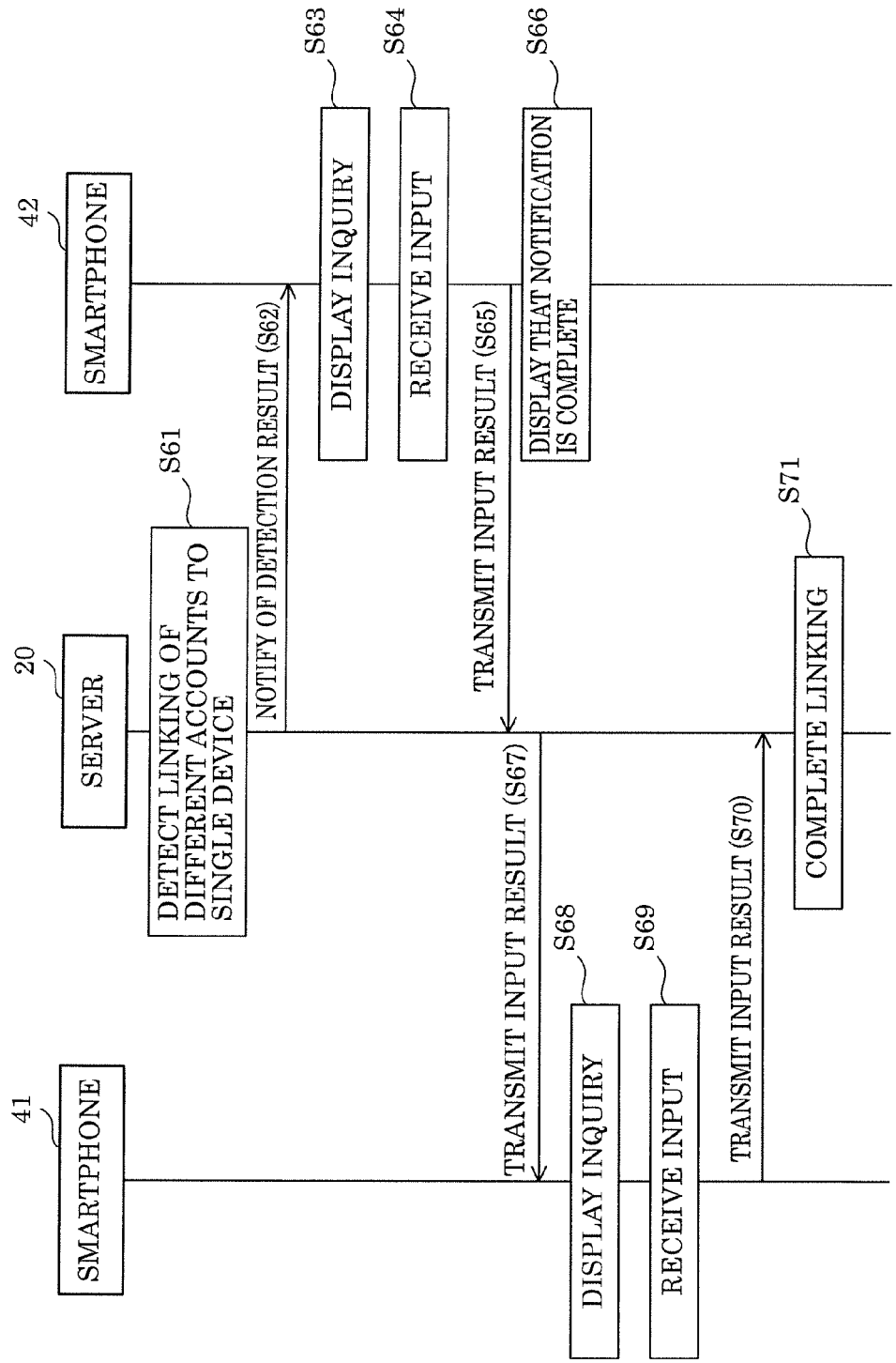
FIG. 32 is a sequence chart illustrating one example of linking processes performed when different user accounts are being linked to the same device ID.

FIG. 32 is a sequence chart illustrating one example of linking processes performed when different user accounts are being linked to the same device ID. FIG. 33 illustrates one example of information indicating a notification sent to an operation device in the linking processes performed when different user accounts are being linked to the same device ID.

As illustrated in FIG. 32, first, server 20 detects the linking of different accounts to a single device (S61). For example, as described above, the mother operates smartphone 42 to transmit a request to link the device ID of air conditioner 11 and the mother's user account from smartphone 42. Upon receipt of this request, server 20 determines whether there is another user account that is linked to the device ID of air conditioner 11 in the correspondence information. When there is another user account, server 20 detects the linking of different accounts to a single device. On the other hand, when there is no other user account, server 20 links the device ID of air conditioner 11 and the mother's user account, and ends the processing.

After step S61, server 20 notifies smartphone 42 of the detection result (S62). In this example, the detection result transmitted by server 20 includes a first inquiry checking whether the father, which is the user identified by dad@panasonic.com in the correspondence information, is a member of the mother's family, the mother being the user identified by mom@panasonic.com.

Upon receiving the detection result from server 20, smartphone 42 displays screen 421 notifying the user that server 20 has detected the linking of different accounts to a single device, as illustrated in FIG. 32. With this, the user is notified of the fact that server 20 has detected that the device to which the user is attempting to link a user account to is already linked to another user account.

Next, based on the detection result received from server 20, smartphone 42 displays screen 422 showing the first inquiry (S63). This confirms with the user whether the user indicated by the other user account detected in step S61 (i.e., the father) is a member of the mother's family or not. Since in this example, linking is being performed for a device in the home, it is in principle difficult to conceive that an unrelated third person would be shown as the user to be confirmed as a family member or not in screen 422.

Next, smartphone 42 receives an input made via screen 422 showing the first inquiry (S64), and transmits the result of the received input to server 20 (S65). The result of the input indicates the first response to the first inquiry. Upon transmitting the result of the input to server 20, smartphone 42 displays screen 423 indicating that a notification has been transmitted to smartphone 41 via server 20 as the result of the input (S66).

Upon receiving the result of the input transmitted in step S65, when the result of the input includes a response indicating that the mother has confirmed that the father is a member of the mother's family, server 20 transmits the result of the input to smartphone 41 associated with the father's user account (S67). Server 20 transmits the result of the input as a notification indicating to associate the device ID of air conditioner 11 with the mother's user account. The notification may include the second inquiry checking with the father whether the mother is a member of the father's family or not.

Based on the notification received from server 20, smartphone 41 displays screen 411 showing the second inquiry (S68). Screen 411 may be displayed the next time the application is launched, and maybe displayed via a push method such as a push notification or e-mail.

Next, smartphone 41 receives an input made via screen 411 showing the second inquiry (S69), and transmits the result of the received input to server 20 (S70).

Upon receiving the result of the input transmitted in step S70, when the result of the input includes a response indicating that the father has confirmed that the mother is a member of the father's family, server 20 stores the device ID of air conditioner 11 and the mother's user account in association with each other (S71).

Note that when the result of the input received in step S65 includes a response indicating that the mother has not confirmed that the father is a member of the mother's family, in step S71, server 20 may forgo associating the device ID of air conditioner 11 with the mother's user account. For example, when an answer indicating that the person is not a family member is received in step S65, in this example, server 20 stops the processing. Note that in such cases, server 20 may actively unlink the link rather than stopping the processing. This is a countermeasure for when an IoT appliance is transferred to a different user, or when a person visits the home and accidentally or maliciously attempts to link with the device. Although giving the user who was linked first permission to unlink other users would be the simplest countermeasure, cases in which the device has been transferred to a different user cannot be handled with this method. Accordingly, for example, a configuration in which an operational input for forcibly unlinking a link is made via the operation unit on the IoT appliance may be used. In this way, since the device ID and the user account are associated in accordance with the first response, which is the result of the first inquiry, it is possible to refuse requests for undesirable associations.

Moreover, when the result of the input received in step S70 includes a response indicating that the father has not confirmed that the mother is a member of the father's family, in step S71, server 20 may forgo associating air conditioner 11 with the mother's user account. For example, when an answer indicating that the person is not a family member is received in step S70, in this example, server 20 stops the processing. In this way, since the device ID and the user account are associated in accordance with the second response, which is the result of the second inquiry, it is possible to refuse requests for undesirable associations.

Note that in another embodiment, the user may be unconditionally treated as a member of the family without inquiring as to whether they are a family member or not. In other words, without making the first inquiry or the second inquiry, air conditioner 11 and the mother's user account may be linked under the unconditional assumption that the father and mother are family members.

Moreover, when a response of "no" is received to an inquiry of whether the user is a family member or not, the linking of the user account that requested the link may be denied in the IoT appliance.

Figure 34:
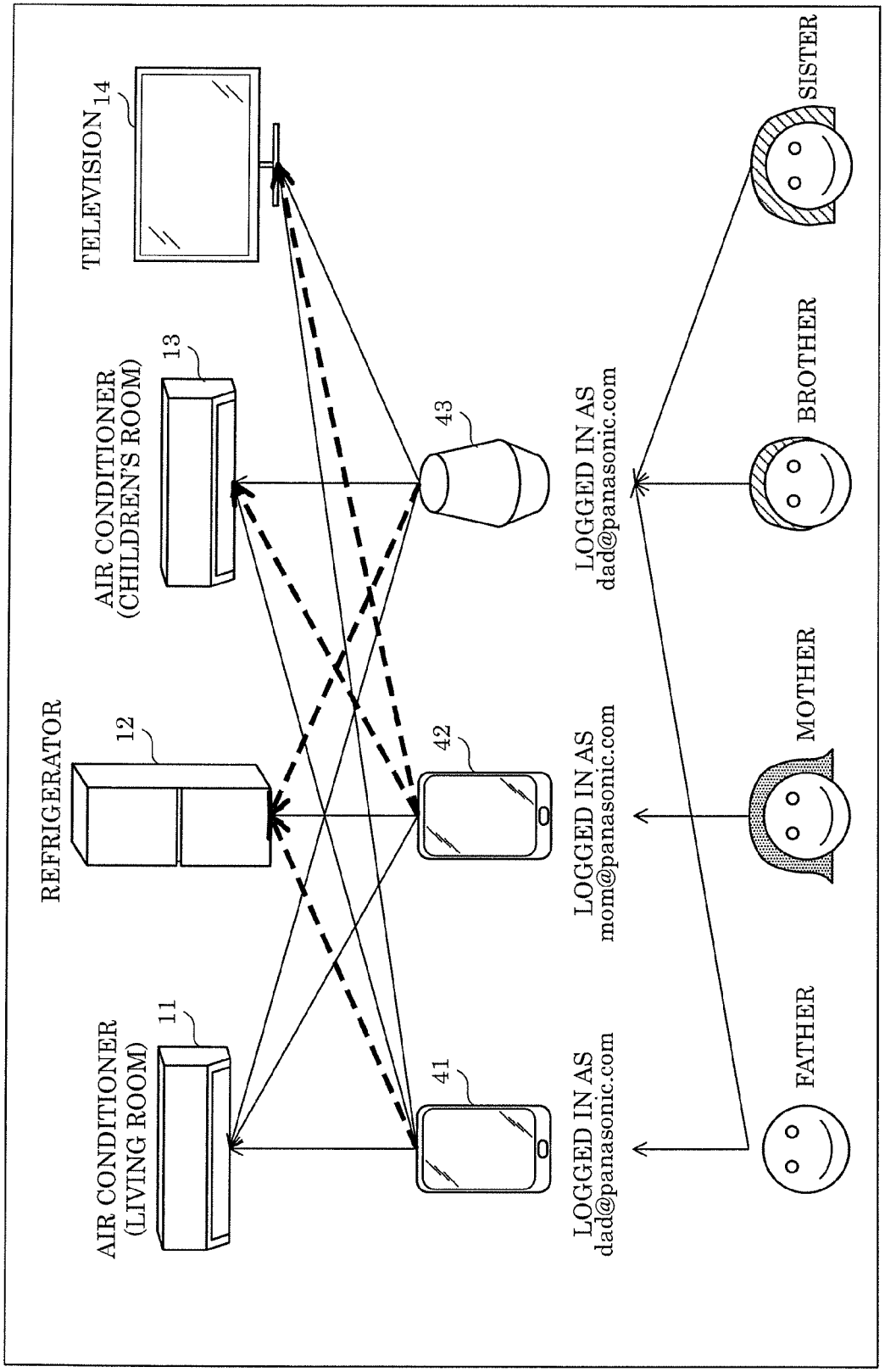
FIG. 34 illustrates a fourth situation of one example of a method for linking a plurality of devices and a plurality of users.

FIG. 34 illustrates a fourth situation of one example of a method for linking a plurality of devices and a plurality of users. The fourth situation is another situation in which two user accounts are being linked via a device.

Figure 33:
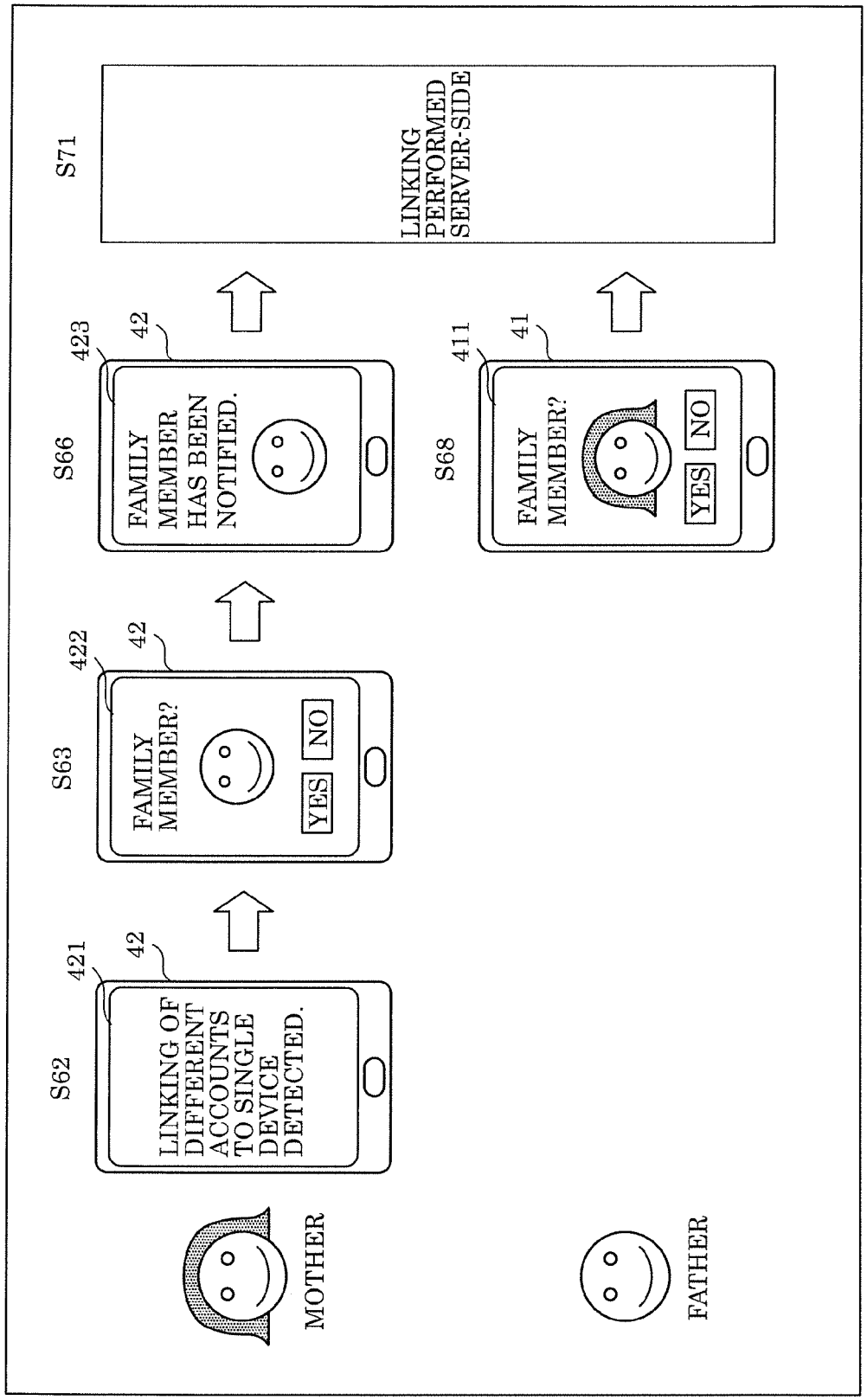
FIG. 33 illustrates one example of information indicating a notification sent to an operation device in the linking processes performed when different user accounts are being linked to the same device ID.

In the sequence chart illustrated in FIG. 32, when the father's user account and the mother's user account are confirmed to be user accounts for members of the same family, it is possible to reciprocally link all IoT appliances in the home to all user accounts in the home, as illustrated in FIG. 33. In other words, it is possible to reciprocally link air conditioners 11 and 13, refrigerator 12, and television 14 with the father's user account dad@panasonic.com and the mother's user account mom@panasonic.com.

Accordingly, when the result of the input received in step S65 includes a response indicating that the mother has confirmed that the father is a member of the mother's family, and the result of the input transmitted in step S70 includes a response indicating that the father has confirmed that the mother is a member of the father's family, server 20 may link the device ID of refrigerator 12 with the father's user account. In this way, when a request to link the device ID of air conditioner 11 and the mother's user account is received, server 20 uses the stored correspondence information to store the device ID of refrigerator 12 and the father's user account in association with each other. This makes it possible to efficiently associate users and devices.

Note that when the result of the input received in step S65 includes a response indicating that the mother has confirmed that the father is a member of the mother's family, server 20 may link the device ID of refrigerator 12 with the father's user account. Moreover, server 20 may, without making the first inquiry or the second inquiry, link the device ID of refrigerator 12 and the father's user account under the unconditional assumption that the father and mother are family members.

Moreover, when server 20 receives a request to associate the mother's user account with the device ID of air conditioner 11 in the living room, in the correspondence information, the device ID of air conditioner 11 is already associated with the father's user account, and the device ID of air conditioner 13 and the device ID of television 14 are further associated with the father's user account. Accordingly, server 20 may store the device IDs of air conditioner 13 and television 14 in association with the mother's user account. This makes it possible to further efficiently associate users and devices.

With this, as the dashed lines in FIG. 34 indicate, the device IDs of the devices and the user accounts are associated with one another.

Figure 35:
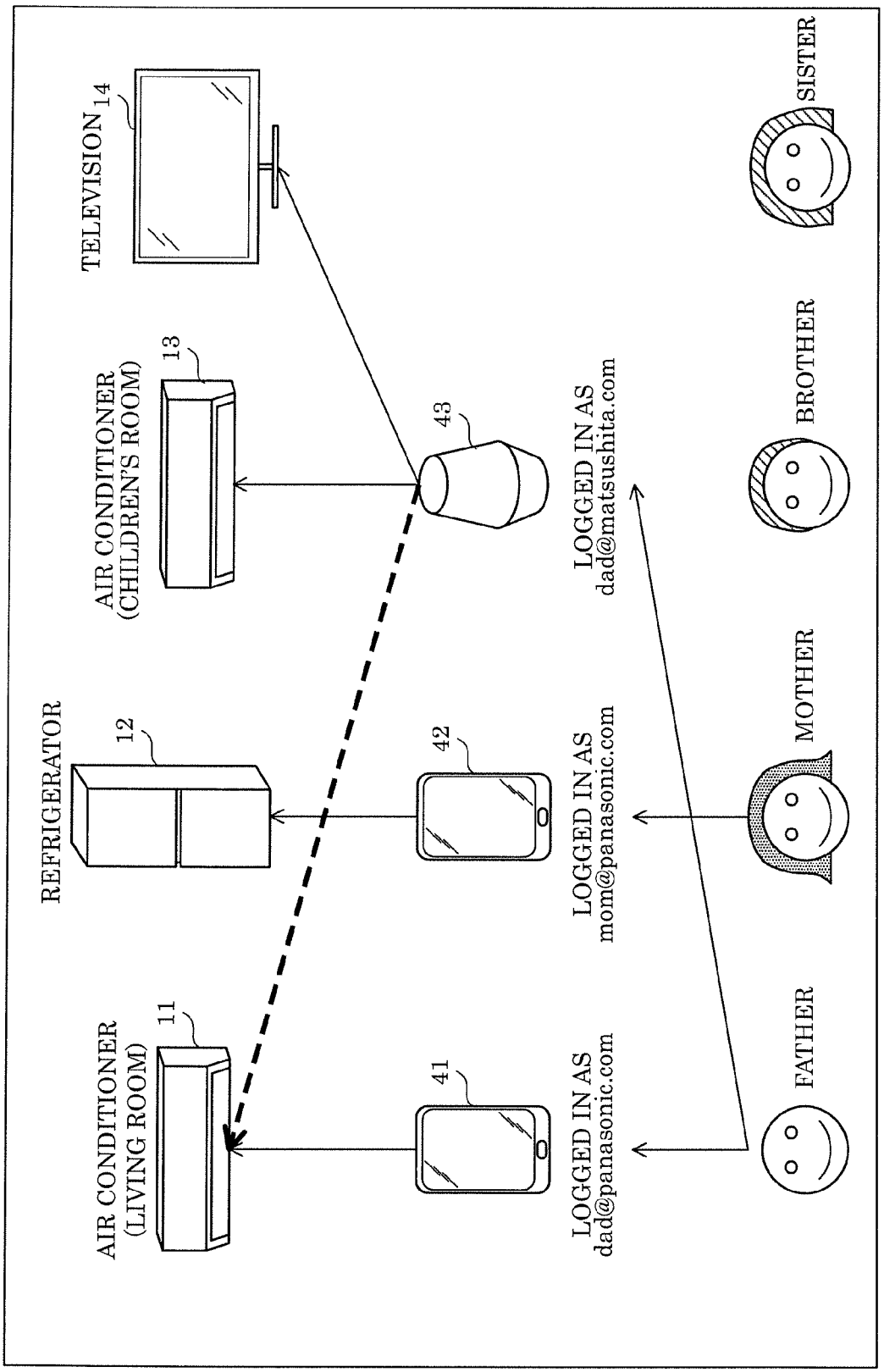
FIG. 35 illustrates another example of a method for linking a plurality of devices and a plurality of users.

FIG. 35 illustrates another example of a method for linking a plurality of devices and a plurality of users.

The example illustrated in FIG. 35 illustrates a case in which the father owns a plurality of user accounts. In this case, IoT appliances manufactured by a plurality of manufacturers are disposed on the home, and each manufacturer manages and operates different user account systems. However, from the viewpoint of the user, even IoT appliances manufactured by different manufacturers preferably operate in cooperation with one another, so this case presupposes that the manufactures are in cooperation. Note that other than this example of different manufacturers, there are other conceivable instances in which a single user owns more than one user account, such as when the user forgets his or her password for an existing user account, due to switching to a new smartphone or the like, and thus creates a new user account or sets up a different password, even when the devices are made by the same manufacturer.

In the example illustrated in FIG. 35, air conditioner 13 in the children's room or television 14 is made by a different manufacture than air conditioner 11 in the living room or refrigerator 12, and is set up with a user account for a different manufacturer. In this example, since the father's user account for operating air conditioner 11 in living room (dad@panasonic.com) and the father's user account for operating air conditioner 13 in the children's room (dad@matsushita.com) are user accounts for different manufacturers, for the time being, they are treated as user accounts for different people.

From this state, the linking operation indicated by the bold dashed line in FIG. 35 is performed, and as a result, a sequence for linking a user is started via the IoT appliance. In other words, one of sequences for the linking of the device and user described with reference to FIG. 24 through FIG. 34 starts. Here, in principle, the sequence is similar to the sequence described with reference to FIG. 32 and FIG. 33. For example, before inquiring "family member?" via screen 422, server 20 may transmit, to VPA 43 being operated by the current user, a third inquiry of "are you the same person?" to check whether the user identified by a different user account is the same person as the current user or not. Note that when the inquiry is made via VPA 43, VPA 43 audibly inquires of the user and audibly receives the response from the user. In this way, when the user accounts are different, since there is no distinction between whether they belong to different members of the same family or belong to the same person, the user is presented with the third inquiry and a response is received from the user to determine whether the different user accounts belong to different members of the same family or belong to the same person. Here, when the response received indicates that the different user accounts belong to the same person, the different user accounts are associated and stored as belonging to the same person. From an operational viewpoint, there is no significant difference in distinguishing between whether the different accounts belong to different members of the same family or belong to the same person, but, for example, by making this distinction, information obtained from a device associated with user accounts that belong to the same person can be used to control the device optimally for each user.

Note that it is acceptable if the first inquiry is an inquiry checking whether the second user is a member of the first user group to which the first user belongs; it is not necessary to make an inquiry checking whether the second user is a member of the first user's family. In other words, the first response includes a response indicating that the second user is confirmed or not confirmed to be a member of the first user group.

Similarly, it is acceptable if the second inquiry is an inquiry checking whether the first user is a member of the second user group to which the second user belongs; it is not necessary to make an inquiry checking whether the first user is a member of the second user's family. In other words, the second response includes a response indicating that the first user is confirmed or not confirmed to be a member of the second user group.

One example of a member of a first user group other than a family member is a member of a share house. Likewise, an example of a member of a second user group other than a family member is a member of a share house.

In this way, the phrasing "a member of the mother's family" above can be rephrased as "a member of the first user group to which the first user belongs". Moreover, the phrasing "a member of the father's family" above can be rephrased as "a member of the second user group to which the second user belongs".

Note that if the second user is confirmed to be a member of the first user group and the first user is confirmed to be a member of the second user group, the first user group and the second user group may be treated as the same user group.

Next, among state estimations of device 10, a method for determining an event at the time device 10 is displaced or the user of device 10 is changed will be described.

Figure 36:
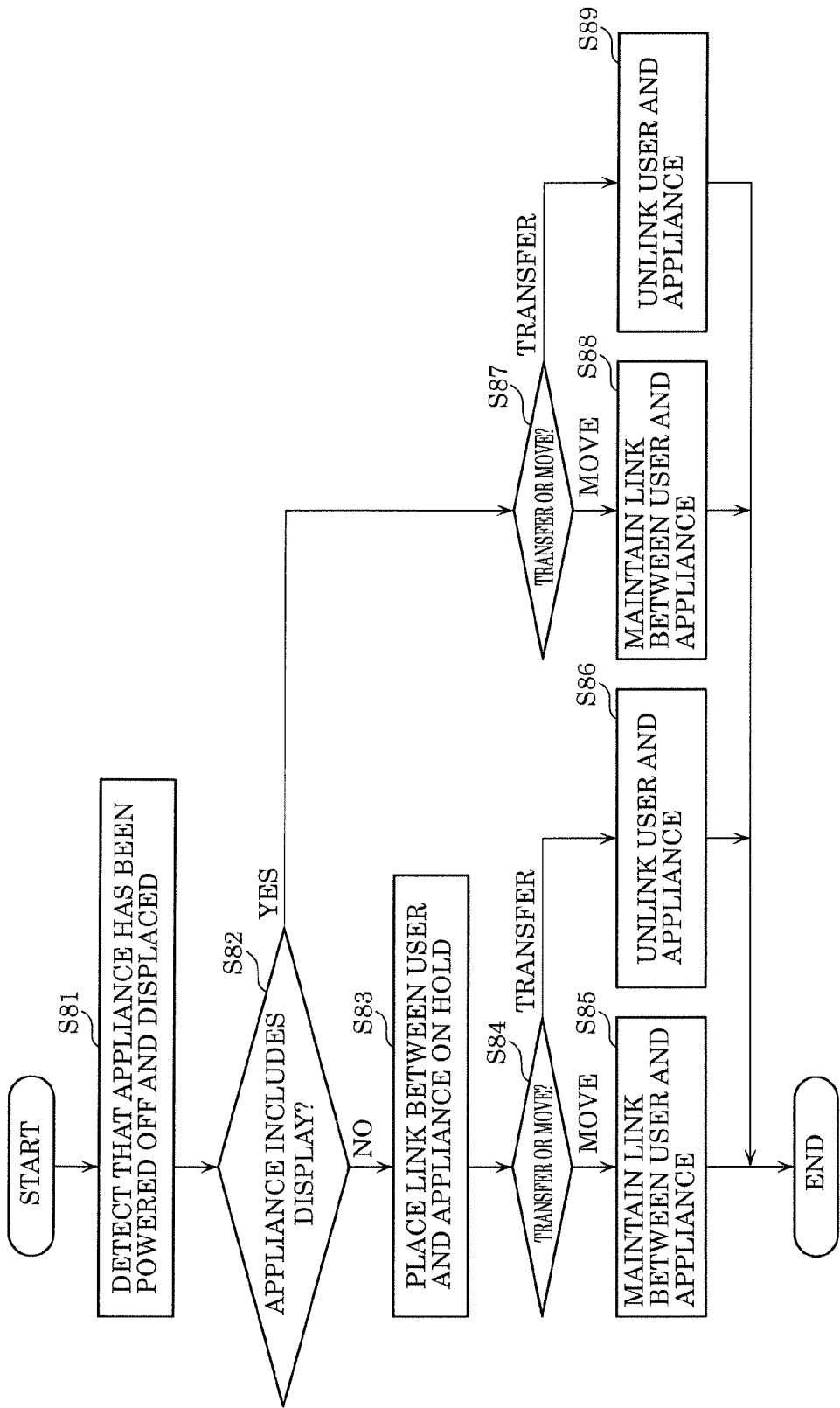
FIG. 36 is a flowchart illustrating one example of processes for distinguishing between whether the user has moved to a new residence or has transferred the device to a different user.

FIG. 36 is a flowchart illustrating one example of processes for distinguishing between whether the user has moved to a new residence or has transferred the device to a different user.

After being purchased, device 10 may conceivably be transferred to a different user. A problem arises in particular when, after a user has been linked to device 10, that user transfers device 10 to a different user. If no countermeasure is put in place, even after transferring device 10 to a different user, the previous user can view the log of device 10 and operate device 10. If the user and device 10 are unlinked by, for example, resetting device 10, this problem can be avoided. However, since operations for unlinking the user and device 10 are not necessary with conventional appliances, it is doubtful whether the new user can correctly reset device 10 or not.

In view of this, server 20 preferably determines whether an IoT appliance has been transferred to a different user or not using the operation information and the position information received from the IoT appliance. Upon transferring an appliance to a different user, typically the appliance is powered off, displaced to a different location, and usage of the appliance is once again started. Server 20 is capable of detecting whether the IoT appliance is powered on or off using the operation information, and is capable of recognizing that the IoT appliance has been displaced using the position information described previously. By combining these two, server 20 can determine the possibility that device 10 has been transferred to a different user.

For example, server 20 uses the operation information and the position information to detect that device 10 has been powered off and has been displaced (S81). For example, server 20 can determine that device 10 has been powered off by determining whether the power state indicated in the operation information is "off" or not. Moreover, when the position information changes from the previous position information, server 20 can detect that device 10 has been displaced.

However, with this alone, it is impossible to determine whether the user remains the same but the user has simply moved to a new residence, or the device as transferred to a new user. In view of this, if the device includes a display, the user may be presented with an inquiry as to whether it is necessary to change the linking settings via the display.

In other words, server 20 determines whether device 10 includes a display or not (S82). Server 20 may determine whether device 10 includes a display or not by referring to information about device 10, or when information on whether device 10 includes a display or not is included in the operation information, server 20 may determine whether device 10 includes a display or not based on the operation information.

When device 10 does not include a display (no in S82), as a precaution, for the time being, server 20 puts the link between the user and the device on hold (S83). On top of this, server 20 asks the user whether they transferred the device to a different user or moved to a new residence, by transmitting a message to the operation device, such as a smartphone, that performed the linking, confirming whether the user transferred the device to a different user or moved to a new residence (S84). If it can be confirmed through this inquiry that the user has moved to a new residence, the hold placed on the link is removed, and the link between the user and device 10 is maintained (S85). If it can be confirmed that the user transferred the device to a different user, the former user and the device are unlinked (S86).

When device 10 does include a display (yes in S82), the above-described inquiry is presented using the display (S87). If it can be confirmed through this inquiry that the user has moved to a new residence, the hold placed on the link is removed, and the link between the user and device 10 is maintained (S88). If it can be confirmed that the user transferred the device to a different user, the former user and the device are unlinked (S89).

In this way, the user to which the device was transferred can appropriately perform a reset operation as a result of the unlinking. Conversely, when the user of the device has not changed and the user has simply moved to a new residence, server 20 can determine that it is unnecessary to change the link settings, and the user can continue using device 10 as they always have.

As described above, when the third unique information received at the third time after the second time differs from the second unique information, controller 202 may determine that device 10 that transmitted the third unique information has been displaced, may transmit, using communication unit 201, an inquiry as to whether the user of device 10 has changed to a different user, to device 10 or to a terminal, such as a smartphone, possessed by the user. Note that the third time corresponds to the time of the detection in step S81.

When, after the transmission of the inquiry, the response to the inquiry received from device 10 or the terminal indicates that the user of device 10 has changed to a different user, controller 202 manages the plurality of items of third operation information received in the third period starting at the third time separately from the plurality of items of first operation information and the plurality of items of second operation information. Specifically, controller 202 manages the plurality of items of third operation information separately from the plurality of items of first operation information and the plurality of items of second operation information by storing the plurality of items of third operation information in association with a third identifier that is different from the first and second identifiers in storage 203. This makes it possible to efficiently determine whether device 10 has been transferred to a different user or not. Moreover, when device 10 has been transferred to a different user, management is performed separately from the operation information corresponding to the former user, so it is possible to determine the state of device 10 that is appropriate for the new user.

On the other hand, when, after the transmission of the inquiry, the response to the inquiry received from device 10 or the terminal indicates that the user of device 10 has not changed to a different user, controller 202 manages the plurality of items of third operation information received in the third period starting at the third time together with the plurality of items of second operation information. Specifically, controller 202 stores the plurality of items of third operation information in association with the second identifier in storage 203. Accordingly, for example, when device 10 has not been transferred to a new user but has simply been displaced, device 10 can be managed without changing the user.

Figure 37:
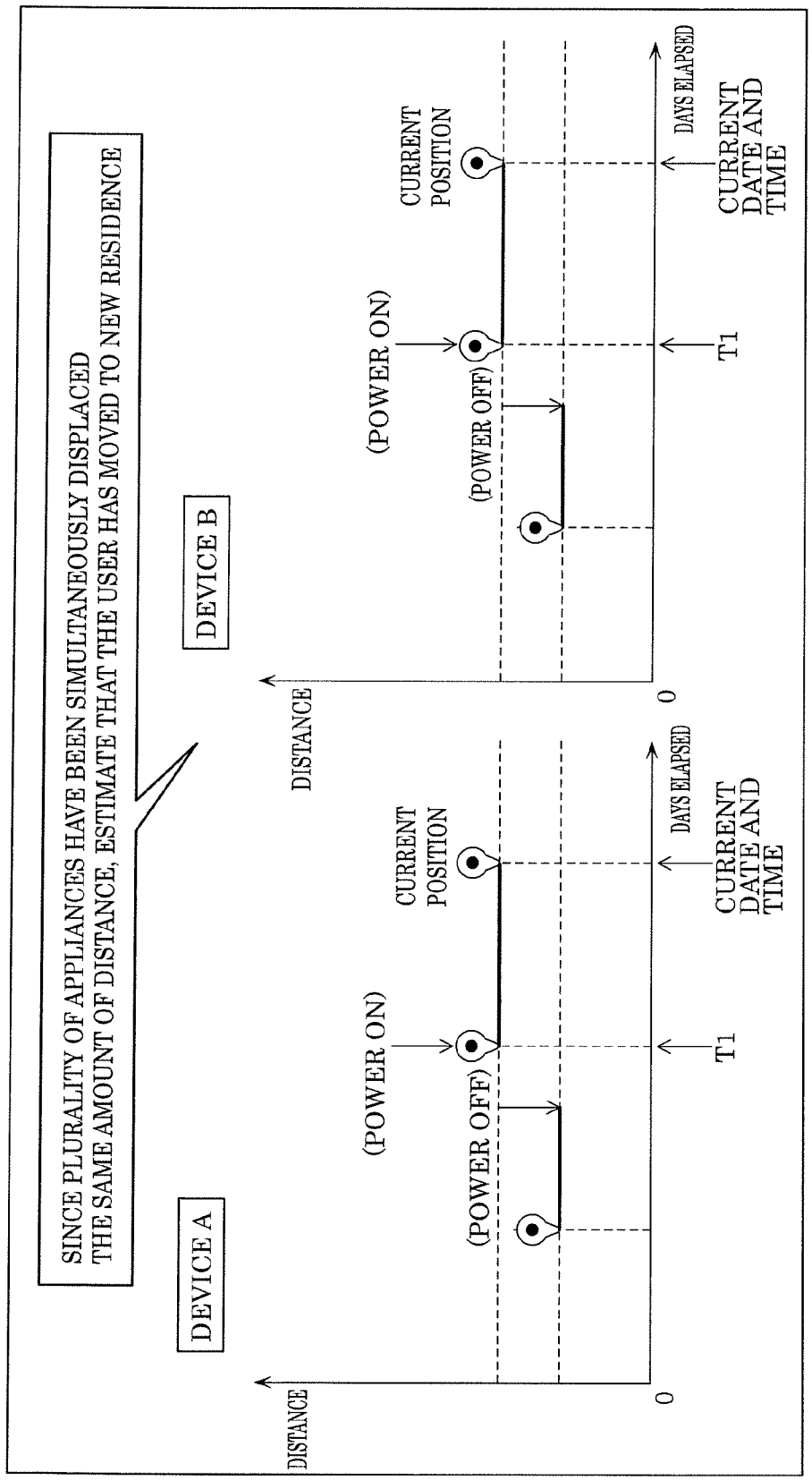
FIG. 37 is a diagram illustrating another example of processes for distinguishing between whether the user has moved to a new residence or has transferred the device to a different user.
Figure 38:
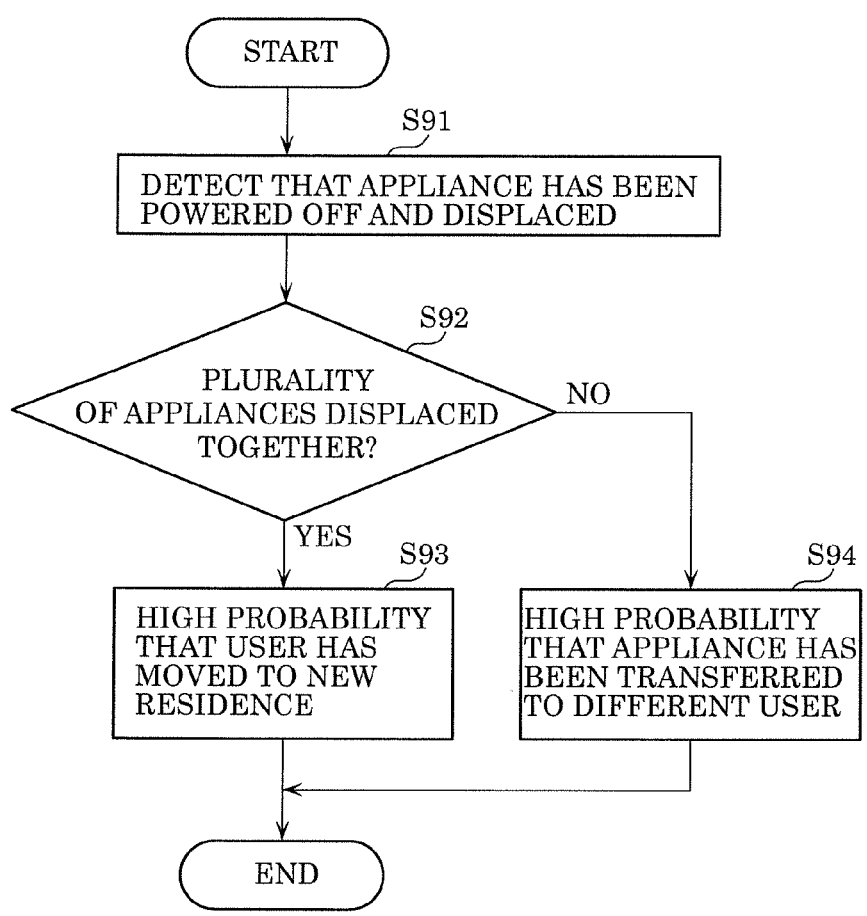
FIG. 38 is a flowchart illustrating another example of processes for distinguishing between whether the user has moved to a new residence or has transferred the device to a different user.

FIG. 37 is a diagram illustrating another example of processes for distinguishing between whether the user has moved to a new residence or has transferred the device to a different user. FIG. 38 is a flowchart illustrating another example of processes for distinguishing between whether the user has moved to a new residence or has transferred the device to a different user.

The method for distinguishing between whether the user has moved to a new residence or has transferred the device to a different user may include, in addition to powering off the device and detecting the displacement of the device described above, determining more accurately the possibility of whether the user has moved to a new residence or has transferred the device to a different user using a combination of other information. FIG. 37 illustrates an example of position information for when a plurality of devices (device A and device B) are displaced simultaneously at time T1. When a plurality of devices are simultaneously displaced like in this example, it is conceivable that the user has moved to a new residence. Accordingly, it is possible to improve the determination accuracy by linking position information for a plurality of devices possessed by the user. For example, when the positions of a refrigerator, a washing machine, and an air conditioner possessed by a user are displaced at the same time, there is a high probability that the user has moved to a new residence. On the other hand, when only the washing machine is displaced, there is a high probability that the user has not moved to a new residence.

Here, based on the operation information and the position information, server 20 detects the powering off and displacement of a device (S91).

Next, server 20 determines whether a plurality of devices have been displaced together (S92). In other words, server 20 determines whether a plurality of devices have been displaced from a first location to a second location.

When server 20 determines that a plurality of devices have been displaced together (yes in S92), server 20 determines that there is a high probability that the user moved to a new residence (S93).

When server 20 determines that a plurality of devices have not been displaced together (no in S92), that is, when only a single device has been displaced, server 20 determines that there is a high probability that the device has been transferred to a new user (S94).

In this way, when (i) a plurality of items of second unique information received from a plurality of devices 10 at a second time before time T1 are the same, (ii) a plurality of items of third unique information received from the plurality of devices at a third time after the time T1 after the second time are the same, and (iii) the second unique information and the third unique information are different, controller 202 may manage a plurality of items of third operation information received in a third period starting at the third time together with the plurality of items of second operation information. Thus, when a plurality of devices are displaced, it is regarded that the user of the devices has not changed, and the devices can be managed accordingly.

Figure 39:
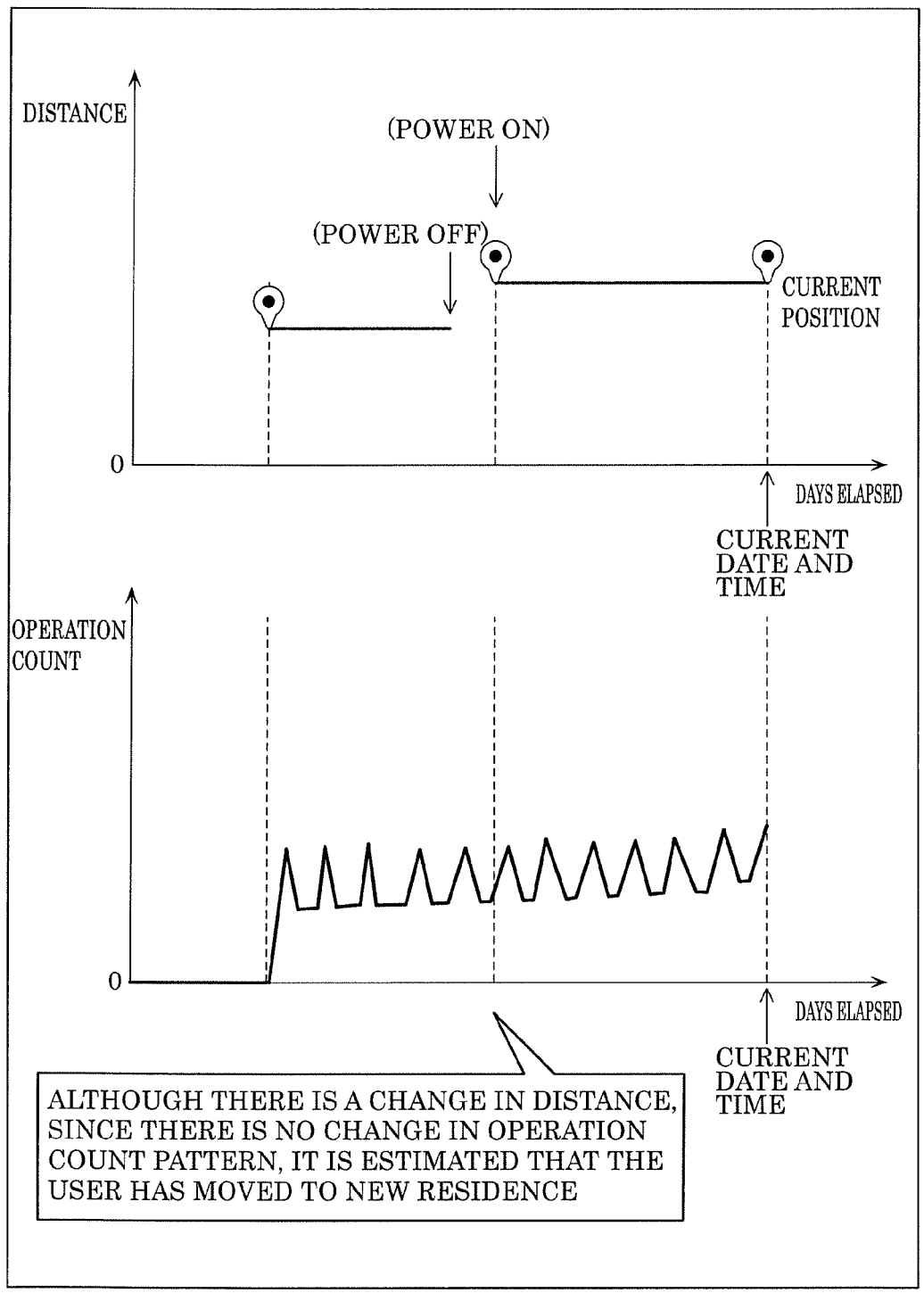
FIG. 39 is a diagram illustrating another example of processes for distinguishing between whether the user has moved to a new residence or has transferred the device to a different user.
Figure 40:
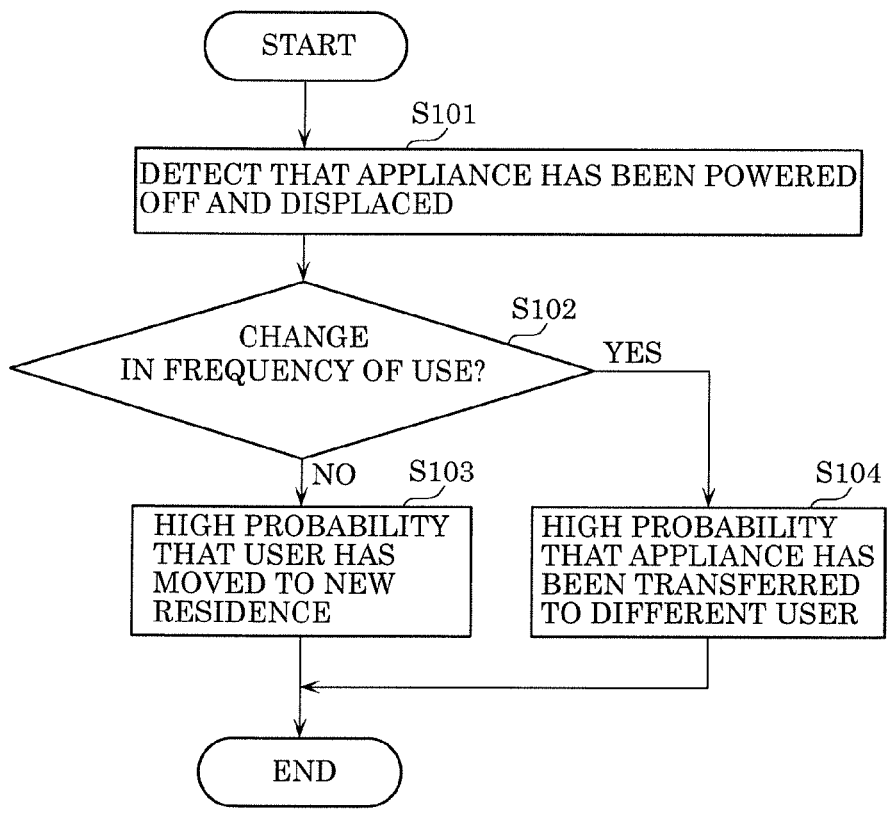
FIG. 40 is a flowchart illustrating another example of processes for distinguishing between whether the user has moved to a new residence or has transferred the device to a different user.

FIG. 39 is a diagram illustrating another example of processes for distinguishing between whether the user has moved to a new residence or has transferred the device to a different user. FIG. 40 is a flowchart illustrating another example of processes for distinguishing between whether the user has moved to a new residence or has transferred the device to a different user.

Server 20 may, in addition to powering off the device and detecting the displacement of the device as described above, use day-by-day operation count information to determine whether the user has moved to a new residence or has transferred the device to a different user. This makes it possible to improve the accuracy of the determination.

In FIG. 39, the position information changes, but there is little variation in the operation count pattern. In this way, even if there is a change in the position information, when (i) the period before the change in the position information and (ii) the pattern of the variation of a per unit time operation count in a period after the change in the position information satisfy a predetermined degree of correlation (i.e., when they are similar), server 20 may determine there to be a high possibility that the user has moved to a new residence.

As illustrated in FIG. 40, the processes performed by server 20 in such cases differ from those illustrated in FIG. 38 in that step S92 is replaced with step S102. The processing in steps S101, S103, and S104 are the same as the processing in steps S91, S93, and S94, respectively.

In step S102, server 20 determines whether the frequency of use has changed or not. Whether the frequency of use has changed or not is determined by determining whether the pattern of the variation of the operation count satisfies a predetermined degree correlation or not, as described above.

As illustrated in FIG. 39, a change in day-by-day operation count indicates a high possibility that the user of the appliance has changed, meaning there is a high possibility that the device has been transferred to a different user. Conversely, no change in day-by-day operation count indicates no change from the past in frequency of use, and thus, it is conceivable that the same user is using the device in a different location, i.e., the user has moved to a new residence. However, this determination method cannot be applied as-is to appliances that are carried and used outside of the home, such as an electric shaver or hair dryer.

FIG. 41 is a diagram illustrating an exception to cases in which the user is estimated to have moved to a new residence. FIG. 42 is a table that categorizes devices by type.

As described above, it is possible to determine whether the user moved to a new residence or transferred the device to a different user based on changes in the position information of device 10, but for small devices that are carried out of the home, there are instances in which, even if the position information changes, the user is merely using the device outside of the home. In other words, even when a change in position information is detected by server 20, there are instances in which the user has neither moved to a new residence nor transferred the device to a different user. For example, as illustrated in FIG. 41, with small appliances that may conceivably be taken out of the home, such as electric shavers or hair dryers, the location changes when the user takes the appliance out of the home. In such cases, it is assumed the user will return home at some point. Accordingly, server 20 can determine that the user has neither moved to a new residence nor transferred the device to a different user, but that the device is continuing to be used by the user, by detecting the return of the device to the original location. In other words, in these cases, server 20 maintains the link between the user and the device.

In this way, determination accuracy can be improved by changing the degree of influence that whether the appliance is a large appliance that is typically not unplugged in everyday life, such as a refrigerator or washing machine, or a small appliance that may conceivably be taken out of the home, such as an electric shaver or hair dryer, has on determining that the user has moved to a new residence. Note that, as illustrated in FIG. 42, appliances may be categorized depending on, for example, the size of the device or the season in which the device is used, and server 20 may change the determination of the state of the device depending on characteristics associated with these categories.

Next, among state estimations of device 10, cases in which device 10 has been estimated to have been transferred to a different user, resold, or stolen will be described.

Figure 43:
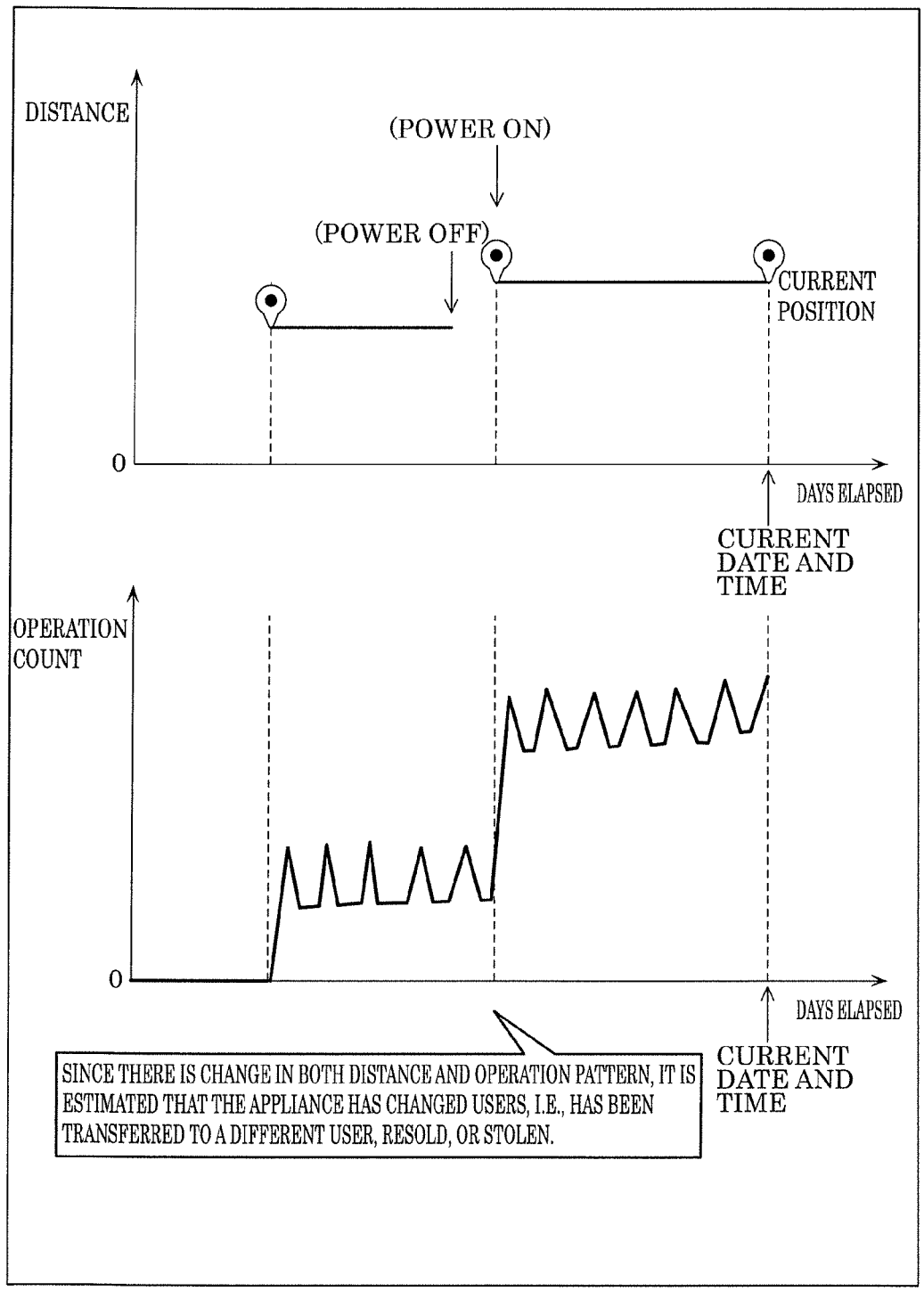
FIG. 43 illustrates a graph of one example of a case in which it is estimated that a device has been transferred to a different user, resold, or stolen.

FIG. 43 illustrates a graph of a case in which it is estimated that device 10 has been transferred to a different user, resold, or stolen.

As illustrated in FIG. 43, when the location of device 10 changes and the operation count pattern greatly varies, it is estimated that the user of device 10 has changed. Accordingly, server 20 estimates that device 10 has been transferred to a different user, resold, or stolen. It is possible to for server 20 provide a service such as prompting the user to investigate or alerting the user, via an LED or display, etc., on device 10. Moreover, when the account information from before the change of the user is still linked, that user may be notified via, for example, email, prompting the user to unlink his or her account information.

Once a user has been unlinked from a device, it is not preferable, from a data management viewpoint, to be able to reference logs of past users from the device. Logs that can be referenced should be limited to logs linked to the user, but there are instances in which information relevant to the safety of the user, such as information indicating that service life or service use frequency of the device has exceeded, should be conveyed to the user to ensure safe use of the appliance. In view of this, it is beneficial to manage, on the server, information cumulated from the initial use of the device to the current time separately from logs pertaining to usage by a user. Alternatively, it is possible to achieve the same effect by managing what users are linked during which period in the accumulated information.

This accumulated information linked to an appliance may be used by referencing it when a device is displayed on the floor of a retailer is sold or when an appliance is resold.

Next, a countermeasure, in the state estimation of device 10, for when device 10 has been stolen will be described.

Figure 44:
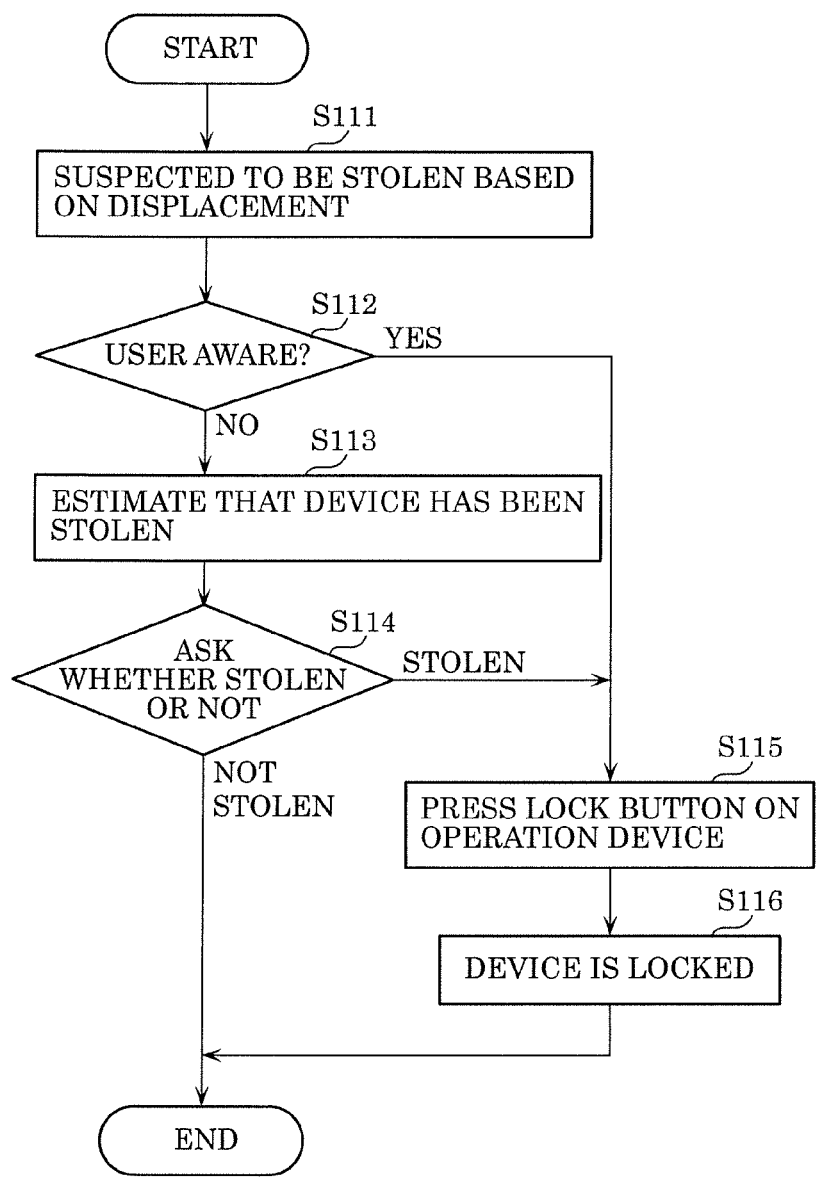
FIG. 44 is a flowchart illustrating processes for implementing countermeasures for when a device has been stolen.

FIG. 44 is a flowchart illustrating processes for implementing countermeasures for when device 10 has been stolen.

When device 10 is stolen, it is preferable to implement a function that locks device 10 linked to the user account of the user so that device 10 cannot be used by another user. Specifically, this function uses operation device 40, such as a smartphone, that was used to link device 10, to transmit, from operation device 40 to the stolen device 10, a command that locks the stolen device 10. Implementing this function makes it possible to prevent the use of device 10 by a user that dishonestly obtained device 10 by stealing device 10, and possible to prevent the ill-intentioned user from accessing past logs.

First, server 20 detects that device 10 is suspected to be stolen based on, for example, the position information and operation state transmitted by device 10 (S111).

If the user is aware that device 10 has been stolen, processing proceeds to step S115, and if the user is not aware, processing proceeds to step S113. Note that step S112 determines whether, before lapse of a predetermined period of time after step S111, information indicating the press of a lock button on the user's operation device 40 has been received from operation device 40 in step S115. Accordingly, when the lock button has not been pressed upon elapse of the predetermined period of time, processing proceeds to step S113.

In step S113, server 20 causes operation device 40 to send an inquiry to the user account linked to device 10 inquiring whether device 10 has been stolen or not (S114). This function makes it possible to, even when the user is not aware that the appliance has been stolen, alert the user that device 10 has been stolen by a message, such as "is the appliance in your home?" or "do you have the appliance with you?" being transmitted from the appliance to operation device 40.

Server 20 proceeds to step S115 upon receiving an input of "stolen" from operation device 40 in step S114. Note that in such cases, an input of "stolen" may be regarded as the pressing of the lock button in step S115.

In step S115, device 10 is locked upon the lock button being pressed. This makes it possible to prevent unauthorized use of device 10 by using the feature that locks device 10 to lock the appliance.

When an input indicating "not stolen" in step S114 is received from operation device 40, the processing is ended.

Next, the unlocking of a locked appliance will be considered. Since unauthorized use cannot be prevented if the appliance can be unlocked via one-factor authentication appliance-side, it is necessary to implement multi-factor authentication function by transmitting a confirmation of the unlocking to the linked user account. However, a user can conceivably maliciously abuse this function by, for example, reselling the appliance in a state in which the appliance is still linked to his or her user account and then locking the device after reselling the appliance. Therefore, it is necessary for the manufacturer to establish customer support for carrying out the unlocking. The manufacturer is contacted by a user whose user account is linked to the appliance in question, and determines whether to unlock the appliance or not.

Capability to communicate with the cloud using the communication module is a prerequisite when implementing the function for providing theft countermeasures. Accordingly, cases in which the communication module is removed upon stealing the appliance are conceivable. This may be addressed by causing the appliance to lock itself and keep itself locked while the communication module is removed.

In this way, when the third unique information received at the third time after the second time is different from the second unique information, controller 202 may determine that device 10 has been displaced, and may transmit, using communication unit 201, an inquiry inquiring whether device 10 has been stolen or not to a terminal possessed by the user. Next, when, after transmitting the inquiry, the inquiry response received from the terminal indicates that device 10 has been stolen, controller 202 may use communication unit 201 to transmit a control signal that locks device 10 to prevent usage of device 10. Here, upon receipt of the control signal, device 10 may lock itself to prevent usage of device 10. This makes it possible to lock device 10 when device 10 has been stolen so that another user cannot use device 10.

Here, locking device 10 so that device 10 cannot be used is, specifically, placing device 10 in a state in which device 10 does not receive user inputs via operation unit 111. For example, device 10 powers itself off and then places itself in a state in which it does not receive user inputs via operation unit 111. Moreover, when device 10 is a device that has as a door that opens and closes, such as a refrigerator, washing machine, microwave oven, or rice cooker, device 10 may be locked so that the door cannot be opened.

Next, in the state estimation of device 10, using a plurality of items of information to distinguish between whether the user has moved to a new residence or has transferred the device to a different user will be described.

Figure 45:
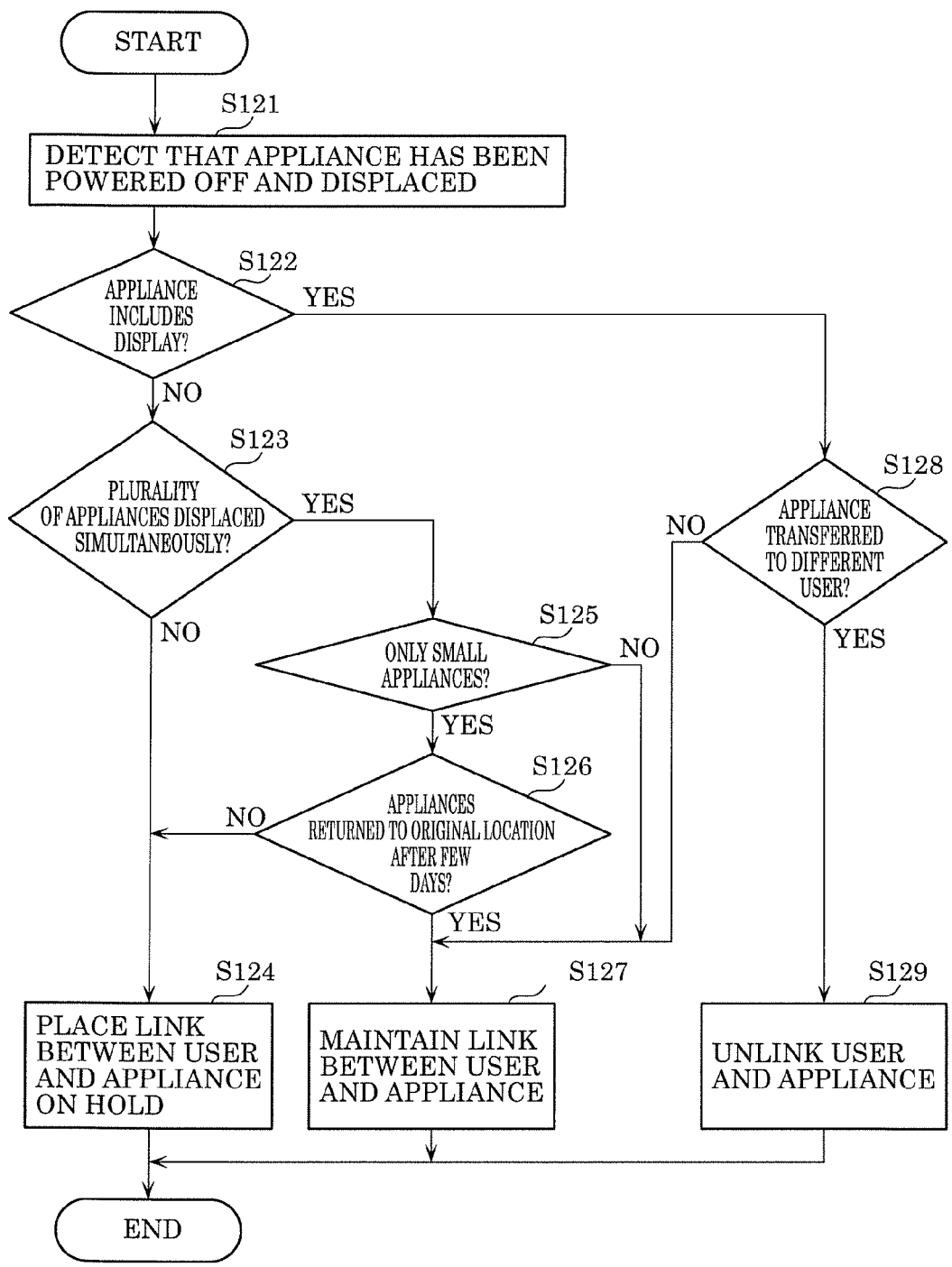
FIG. 45 is a flowchart of one example of processes for linking a user and a device when displacement of the device is detected.

FIG. 45 is a flowchart of one example of processes for linking a user and device 10 when displacement of device 10 is detected.

This flowchart illustrates one example of processes for distinguishing between whether the user has moved to a new residence or has transferred the device to a different user, using a combination of the determination methods described above.

Server 20 detects the powering off and displacement of device 10 (S121).

Server 20 determines whether device 10 includes a display or not (S122).

When server 20 determines that device 10 does not include a display (no in S122), server 20 determines whether a plurality of devices have been simultaneously displaced (S123).

When server 20 determines that a plurality of devices have not been simultaneously displaced (no in S123), server 20 puts the link between the user and device 10 on hold (S124).

In step S123, when server 20 determines that a plurality of devices have been simultaneously displaced (yes in S123), server 20 determines whether each of the plurality of displaced devices is a small appliance or not (S125).

When server 20 determines that each of the plurality of displaced devices is a small appliance (yes in S125), server 20 determines whether the plurality of devices have returned to their original location of usage after a few days (S126).

When server 20 determines that the plurality of devices have returned to their original location of usage after a few days (yes in S126), or when the result of step S125 is "no", server 20 maintains the link between the user and the plurality of devices (S127).

When server 20 determines that the plurality of devices have not returned to their original location of usage after a few days (yes in S126), processing proceeds to step S124.

In step S122, when server 20 determines that device 10 includes a display (yes in S122), server 20 transmits an inquiry to the user's operation device 40 inquiring whether the user has transferred device 10 to a different user to not (S128).

When server 20 receives a response from operation device 40 that the user has transferred device 10 to a different user (yes in S128), the user and the device are unlinked.

When server 20 receives a response from operation device 40 that the user has not transferred device 10 to a different user (no in S128), processing proceeds to step S127.

In this example, even in cases in which it is difficult to receive confirmation from the user because device 10 does not include a display, it is possible to determine that device 10 can continue to be used without placing the state of the link between the user and device 10 on hold when it can approximately be determined that the user moved to a new residence.

Figure 46:
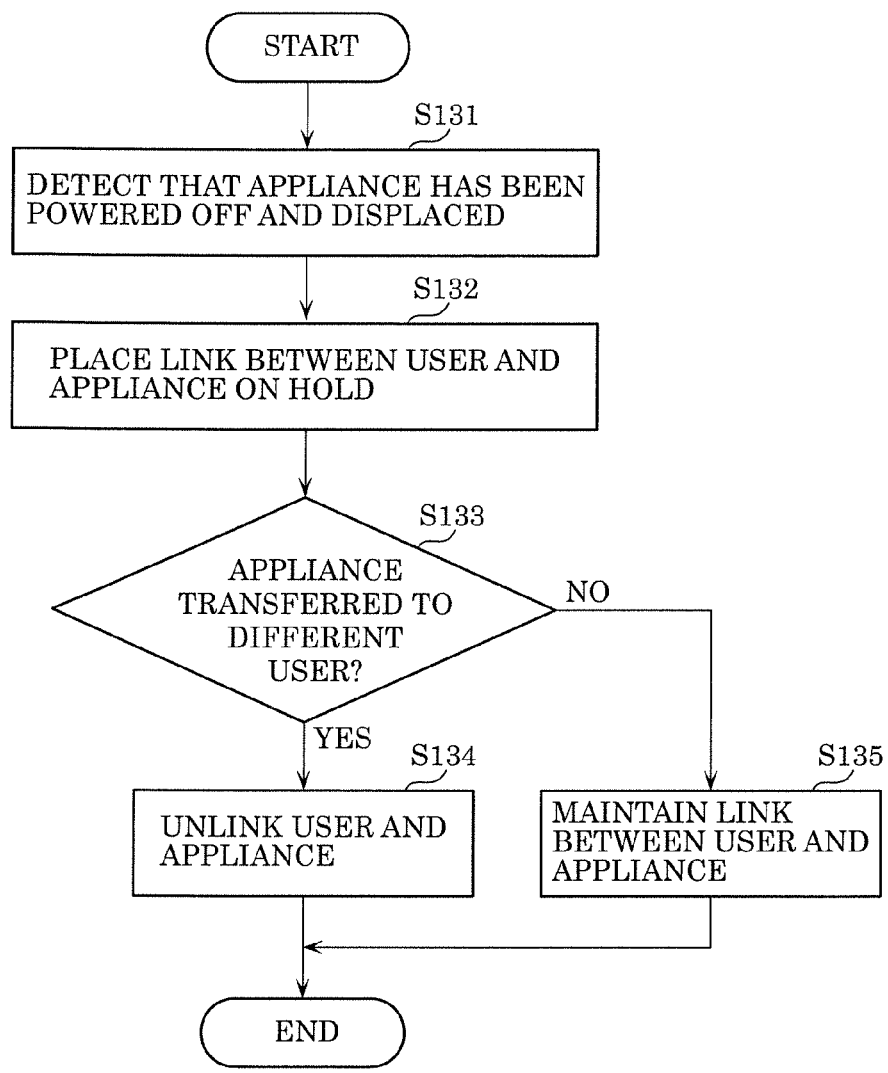
FIG. 46 is a flowchart of another example of processes for linking a user and a device when displacement of the device is detected.

FIG. 46 is a flowchart of another example of processes for linking a user and device 10 when displacement of device 10 is detected.

In contrast from the previous example, to ensure security, the link is firmly placed on hold in debatable situations by always requiring user confirmation. In this case, since performing confirmation processing each time each of the plurality of appliances is used is bothersome, in a state in which one appliance has been confirmed, a configuration that allows for the result to be shared by communication between IoT devices is preferable.

Here, server 20 detects the powering off and displacement of device 10 (S131).

Server 20 places the link between the user and device 10 on hold (S132).

Server 20 transmits an inquiry to the user's operation device 40 inquiring whether the user has transferred device 10 to a different user or not (S133).

When server 20 receives a response from operation device 40 that the user has transferred device 10 to a different user (yes in S133), the user and the device are unlinked.

When server 20 receives a response from operation device 40 that the user has not transferred device 10 to a different user (no in S133), the link between the user and the device is maintained (S135).

Next, a case, in the state estimation of device 10, in which the user changes the family structure settings, will be described.

Figure 47:
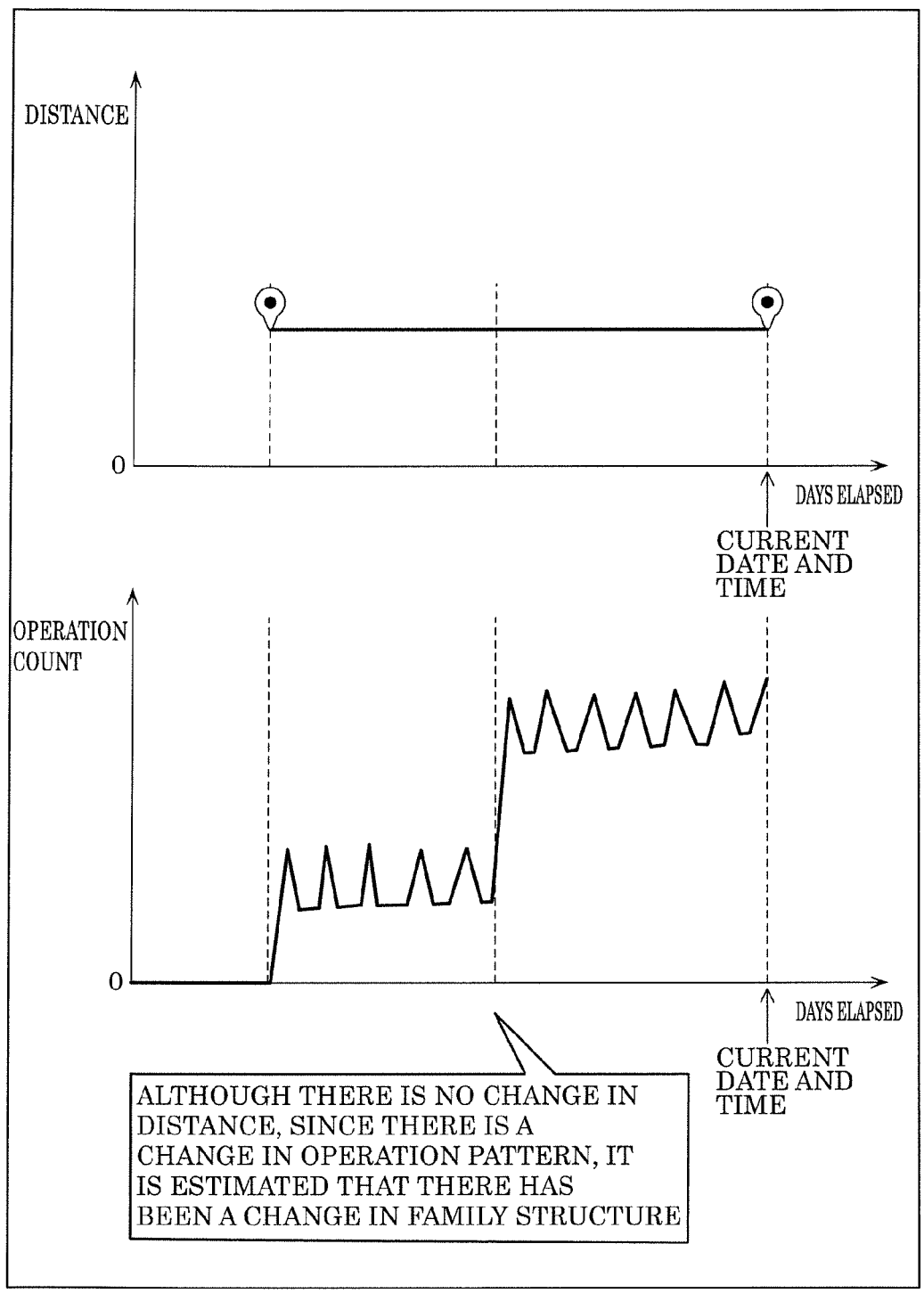
FIG. 47 illustrates a graph of one example of a case in which it is estimated that the user has changed the family structure settings.

FIG. 47 illustrates a graph of a case in which it is estimated that the user has changed the family structure settings.

As illustrated in FIG. 47, the location of device 10 does not change but the operation count pattern greatly varies. In such cases, it is estimated that the family structure settings have been changed. It is conceivable that the user may experience changes in his or her family structure, such as changes in marital status or living arrangements with their parents. It is possible to provide services appropriate for the changes using, for example, an LED or display on the appliance, such as displaying product advertisements appropriate for the changes.

Next, a case, in the state estimation of device 10, in which device 10 is estimated to be malfunctioning or discarded will be described.

Figure 48:
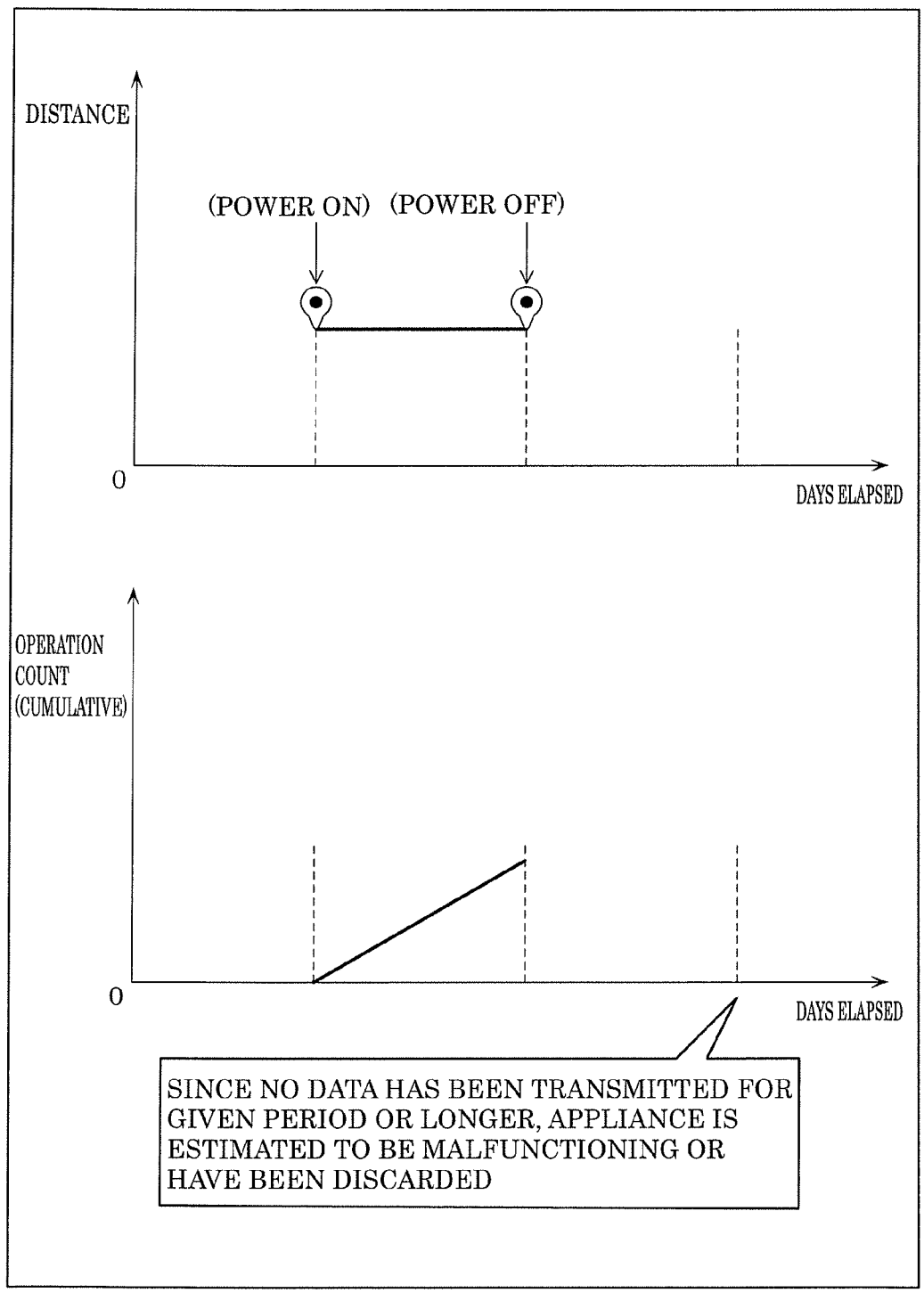
FIG. 48 illustrates a graph of one example of a case in which it is estimated that a device is malfunctioning.
Figure 49:
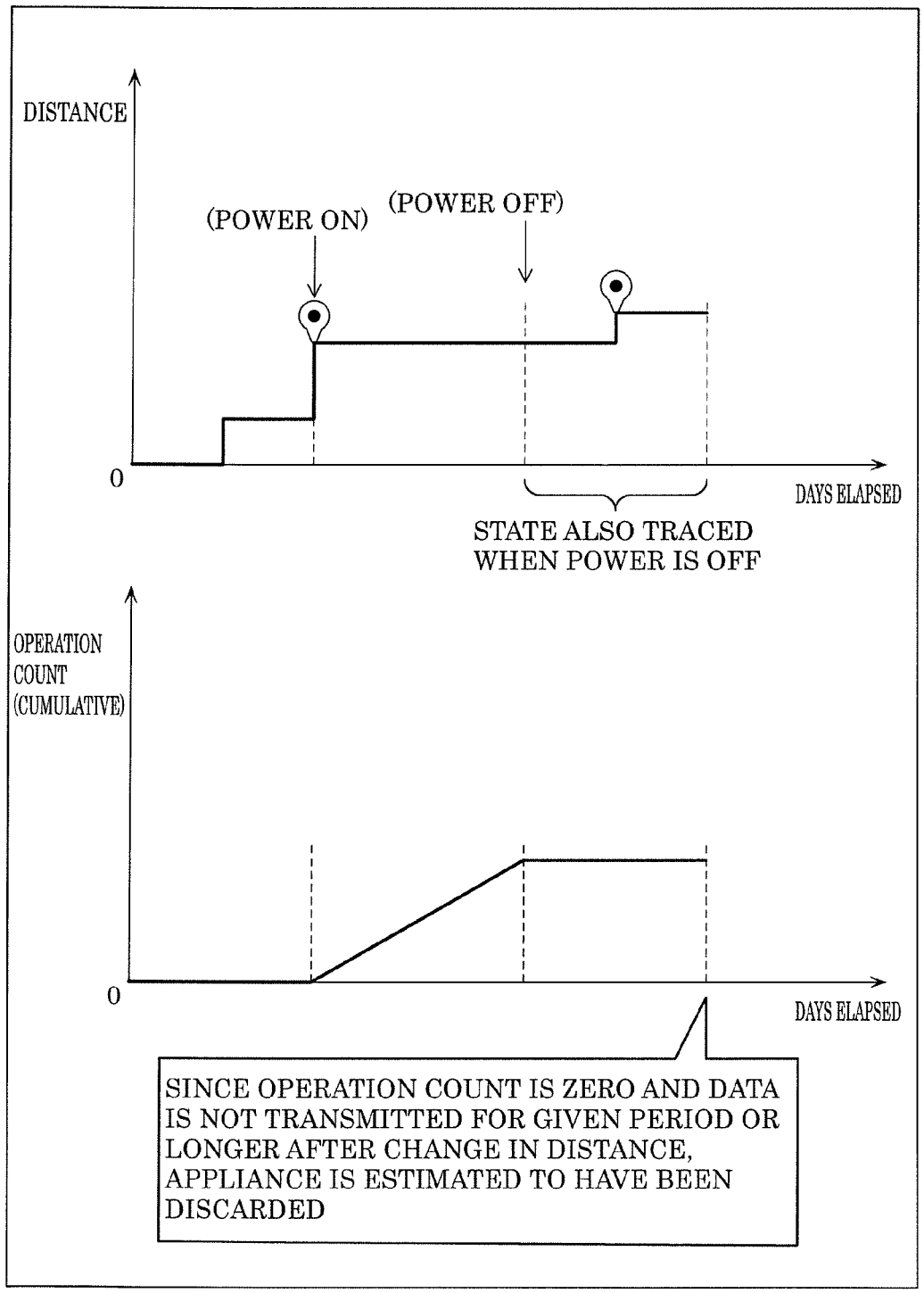
FIG. 49 illustrates a graph of one example of a case in which it is estimated that a device has been discarded.

FIG. 48 illustrates a graph of a case in which it is estimated that device 10 is malfunctioning. FIG. 49 illustrates a graph of a case in which it is estimated that device 10 has been discarded.

As illustrated in FIG. 48 and FIG. 49, when server 20 does not receive the operation information and the position information for a given period of time or longer, server 20 estimates that device 10 is malfunctioning or has been discarded. Moreover, when device 10 is equipped with a battery for the communication module, server 20 may determine that device 10 has been discarded when, after the location of device 10 has changed, the operation count indicates zero and data has not been transmitted for a given period of time or longer.

Moreover, in cases in which device 10 is equipped with a battery for the communication module, when the location at which transmission was interrupted is within a specified range (incinerator plant or recycle center), server 20 can determine with near certainty that device 10 has been discarded. When such an appliance is subject to a recall, the appliance can be removed from the recall management list upon being determined to have been discarded. In cases in which an appliance has been erroneously determined to have been discarded and the appliance begins operating once again, communication should also be resumed, so a recall notification can be resent to cover such incidents. Accordingly, there is conceivably little risk in making an erroneous determination.

In this way, when server 20 does not receive operation information before elapse of a predetermined period starting at a fourth time after the second time, server 20 may change a management state of the plurality of items of the operation information received up to the fourth time to an unmanaged state.

Moreover, when communication unit 201 does not receive operation information before elapse of a predetermined period starting at a fourth time after the second time and fourth unique information received at the fourth time is identical to any one of a plurality of items of unique information included in a unique information list that is stored in advance, controller 202 may change a management state of a plurality of items of the operation information received up to the fourth time to an unmanaged state.

In this way, since server 20 does not manage device 10 when server 20 determines that device 10 is malfunctioning or has been discarded, the processing load required for management can be reduced.

As described above, the embodiment has been described as an exemplification of the technique according to the present disclosure. To this extent, the accompanying drawings and detailed description are provided.

Therefore, the elements described in the accompanying drawings and detailed description may include, not only those essential to solving the technical problems, but also those that are not essential to solving the technical problems but are included in order to illustrate the aforementioned technique. Thus, those unnecessary elements should not be deemed essential due to the mere fact that they are described in the accompanying drawings and the detailed description.

Furthermore, since the foregoing embodiments are for illustrating the technique according to the present disclosure, various changes, substitutions, additions, omissions, etc., can be carried out within the scope of the claims or its equivalents.

INDUSTRIAL APPLICABILITY

The present disclosure is applicable as a device management system or device management method, etc., which can efficiently manage a device.

The invention claimed is:

1. A device management method executed in a server communicatively connected to a plurality of household appliances and a first operation device via a network, the first operation device associated with a first user identifier identifying a first user, the device management method comprising:
   receiving, from the first operation device, a request to generate a first association that associates the first user identifier and a first device identifier identifying a first household appliance included in the plurality of household appliances;
   detecting, in a list including a plurality of associations that is stored in a storage device of the server, a second association including the first device identifier included in the first association generated by the request, each of the plurality of associations indicating an association between a device identifier which identifies a household appliance and a user identifier which identifies a user, the second association indicating an association between the first device identifier and the second user identifier, the second user identifier being different from the first user identifier;
   detecting, in the list stored in the storage device, a third association including the first user identifier included in the first association generated by the request, the third association indicating an association between the second device identifier and the first user identifier, the second device identifier identifying a second household appliance different from the first household appliance;
   generating the first association and a fourth association that associates the second user identifier, which is included in the second association and not included in the first association, and the second device identifier, which is included in the third association and not included in the first association; and
   adding the first association and the fourth association to the list and storing the list in the storage device,
       wherein each of the plurality of household appliances accepts an input made via an operation device that is logged-in using a user identifier associated with the household appliances in the plurality of associations included in the list, and does not accept an input made via an operation device that is logged-in using a user identifier not associated with the household appliance in the plurality of associations included in the list.

2. The device management method according to claim 1, wherein the storing includes:
   when, in the correspondence information, the first device identifier is associated with a second user identifier different from the first user identifier, transmitting, to the first operation device, a first inquiry checking whether a second user identified by the second user identifier is a member of a first user group to which the first user belongs;
   receiving a first response to the first inquiry transmitted; and
   when the first response received includes a response indicating that the second user is confirmed to be a member of the first user group, storing the first device identifier and the first user identifier in association with each other.

3. The device management method according to claim 2, wherein in the storing,
   when the first response received includes a response indicating that the second user is not confirmed to be a member of the first user group, the first device identifier and the first user identifier are not associated with each other, and the second device identifier and the second user identifier are not associated with each other.

4. The device management method according to claim 2, wherein in the storing,
   when the first response received includes a response indicating that the second user is confirmed to be a member of the first user group, a second inquiry checking whether the first user is a member of a second user group to which the second user belongs is further transmitted;
   a second response to the second inquiry transmitted is further received, and
   when the second response received includes a response indicating that the first user is confirmed to be a member of the second user group, the first device identifier and the first user identifier are further stored in association with each other.

5. The device management method according to claim 4, wherein in the storing,
   when the second response received includes a response indicating that the first user is not confirmed to be a member of the second user group, the first device identifier and the first user identifier are not associated with each other, and the second device identifier and the second user identifier are not associated with each other.

6. The device management method according to claim 1, wherein in the storing, when, in the correspondence information, the first device identifier is associated with a second user identifier different from the first user identifier, a third inquiry checking whether the first user and a second user identified by the second user identifier are a same person is transmitted to the first operation device, a third response to the third inquiry transmitted is received, and when the third response received includes a response indicating that the first user and the second user are confirmed to be the same person, the first user identifier and the second user identifier are stored in association with each other.

7. The device management method according to claim 1, wherein in the storing, when, in the correspondence information, the second user identifier is associated with a third device identifier identifying a third device included in the plurality of household appliances and different from the first device and the second device, the third device identifier and the first user identifier are further stored in association with each other.

8. The device management method according to claim 6, wherein in the receiving, the request is received by receiving the first user identifier from the first operation device and receiving device-related information related to the first device from the first device or the first operation device, and in the storing, the first device is identified based on the device-related information obtained, a fourth inquiry is transmitted, via the network, to the first device identified, and when a fourth response to the fourth inquiry transmitted is received from the first device or the first operation device, the first device identifier and the first user identifier are stored in association with each other, and when the fourth response is not received, the first device identifier and the first user identifier are not associated with each other.

9. The device management method according to claim 8, wherein each of the plurality of household appliances is communicatively connected to the network via a base station for long-distance wireless communication, and in the transmission of the fourth inquiry to the first device, the fourth inquiry is transmitted to the first device via the base station.

10. The device management method according to claim 9, wherein the long-distance wireless communication is low power, wide area (LPWA) communication.

11. A device management method executed in a server communicatively connected to a plurality of household appliances and a first operation device via a network, the first operation device associated with a first user identifier identifying a first user, the device management method comprising:

receiving, from the first operation device, a request to generate a first association that associates the first user identifier and a first device identifier identifying a first household appliance included in the plurality of household appliances;

detecting, in a list including a plurality of associations that is stored in a storage device of the server, a second association including the first device identifier included in the first association generated by the request, each of the plurality of associations indicating an association between a device identifier which identifies a household appliance and a user identifier which identifies a user, the second association indicating an association between the first device identifier and the second user identifier, the second user identifier being different from the first user identifier;

detecting, in the list stored in the storage device, a third association including the second user identifier included in the second association detected in the detecting, the third association indicating an association between a third device identifier and the second user identifier, the third device identifier identifying a third household appliance different from the first household appliance;

generating the first association and a fourth association that associates the first user identifier, which is included in the first association, and the third device identifier, which is included in the third association and not included in the second association; and adding the first association and the fourth association to the list and storing the list in the storage device, wherein each of the plurality of household appliances accepts an input made via an operation device that is logged-in using a user identifier associated with the household appliance in the plurality of associations included in the list, and does not accept an input made via an operation device that is logged-in using a user identifier not associated with the household appliance in the plurality of associations included in the list.

12. A device management system, comprising:

a plurality of household appliances communicatively connected to a network;

a first operation device communicatively connected to the network and associated with a first user identifier identifying a first user; and a server communicatively connected to the network, wherein the server includes:

a reception unit configured to receive, from the first operation device, a request to generate a first association that associates the first user identifier and a first device identifier identifying a first household appliance included in the plurality of household appliances; and a controller programmed to:

detect, in a list including a plurality of associations that is stored in a storage device of the server, a second association including the first device identifier included in the first association generated by the request, each of the plurality of associations indicating an association between a device identifier which identifies a household appliance and a user identifier which identifies a user, the second association indicating an association between the first device identifier and the second user identifier, the second user identifier being different from the first user identifier, detect, in the list stored in the storage device, a third association including the first user identifier included in the first association generated by the reception unit, the third association indicating an association between the second device identifier and the first user identifier, the second device identifier identifying a second household appliance different from the first household appliance, generate the first association and a fourth association that associates the second user identifier that is included in the second association and not included in the first association, and the second device identifier that is included in the third association and not included in the first association, and add the first association and the fourth association to the list and store the list in the storage device, wherein each of the plurality of household appliances accepts an input made via an operation device that is logged-in using a user identifier associated with the household appliance in the plurality of associations included in the list, and does not accept an input made via an operation device that is logged-in using a user identifier not associated with the household appliance in the plurality of associations included in the list.

13. A device management system, comprising:

a plurality of household appliances communicatively connected to a network;

a first operation device communicatively connected to the network and associated with a first user identifier identifying a first user; and a server communicatively connected to the network, wherein the server includes:

a reception unit configured to receive, from the first operation device, a request to generate a first association that associates the first user identifier and a first device identifier identifying a first household appliance included in the plurality of household appliances;

a controller programmed to:

detect, in a list including a plurality of associations that is stored in a storage device of the server, a second association including the first device identifier included in the first association generated by the request, each of the plurality of associations indicating an association between a device identifier which identifies a household appliance and a user identifier which identifies a user, the second association indicating an association between the first device identifier and the second user identifier, the second user identifier being different from the first user identifier, detect, in the list stored in the storage device, a third association including the second user identifier included in the second association detected in the detecting, the third association indicating an association between a third device identifier and the second user identifier, the third device identifier identifying a third household appliance different from the first household appliance;

generate the first association and a fourth association that associates the first user identifier, which is included in the first association, and the third device identifier, which is included in the third association and not included in the second association; and add the first association and the fourth association to the list and store the list in the storage device, wherein each of the plurality of household appliances accepts an input made via an operation device that is logged-in using a user identifier associated with the household appliance in the plurality of associations included in the list, and does not accept an input made via an operation device that is logged-in using a user identifier not associated with the household appliances in the plurality of associations included in the list.

* * * * *